United States Patent
Pitchumani et al.

(10) Patent No.: US 12,460,861 B2
(45) Date of Patent: Nov. 4, 2025

(54) METHOD AND SYSTEM FOR PRODUCTION OPTIMIZATION

(71) Applicant: SHELL USA, INC., Houston, TX (US)

(72) Inventors: Raghuraman Pitchumani, Rijswijk (NL); Sharan Nair, Den Helder (NL); Rakesh Jaysinh Paleja, London (GB); Jasper Stolte, Rijswijk (NL)

(73) Assignee: SHELL USA, INC., Houston, TX (US)

( * ) Notice: Subject to any disclaimer, the term of this patent is extended or adjusted under 35 U.S.C. 154(b) by 576 days.

(21) Appl. No.: 17/801,297

(22) PCT Filed: Feb. 22, 2021

(86) PCT No.: PCT/EP2021/054280
§ 371 (c)(1),
(2) Date: Aug. 22, 2022

(87) PCT Pub. No.: WO2021/170525
PCT Pub. Date: Sep. 2, 2021

(65) Prior Publication Data
US 2023/0083389 A1    Mar. 16, 2023

(30) Foreign Application Priority Data
Feb. 25, 2020    (EP) .................................... 20159211

(51) Int. Cl.
*F25J 1/00*    (2006.01)
*F25J 1/02*    (2006.01)
*G05B 13/04*    (2006.01)

(52) U.S. Cl.
CPC ........... *F25J 1/0022* (2013.01); *F25J 1/0055* (2013.01); *F25J 1/0057* (2013.01); *F25J 1/0082* (2013.01);
(Continued)

(58) Field of Classification Search
CPC ........ F25J 1/0022; F25J 1/0055; F25J 1/0057; F25J 1/0082; F25J 1/0085; F25J 1/0087;
(Continued)

(56) References Cited

U.S. PATENT DOCUMENTS 6,272,882 B1    8/2001    Hodges et al.
6,370,910 B1    4/2002    Grootjans et al.
(Continued)

FOREIGN PATENT DOCUMENTS

CN        104992040 B    8/2018

OTHER PUBLICATIONS

International Search Report and Written Opinion received for PCT Patent Application No. PCT/EP2021/054280, mailed on Jul. 1, 2021, 21 pages.
(Continued)

*Primary Examiner* — Charles R Kasenge
(74) *Attorney, Agent, or Firm* — SHELL USA, INC.

(57) ABSTRACT

The disclosure provides a method and system for optimizing production of a natural gas liquefaction process, the method comprising the steps of: selecting at least one manipulated variable (MV) for controlling the liquefaction process; selecting at least one control variable (CV), the at least one control variable at least comprising liquefied natural gas (LNG) throughput; providing at least one model, each model providing a dependency of the at least one control variable (CV) on the at least one manipulated variable (MV); using the at least one model to estimate LNG throughput for at least one of the manipulated variables (MV); obtaining process data from the liquefaction process, the process data at least including observed values of LNG throughput; creating a gain matrix based on said interdependencies; and using the gain matrix to optimize a process control system of the liquefaction process.

22 Claims, 22 Drawing Sheets

(52) U.S. Cl.
CPC ............ *F25J 1/0085* (2013.01); *F25J 1/0087* (2013.01); *F25J 1/0207* (2013.01); *F25J 1/0216* (2013.01); *F25J 1/0231* (2013.01); *F25J 1/0252* (2013.01); *F25J 1/0267* (2013.01); *F25J 1/0292* (2013.01); *G05B 13/041* (2013.01); *F25J 2210/06* (2013.01); *F25J 2220/62* (2013.01); *F25J 2220/64* (2013.01); *F25J 2245/02* (2013.01)

(58) Field of Classification Search
CPC ........ F25J 1/0207; F25J 1/0216; F25J 1/0231; F25J 1/0252; F25J 1/0267; F25J 1/0292; F25J 2210/06; F25J 2220/62; F25J 2220/64; F25J 2245/02; F25J 1/0052; F25J 1/0214; G05B 13/041
See application file for complete search history.

(56) References Cited

U.S. PATENT DOCUMENTS

| | | | |
|---|---|---|---|
| 6,658,891 | B2 | 12/2003 | Reijnen et al. |
| 7,266,975 | B2 | 9/2007 | Hupkes et al. |
| 7,337,022 | B2 | 2/2008 | Wojsznis et al. |
| 7,881,825 | B2 | 2/2011 | Esposito et al. |
| 7,946,127 | B2 * | 5/2011 | Fountain ................ F25J 1/0283 700/282 |
| 8,036,759 | B2 | 10/2011 | Sheth et al. |
| 8,055,358 | B2 | 11/2011 | Blevins et al. |
| 8,255,260 | B2 | 8/2012 | Guldner et al. |
| 9,211,440 | B2 | 12/2015 | Lagree |
| 2007/0245770 | A1 | 10/2007 | Taha et al. |
| 2008/0156037 | A1 | 7/2008 | Van De Graaf |
| 2009/0301131 | A1 | 12/2009 | Bakker et al. |
| 2010/0139317 | A1 | 6/2010 | Chantant et al. |
| 2010/0147024 | A1 | 6/2010 | Roberts et al. |
| 2010/0172745 | A1 | 7/2010 | Hodder |
| 2012/0071991 | A1 | 3/2012 | Peterson et al. |
| 2014/0311183 | A1 | 10/2014 | Van Aken |
| 2015/0168925 | A1 | 6/2015 | Baramov |
| 2016/0018796 | A1 | 1/2016 | Lu |
| 2018/0128543 | A1 * | 5/2018 | Hodges ................ F25J 1/0216 |
| 2018/0356151 | A1 | 12/2018 | Suraganda Narayana et al. |
| 2019/0137955 | A1 | 5/2019 | Fahrenkopf et al. |
| 2020/0215487 | A1 | 7/2020 | Tatuev et al. |

OTHER PUBLICATIONS

Godoy et al., "Tuning Methodology for Industrial Predictive Controllers Applied to Natural Gas Processing Unit", 2016 IEEE Conference on Control Applications (CCA), Sep. 19-22, 2016, pp. 1386-1391.
Hedengren et al., "Overview of Estimation Methods for Industrial Dynamic Systems", Optimization and Engineering, vol. 18, Issue No. 1, Nov. 4, 2015, pp. 155-178.
Joseph, "Closing the Gap Between Planning and Control: a Multiscale Mpc Cascade Approach", Annual Reviews in Control, Nov. 18, 2015, vol. 40, pp. 3-13.
Park et al., "Effects of Varying the Ambient Temperature on the Performance of a Single Mixed Refrigerant Liquefaction Process", Journal of Natural Gas Science and Engineering, 2016, vol. 34, pp. 958-968.
Khan et al., "Knowledge Based Decision Making Method for the Selection of Mixed Refrigerant Systems for Energy Efficient Lng Processes", Applied Energy, 2013, vol. 111, pp. 1018-1031.
Bakker et al., "A Step Change in Lng Operations Through Advanced Process Control", 23rd World Gas Conference, 2006.
AustbØ et al., "Annotated Bibliography—use of Optimization in Lng Process Design and Operation", Computers & Chemical Engineering, 2014, vol. 71, pp. 391-414.
Jong, "Simpls: an Alternative Approach to Partial Least Squares Regression", Chemometrics and Intelligent Laboratory Systems, 1993, vol. 18, pp. 251-263.
Cawley, "On Over-fitting in Model Selection and Subsequent Selection Bias in Performance Evaluation", Journal of Machine Learning Research, Jul. 2010, vol. 11, pp. 2079-2107.
Seborg et al., "Process Dynamics and Control", John Wiley and Sons, 2nd Edition, 2004, 732 Pages.
Crawley, "The R Book", John Wiley & Sons Ltd, 2nd Edition, Nov. 6, 2012, 1060 Pages.
Amrit et al., "Platform for Advanced Control and Estimation (Pace): Shell's and Yokogawa's Next Generation Advanced Process Control Technology", 9th International Symposium on Advanced Control of Chemical Processes, Jun. 7-10, 2015, 5 Pages.

* cited by examiner

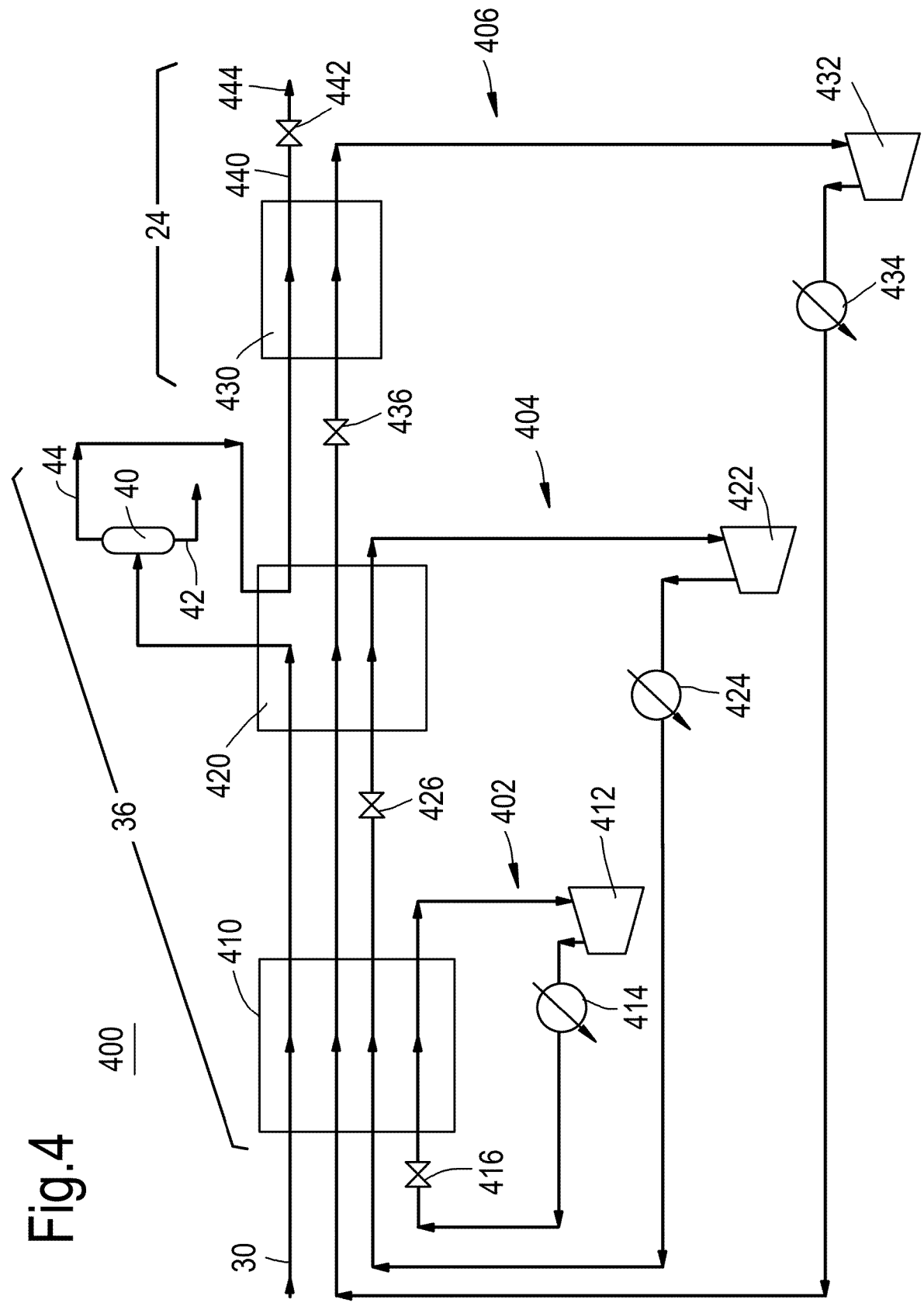

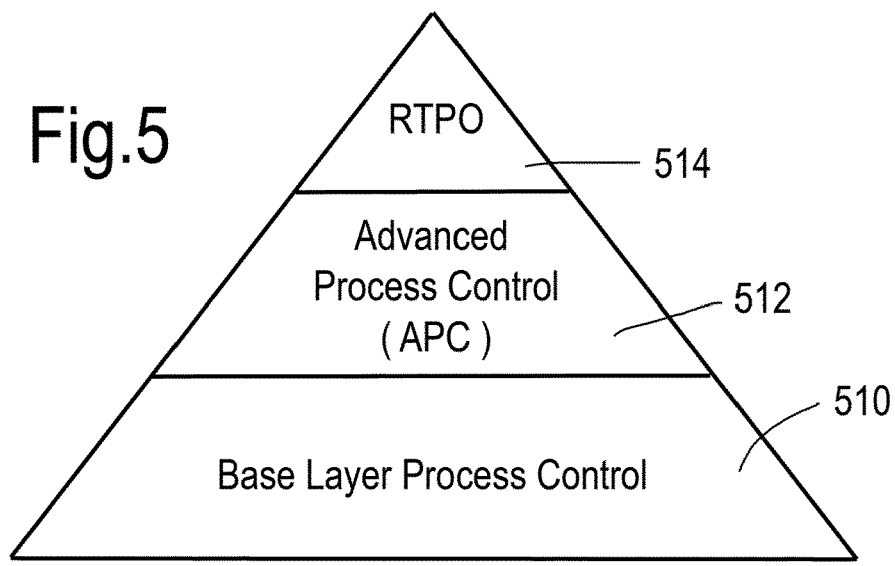
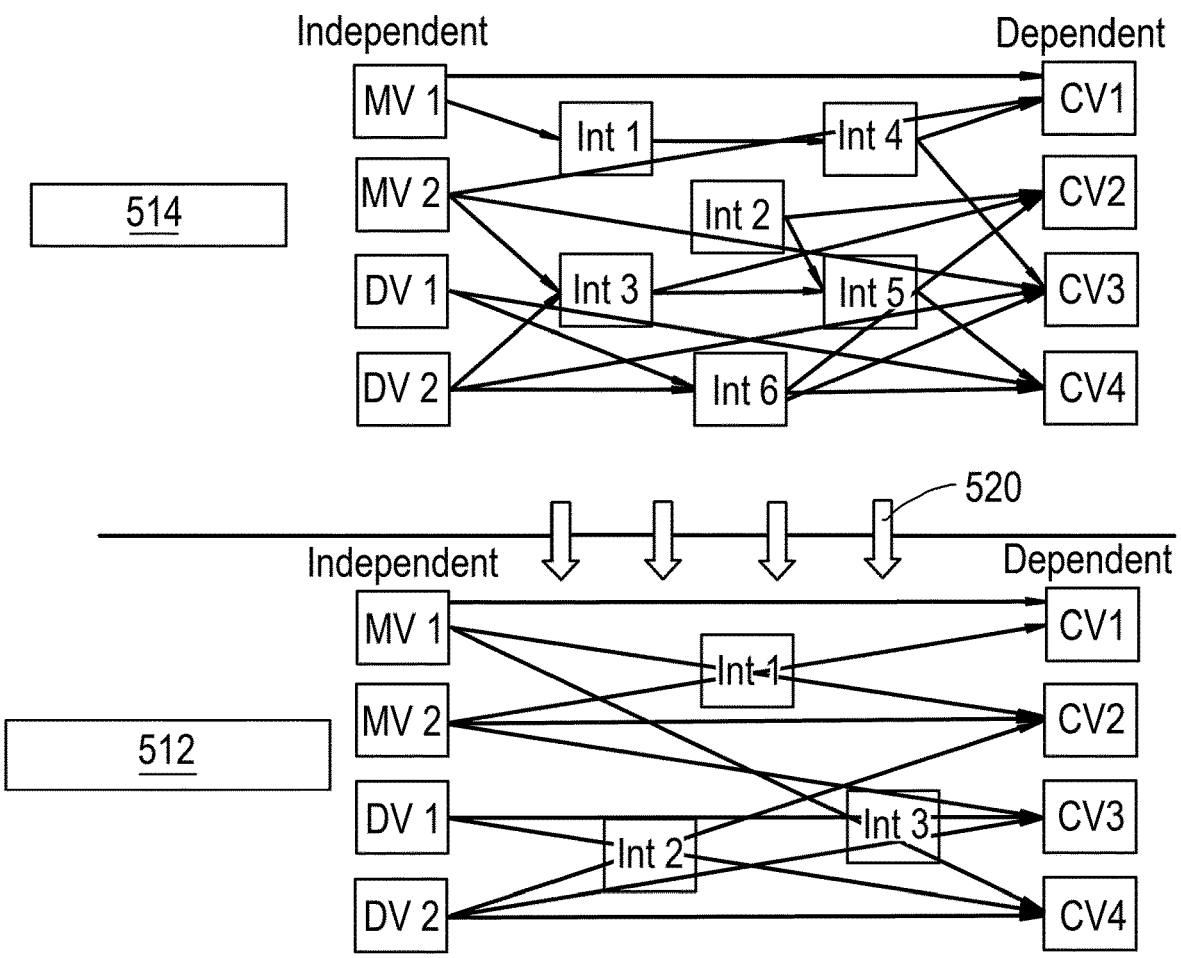

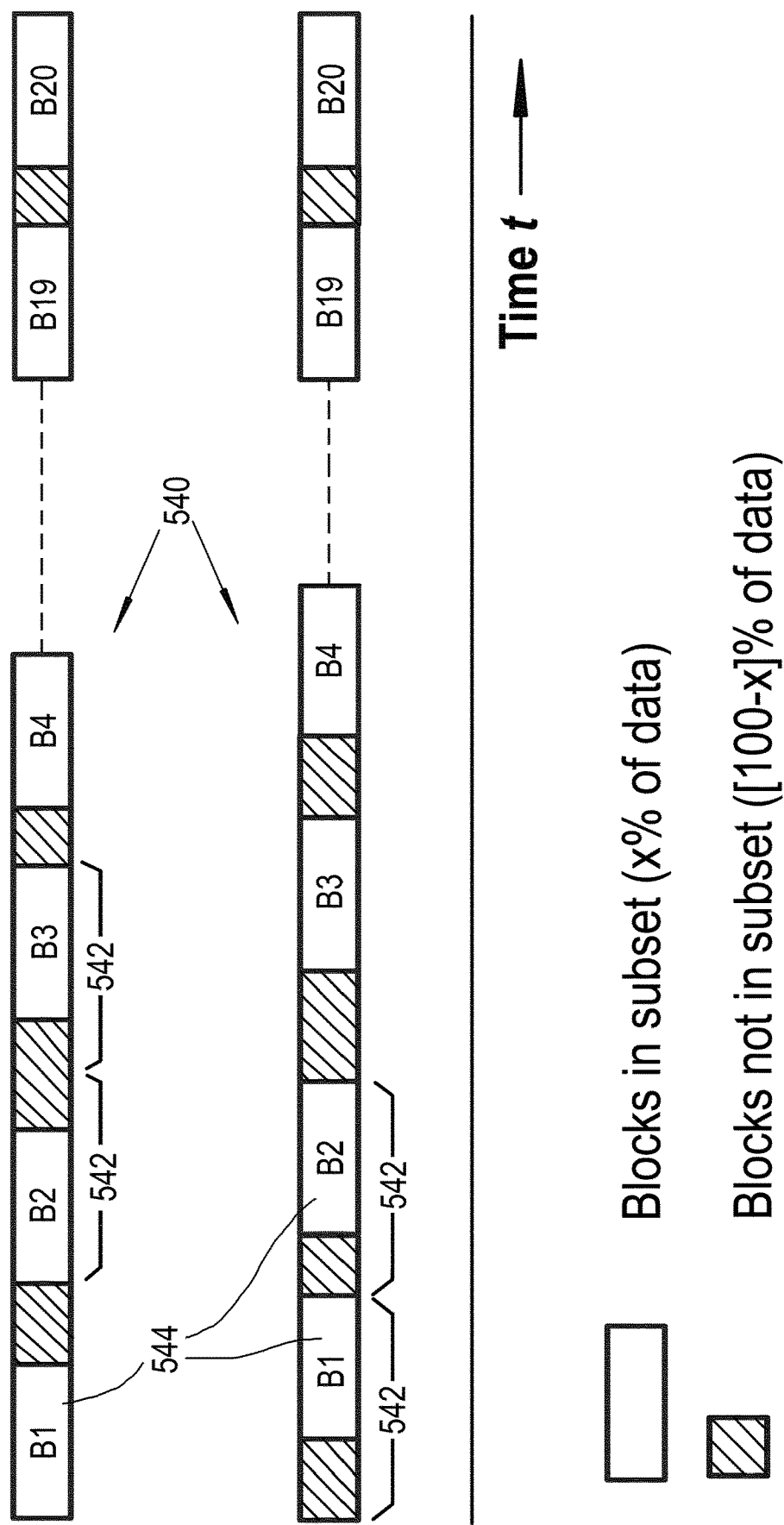

Relation between x1 and y

Influence of x2 on residuals
[$y_{obs}$-f(x1)]

Relation between x1 and y

Influence of x2 on residuals
[$y_{obs}$-f(x1)]

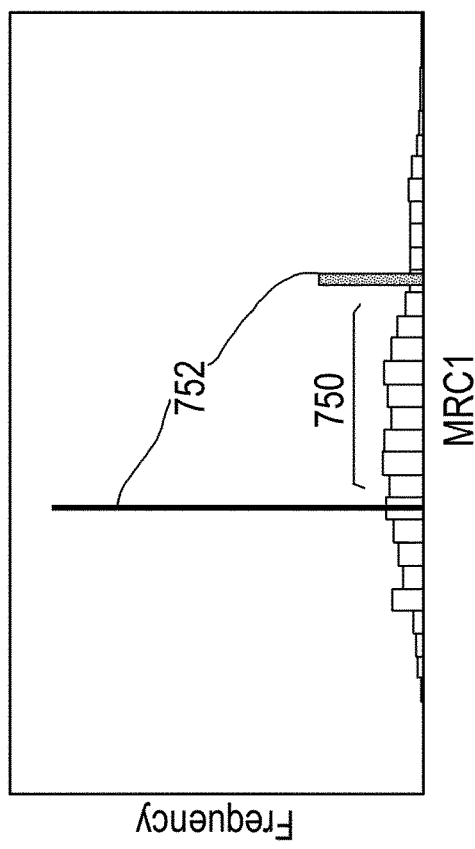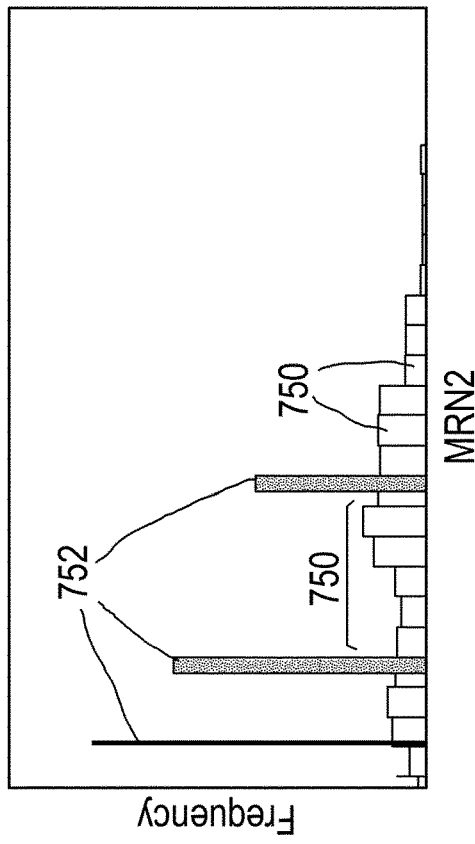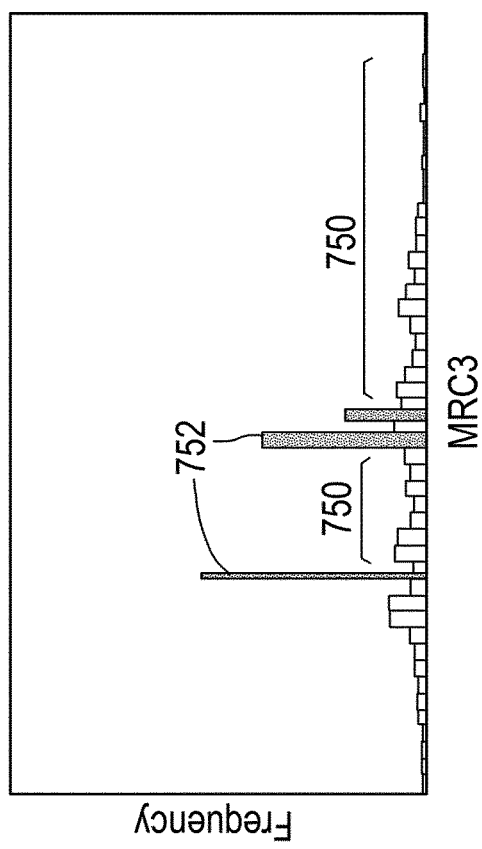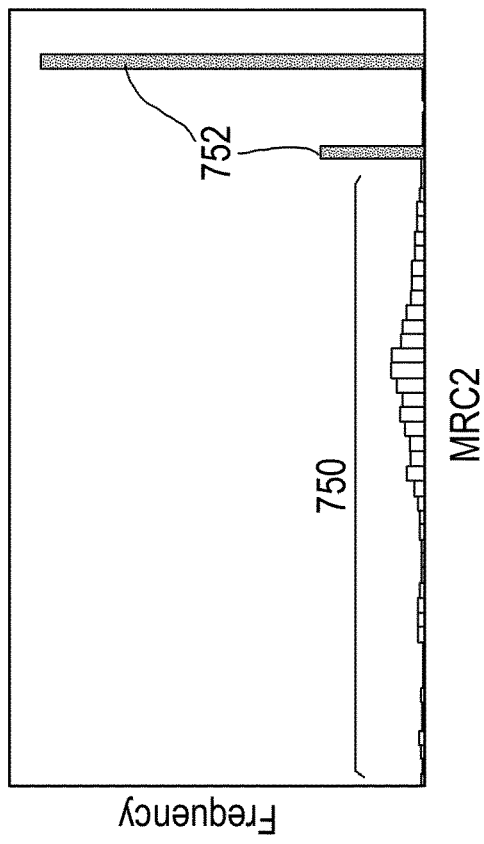

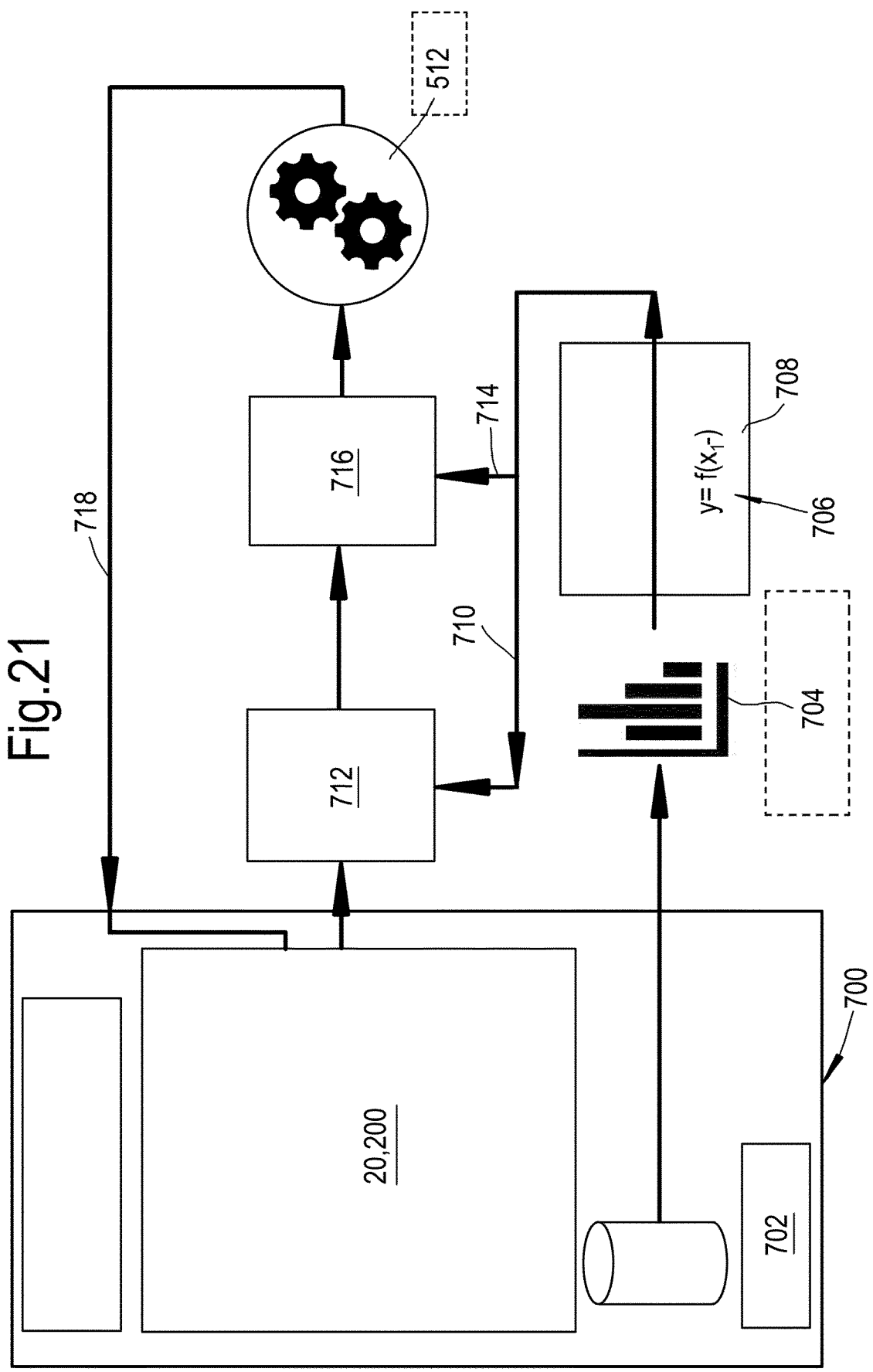

Fig.27

| range | units | | Percentile: | CV1 | | | CV2 | | | CV3 | | | ... | CVx | | |
|---|---|---|---|---|---|---|---|---|---|---|---|---|---|---|---|---|
| | | | | 0.1 | 0.5 | 0.9 | 0.1 | 0.5 | 0.9 | 0.1 | 0.5 | 0.9 | ... | 0.1 | 0.5 | 0.9 |
| 1.5 | mol% | | MV1 | 44 | 80 | 105 | -0.7 | -0.6 | -0.55 | -0.5 | -0.48 | -0.47 | ... | -14 | -12 | -11.5 |
| 4000 | tpd | | MV2 | 0 | 0.08 | 0 | -0.48 | -0.42 | -0.41 | 0.21 | 0.24 | 0.24 | ... | -4.6 | -4.3 | -4.1 |
| 10% | % | | MV3 | 0 | 0 | 0 | 0 | 0 | 0 | 0 | 0 | 0 | ... | 0 | 0 | 0 |
| 20% | % | | MV4 | 22 | 23 | 23.5 | -0.15 | -0.15 | -0.15 | -0.02 | -0.02 | -0.02 | ... | 0.85 | 0.85 | 0.86 |
| 5 | - | | MV5 | 0 | 0 | 11 | 0 | 0 | 0 | 0 | 0 | 0 | ... | 0.3 | 0.5 | 0 |
| ... | ... | | ... | ... | ... | ... | ... | ... | ... | ... | ... | ... | ... | ... | ... | ... |
| 10 | degC | | MVy | -25 | -22 | -12 | -0.05 | -0.03 | 0 | 0 | 0 | 0 | ... | -0.8 | -0.5 | 0 |

METHOD AND SYSTEM FOR PRODUCTION OPTIMIZATION

CROSS REFERENCE TO RELATED APPLICATIONS

This is a National stage application of International application No PCT/EP2021/054280, filed 22 Feb. 2021, which claims priority of EP Application Serial No. 20159211.0, filed 25 Feb. 2020 which is incorporated herein by reference in its entirety.

FIELD OF THE INVENTION

The present invention is directed to a method and system for the optimization of production of an industrial process. The process may be a process for the production of liquefied natural gas. Alternatively, the process may be a process for refining hydrocarbons.

BACKGROUND TO THE INVENTION

Natural gas can be liquefied for purposes of storage and transportation, as the gas occupies a smaller volume as a liquid than in the gaseous state. Liquefaction takes place in an LNG (liquified natural gas) plant, in which a natural gas feed stream is typically first treated (including for instance the removal of contaminants) and subsequently liquefied. The section for liquefaction typically includes one or more heat exchangers to cool the (natural) gas by heat exchange with a refrigerant. Of these heat exchangers, the last heat exchanger for cooling the natural gas to the liquid state is typically referred to as the main cryogenic heat exchanger (MCHE).

Variations in feed gas and ambient conditions pose a challenge for liquefied natural gas (LNG) plants. Different operating strategies can be used to produce the maximum amount of LNG within the constraint of available power. For instance, a propane mixed-refrigerant (C3/MR) is a widely used liquefaction scheme in LNG plants. Herein, the liquefaction circuit comprises a mixed refrigerant (MR) loop and the Main Cryogenic Heat Exchanger (MCHE) together being the heart of the process. The MR loop and the MCHE are the most energy intensive part of the process due to high energy demand for compressing the refrigerant required for liquefaction.

In the LNG business, and specifically for the MCHE, it is common to derive optimal operating conditions using mathematical methods, thermodynamic principles and simulation techniques which are then applied to real time process optimization using a suitable controller.

Kyuangtae et al. (Kyungtae Park, W. W. (2016). Effects of varying the ambient temperature on the performance of a single mixed refrigerant liquefaction process. Journal of Natural Gas Science and Engineering, 958-968) uses a simulation strategy to find the optimal design and operation solution to increase LNG production rate under scenarios of fixed MR composition, available turbine power, changes in ambient temperature and heat transfer coefficient.

Khan et al. (Mohd Shariq Khan, S. L. (2013). Knowledge based decision making method for the selection of mixed refrigerant systems for energy efficient LNG Process. Applied Energy, 1018-1031) uses an Aspen Hysys dynamic simulator to derive a mixed refrigerant compositional flow rate that maximizes exergy.

US20215487 in the name of Sakhalin Energy Investment Company Ltd. discloses control systems and methods of control of the natural gas liquefaction process to produce liquefied natural gas (LNG). The method of control of the natural gas liquefaction process on the mixed refrigerant-operating LNG production plant comprises a periodic measuring of the current parameters of the said process, and controlling composition of the mixed refrigerant entering the main cryogenic heat exchanger, in order to achieve the optimal process parameters. Carnot factor is used as an optimality criterion for parameters of the process. The mixed refrigerant composition is controlled by direct calculation on the basis of the current process parameters and equation of state (for example, Peng-Robinson equation of state) of the substance amount of the mixed refrigerant components.

The research reported in the prior art meets the design criteria but lacks sublime optimization opportunities that may be required to de-constrain the MCHE in real time and gain extra production with the available power. Any liquefaction process has multiple adjustable or manipulatable variables, which can all have a different and sometimes mutually counterproductive effect on LNG production. The prior art lacks a system to optimize production of LNG considering multiple variables in conjunction, inherently resulting in loss of production due to inadequate or delayed response to changes in process variables or ambient conditions.

It is an aim to provide an improved method and system for the optimization of production of liquefied natural gas.

SUMMARY OF THE INVENTION

In one aspect, the present disclosure is directed to a method for optimizing an industrial process, the method comprising the steps of:
 controlling the industrial process using an advanced process control system (APC), the APC system being provided with at least one first model, the at least one first model including a solution vector comprising a first matrix indicating dependencies of at least one control variable (CV) on at least one manipulated variable (MV), the step of controlling comprising:
 obtaining operational data of the industrial process at intervals of a second time period, the first time period being in the order of 1 to 24 hours, the operational data including values of the at least one control variable (CV);
 indicating if the value of the at least one control variable (CV) leaves a predetermined range as indicated in the set of constraints; and
 adjusting at least one manipulated variable (MV) in accordance with the at least one first model to keep the at least one control variable (CV) within the predetermined range;
 improving the advanced process control (APC) system using a production optimization (RTPO) system, the step of improving comprising:
 predicting production of the industrial process during a first time period using the first model, the first time period being at least a month;
 deriving an actual or measured production during the first time period from the operational data;
 comparing the predicted production with the measured production to provide a prediction error;
 if the prediction error exceeds a minimum threshold, checking the operational data over the first time period for correlations between the at least one MV, the at least one CV, and optionally at least one intermediate variable (IV);

analysing the prediction error taking into account the correlations;

filtering the correlations to select the most relevant correlations;

creating a second matrix indicating dependencies of the at least one control variable (CV) on the at least one manipulated variable (MV);

filtering the second matrix to indicate the correlations exceeding a minimum threshold of impact;

modifying the solution vector of the APC system based on the filtered correlations.

In an embodiment, the step of checking the operational data over at least a third time period comprises checking the operational data for correlations between the at least one MV, the at least one CV, and at least one intermediate variable (IV); and the step of creating a second matrix comprises indicating dependencies of the at least one control variable (CV) on the at least one manipulated variable (MV) and on the at least one intermediate variable (IV).

In another embodiment, the solution vector comprises a set of constraints and at least one target setting of the at least one control variable.

The step of modifying the solution vector may include one or more of:

modifying the matrix of the first model; or modifying the set of constraints; or modifying the at least one target setting.

Preferably, the industrial process is a natural gas liquefaction process. Herein, the method may be for optimizing production of the natural gas liquefaction process.

In an embodiment, the step of improving comprises:

building a second model as an empirical model fitted to the process data during the first time period;

developing directions and relationships of the second model;

generating costs of resolving constraints for each MV of the second model;

compare the costs of resolving constraints with the costs of resolving constraints when using the at least one first model;

generate a gap to potential and finalize an optimization strategy;

test the second model to prove or disprove a hypothesis and/or to generate data;

use an outcome of the test to complement the second model;

use the second model to provide recommendations for improvement of the at least one first model;

use the recommendations to conduct step tests in the industrial process to determine an updated first matrix of the first model;

implement the updated first matrix in the APC.

According to another aspect, the disclosure provides a method for optimizing production of a natural gas liquefaction process, the method comprising the steps of:

selecting at least one manipulated variable (MV) for controlling the liquefaction process;

selecting at least one control variable (CV), the at least one control variable at least comprising liquefied natural gas (LNG) throughput;

providing at least one model, each model providing a dependency of the at least one control variable (CV) on the at least one manipulated variable (MV);

using the at least one model to estimate LNG throughput for at least one of the manipulated variables (MV);

obtaining process data from the liquefaction process, the process data at least including observed values of LNG throughput;

for combinations of the at least one manipulated variable and the at least one control variable, testing the interdependency thereof;

creating a gain matrix based on said interdependencies; and using the gain matrix to optimize a process control system of the liquefaction process.

In an embodiment, the method comprises the steps of:

filtering the gain matrix by removing combinations of the at least one manipulated variable and the at least one control variable which fail to exceed a predetermined target effect; and using the filtered gain matrix to optimize the process control system of the liquefaction process.

The method may comprise the step of checking residual LNG throughput, residual LNG throughput being a difference between observed LNG throughput and estimated LNG throughput.

In an embodiment, the step of providing at least one model comprises building a model matrix.

In another embodiment, the step of building a model matrix comprises the step of linking the at least one model to the process data.

In yet another embodiment, the step of obtaining process data comprising obtaining process data during a first time period, the first time period being in the order of 1 to 12 months or more.

Optionally, the step of obtaining process data comprises obtaining process data at intervals of a second time period, the second time period being in the order of 1 to 24 hours.

In an embodiment, the step of creating a gain matrix comprises the step of variating each remaining manipulated variable within a range and recording a resulting response of at least one control variable.

In another embodiment, the range is in the order of +/−5%.

In an embodiment, the range comprises substantially an entire range available within operational constraints of the natural gas liquefaction process.

In an embodiment, the step of creating a gain matrix comprises listing, for all interdependencies of the at least one manipulated variable and the at least one control variable, a resulting response for a low, medium and high end (P10, P50, P90) of said range.

The step of creating a gain matrix may comprise keeping a temperature of the liquefied natural gas (LNG) substantially constant.

The method may comprise the steps of repeating the steps of obtaining process data, for all combinations of the at least one manipulated variable and the at least one control variable testing the interdependency thereof; creating a gain matrix based on said interdependencies; checking residual LNG throughput; and filtering the gain matrix, for different:

ambient temperatures;

temperature of the produced liquefied natural gas (LNG); and/or seasonal periods (such as summer, winter, hot, cold, dry, wet, etc.).

In an embodiment, the at least one manipulated variable (MV) comprises one of more of: refrigerant flow, percentage of total refrigerant for respective refrigerant components, ratio of heavy refrigerant to light refrigerant, natural gas bypass flow.

The control variables (CV) may comprise one or more of: compressor power; refrigerant pressure drop across a heat exchanger, compressor surge.

The at least one manipulated variable (MV) may comprise at least 8, 10, 12, 14, or 20 manipulated variables.

The at least one control variable (CV) may comprise at least 5, 6, 7, 8 or 10 control variables.

According to another aspect, the disclosure provides a system for optimizing production of liquefied natural gas, the system being adapted to implement the method as described above.

The system and method of the disclosure enable designing an APC that makes the most optimal trade-offs between various control objectives of the overall liquefaction system or industrial process, in order to safely and sustainably (i.e. within safety constraints of each section and piece of equipment within the liquefaction system or process) maximize production.

BRIEF DESCRIPTION OF THE DRAWINGS

The drawing figures depict one or more implementations in accordance with the present teachings, by way of example only, not by way of limitation. In the figures, like reference numerals refer to the same or similar elements.

FIG. 4 schematically shows an exemplary system for liquefying natural gas using consecutive cooling cycles, each subsequent cooling cycle using another refrigerant having a lower evaporating temperature;

FIG. 5 shows a diagram indicating a system of the present disclosure in relation to conventional systems for controlling a liquefaction system;

FIG. 6 shows a diagram schematically indicating links and dependencies of a multitude of variables;

FIG. 8 shows two examples to divide a subset of process data in several blocks while leaving out a predetermined amount of the data in the subset;

FIGS. 20A to 20D show exemplary diagrams, indicating measured values of molar composition of respective components of a mixed refrigerant, and one or more recommended settings provided by a system and method according to the present disclosure;

FIG. 21 schematically shows an embodiment of a method to implement a system according to the present disclosure;

FIG. 27 shows a schematic example of a gain matrix indicating influence of respective manipulated variables on respective control variables.

DETAILED DESCRIPTION OF THE INVENTION

Figure 1:
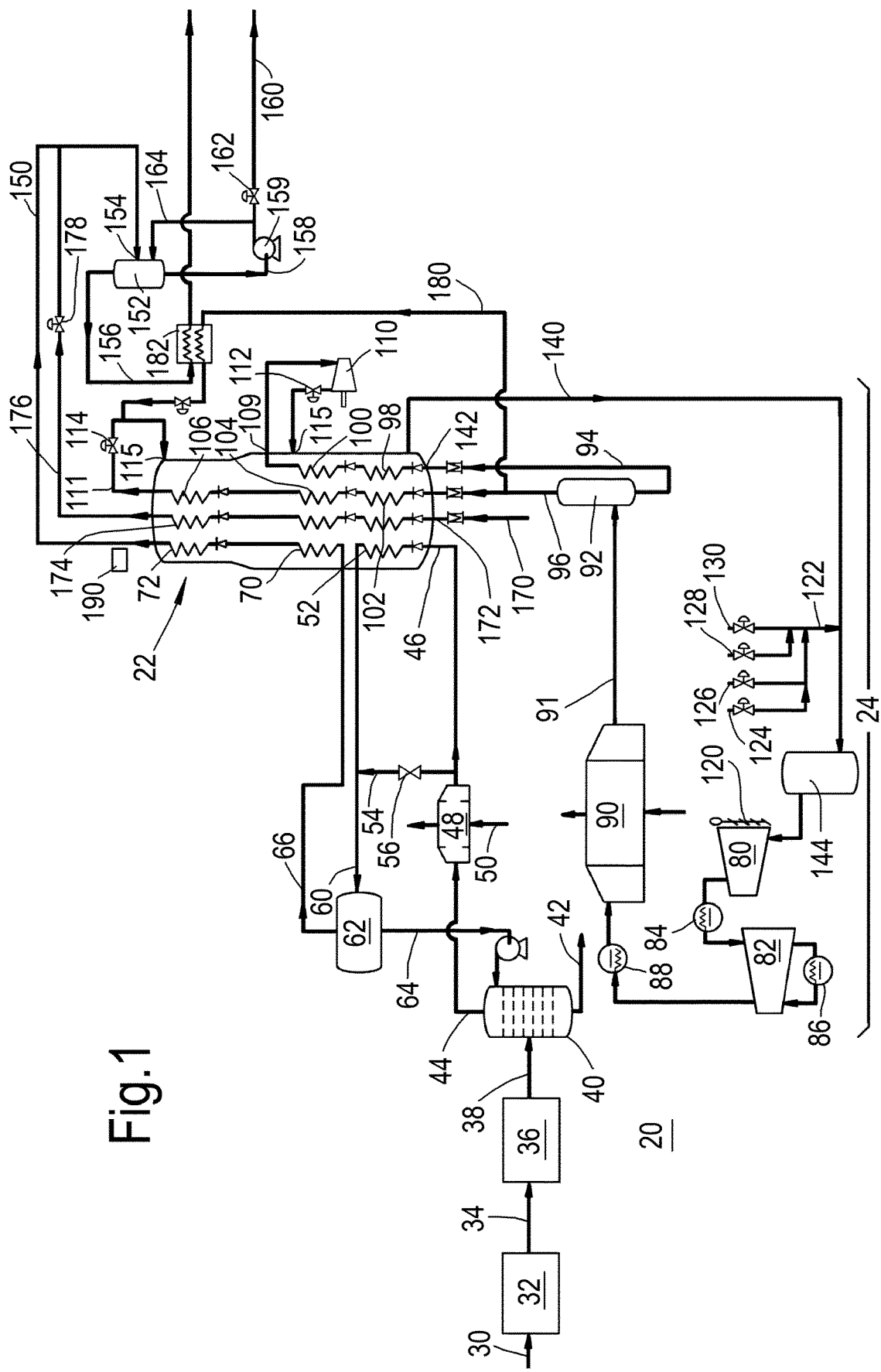
FIG. 1 schematically shows an exemplary system for liquefying natural gas using a mixed refrigerant for cooling.

Certain terms used herein are defined as follows:

"NG" refers to natural gas. Natural gas is a naturally occurring hydrocarbon gas mixture primarily comprising methane, but commonly including varying amounts of other higher alkanes, and sometimes a small percentage of carbon dioxide, nitrogen, hydrogen sulfide, or helium;

"LNG" refers to liquefied natural gas, which is typically cooled to at least a temperature whereat the gas can be in the liquid phase at about 1 bar pressure; for liquefied methane this temperature may be about −162° C.;

"Mixed refrigerant" or "MR" refers to a refrigerant comprised of two or more components. Depending on the stage of the heat exchanger (pre-cooler or main cryogenic heat exchanger), the refrigerant may include components such as methane, ethane, propane, and nitrogen.

"HMR" and "LMR" refer to "heavy mixed refrigerant" and "light mixed refrigerant" respectively, indicating mixed refrigerant separated into light and heavy mixed refrigerant streams, wherein the terms "light" and "heavy" indicate average component weight of each stream relative to each other;

"PMR" may refer to a pre-cool mixed refrigerant, i.e. a mixed refrigerant used in a pre-cool circuit of a liquefaction system;

"Bar" is a metric unit of pressure, defined as equal to 100 kPa. "Bar(a)" and "bara" are sometimes used to indicate absolute pressures and "bar(g)" and "barg" for gauge pressures. Herein, "2 barg" is similar to fuller descriptions such as "gauge pressure of 2 bar" or "2-bar gauge".

Natural gas is a general term that may refer to mixtures of light hydrocarbons and optionally other gases (nitrogen, carbon dioxide, helium) derived from natural gas wells. The main component of natural gas is methane. In addition to methane, natural gas may comprise higher hydrocarbons, such as ethane, propane and butane. In some cases (small) amounts of heavier hydrocarbons may be comprised in the natural gas, often indicated as natural gas liquids or condensates. When produced together with oil, the natural gas may be referred to as associated gas. Other compounds that may be present as contaminants in natural gas in varying amounts include carbon dioxide, hydrogen sulphide, and aromatic compounds.

Different liquefaction schemes are known, such as C3MR, SMR (single mixed refrigerant), DMR (double mixed refrigerant), or cascade-based liquefaction processes. Many of these schemes comprise a coil wound heat exchanger, typically the main cryogenic heat exchanger, in which a substantial part of the cooling of the natural gas takes place. Suitable coil wound heat exchangers are commercially available from a variety of vendors, including Air Products and Chemicals Inc. (APCI), Pennsylvania (USA), and Linde AG (Germany).

FIGS. 1 to 4 provide exemplary process schemes of the liquefaction processes referenced above. Although many variations, modifications and combinations are conceivable in the process schemes as indicated, the FIGS. 1 to 4 and the respective description thereof following herein below allow to provide examples of variables to be controlled using a system and method of the present description.

In a C3-MR process, the refrigerant used for the pre-cooling heat exchanger is mainly propane and the refrigerant used for the main cryogenic heat exchanger is a mixed refrigerant. In a DMR process, typically, the refrigerant used for the pre-cooling heat exchanger is a first mixed refrigerant and the refrigerant used for the main cryogenic heat exchanger is a second mixed refrigerant.

FIG. 1 schematically depicts an exemplary system and associated method for liquefying a gas, such as natural gas. The system of FIG. 1 may typically use a C3MR or DMR liquefaction process. The system is described for reference purposes to various levers of control. Herein, please note that various changes to the scheme of FIG. 1 are conceivable. Also, several types of gas treatment can precede the scheme of FIG. 1. Various other types of equipment can be added to further process the liquefied gas provided by the scheme of FIG. 1, such as a nitrogen removal section or additions to the end-flash section.

The main cryogenic heat exchanger (MCHE) and the associated mixed refrigerant loop are the heart of an LNG liquefaction plant. FIG. 1 shows an schematic representation of an exemplary liquefaction train 20 including an example of a main cryogenic heat exchanger (MCHE) 22 and corresponding mixed refrigerant (MR) loop 24. Please note that the description is meant to indicate levers of control. With respect to equipment and interconnections between equipment, many variations are conceivable in the setup shown in FIG. 1.

In the system of FIG. 1, a feed gas 30 is supplied to a gas treatment section 32. In the treatment section 32, the feed gas 30 is pre-treated, for instance to remove contaminants, such as one or more of acid gas, mercury, water, mercaptans, etc.

Pre-treated gas 34 may be provided to a pre-cool section 36. In the pre-cool section 36, the pre-treated gas is cooled to a predetermined pre-cool temperature $T_{precool}$.

Pre-cooled gas 38 may be provided at a predetermined, elevated pressure to scrub column 40 or similar treatment equipment such as a cold flash unit. In the scrub column 40, hydrocarbons heavier than methane (also referred to as C2+) may be removed from the gas stream 38. The heavy hydrocarbons 42 may be withdrawn from the bottom of the scrub column 40. Gaseous overhead stream 44 typically has a higher methane concentration than the gas stream 38. The gaseous overhead stream 44 may be withdrawn from a top of the scrub column 40 through a suitable conduit.

Please note that other setups are also conceivable. For instance, natural gas liquids (NGL) including C2+ components may be removed in the pre-treatment section 32. If so, the vessel 40 may be a relatively simple cold flash vessel or separator vessel.

The gaseous overhead stream 44 is provided to a process stream inlet 46 of the MCHE 22. A heat exchanger 48 may be arranged between the inlet 46 and the column 40 for cooling the process stream 44. Herein, settings of the column 40 can be used to control the composition of the process stream 44. Composition herein relates, for instance, to the methane content which may typically be in the range of 80 to 100% by volume. The heat exchanger 48 can be used to control the temperature of the process stream 44 at the inlet 46 of the main heat exchanger 22. For instance, the heat exchanger 48 may cool the process stream 44 to at least partly condense the process stream. The heat exchanger 48 may cool the process stream 44 by indirect heat exchange with respect to a coolant stream 50. Typically, the coolant 50 may be water or air.

From the inlet 46, at least part of the process stream 44 is guided through a first process stream tube bundle 52. The tube bundle 52 is arranged inside the main heat exchanger 22. Tube bundle 52 may be referred to as the warm bundle or warm process stream bundle.

In an embodiment, at least a bypass portion 54 of the process stream 44 may bypass the warm process stream bundle 52. The flow rate of the bypass portion, and consequently the ratio thereof with respect to the flow rate of the process stream in the warm bundle 52, can be controlled by a suitable flow controller such as a valve 56.

The bypass portion 54 may be recombined with the portion of the process stream that has passed through the warm bundle 52. The recombined process stream 60 can be supplied to a separator 62. The separator 62, which me also be referred to as reflux drum or knock-out drum, separates heavier and lighter components. Heavier components, which may have condensed due to cooling in the tube bundle 52, are included in a bottom stream 64 which may be pumped to the scrub column 40. The lighter components, typically predominantly methane, are provided as overhead stream 66. The overhead stream is provided as process stream to the main heat exchanger 22 for further cooling. Herein, the process stream 66 may be provided to second and third process tube bundles 70 and 72 respectively.

Please note that in an alternative version, the warm process stream bundle 52 (and the associated tube bundles for refrigerant, which are described herein below) can be included in a separate heat exchanger vessel. The associated refrigerant tube bundles may use the same refrigerant, or a different refrigerant. See for instance U.S. Pat. No. 6,370,910.

The refrigerant circuit 24 related to the main heat exchanger 22 comprises, in general, a number of conduits interconnecting various components. The refrigerant circuit comprises, typically, one or more of the following components: a refrigerant compressor, such as first and second compressors 80, 82, one or more intercoolers 84, 86, 88, a refrigerant pre-cooler 90, a refrigerant separator 92, HMR conduit 94, LMR conduit 96, HMR tube bundles 98, 100 arranged within the heat exchanger 22, LMR tube bundles 102, 104, 106 arranged within the heat exchanger 22, HMR expander 110, HMR expansion valve 112, LMG expansion valve 114.

Not shown are distributors for receiving expanded refrigerant from the expansion valves 112, 114. Such distributors may comprise any suitable system for guiding the respective refrigerant streams towards predetermined flow paths for cooling the respective tube bundles 52, 70, 72, 98, 106 etc. inside the heat exchanger 22. Such distributor system may comprise, but is not limited to, one or more of a spray header, fluid distributor, flow header, etc. The selection of distributor system is typically vendor specific, depending on the vendor of the MCHE. Vendors include, for instance, Air Products and Chemicals Inc. (USA), and Linde A.G. (Germany).

One or more of the refrigerant compressors 80, 82 may be provided with adjustable inlet guide vanes 120. In order to achieve all the variations of performance needed, the angle of the vanes near an inlet stage of the compressor can be varied. The ability to change the angle of the inlet vanes allows to achieve a broader range of performance characteristics. The inlet guide vanes can for instance adjust and control the flow rate of gaseous refrigerant flowing into the compressor. For a detailed description of inlet guide vanes, reference is made to, for instance, US-2010/0172745 or US20140311183.

The refrigerant loop 24 may typically include a refrigerant make-up inlet 122. The inlet 122 is typically connected to one or more sources of refrigerant components, for instance a source of liquid nitrogen (N2) 124, methane (C1) 126, ethane (C2) 128 and/or propane (C3) 130. The refrigerant make-up allows control over the composition of the mixed refrigerant.

The mixed refrigerant circuit 24 may comprise a return conduit 140 connected to a warm end 142 of the main heat exchanger 22 for collecting expanded refrigerant. The conduit 140 may be connected to a knock-out drum 144. The knock-out drum 144 is connected to the first compressor 80, to provide gaseous mixed refrigerant to said compressor 80.

The system 20 may include additional components. For instance, a conduit 150 for receiving a liquefied process stream at the cold end of the main heat exchanger 22. The conduit 150 may be connected to a flash vessel 152. The flash vessel, also referred to as end flash system, may include some form of pressure reduction system near a process stream inlet 154 thereof, such as an expander or Joule-Thompson valve (not shown). The flash vessel 152 may provide a gaseous process stream 156 and a liquefied process stream 158. The liquefied process stream may be provided to a pump 159. The pump 159 provides pressurized liquefied process stream 160, typically LNG, for storage and sale. Valve 162 can be provided, to control the flow rate of the liquefied process stream 160. A fraction of the pressurized liquefied process stream 164 may be returned to the flash vessel 152.

As mentioned above, the system 20 may include NGL extraction. Lighter components 170 of the extracted NGL, for instance ethane (C2), may be provided to an additional inlet 172 of the heat exchanger 22 for cooling. Ethane stream 170 may be cooled and liquefied in dedicated tube bundles 174 in the heat exchanger 22. Liquefied ethane 176 can be provided at the cold end of the heat exchanger 22. Valve 178 controls the flow rate of the liquefied ethane. The liquefied ethane can be combined with the stream of liquefied methane 150, for instance downstream of the valve 178 and upstream of the flash vessel 152.

Optionally, a bypass section 180 of the light mixed refrigerant stream 96 may bypass the heat exchanger 22. The bypass section 180 may be provided to heat exchanger 182. Herein, the bypass section 180 of the LMR is cooled by indirect heat exchange with respect to, for instance, the flash gas 156.

Inside the heat exchanger 22, the process stream in process stream tube bundles 52, 70 and 72 exchanges heat with respect to a refrigerant, which is circulated in the refrigerant circuit 24. The refrigerant may be a mixed refrigerant. In the main heat exchanger 22, the methane enriched stream 44 may be first condensed, and subsequently the stream 66 is liquefied. The indirect heat exchange may be with respect to evaporating expanded light mixed refrigerant 115 and evaporating heavy mixed refrigerant 113 at reduced pressure inside the main heat exchanger 22.

Liquefied gas 150 is removed from the main heat exchanger 22. Liquefied natural gas 160 is provided for potential further treatment and storage downstream.

In use, evaporated mixed refrigerant 140 is withdrawn from warm end 142 of the shell side (the inside) of the main heat exchanger 22 through a conduit. The optional knock-out drum 144 may remove liquid refrigerant. Compressor 80 receives and compresses the gaseous mixed refrigerant to a predetermined pressure. Heat of compression is removed from the compressed refrigerant stream using the heat exchanger 84. The nixed refrigerant may be further compressed in the second compressor 82. Herein, heat of compression may be removed by the heat exchangers 86, 88. The heat exchangers 84, 86, 88 may be, for instance, an air cooler or a water cooler.

The cooled compressed multicomponent refrigerant 32 may be passed to heat exchanger 90, or alternatively to a pre-cool heat exchanger inside the pre-cool section 36, for condensing (partial liquefaction).

Condensed and pressurized mixed refrigerant 91 may subsequently be provided to the separator 92. In the separator, the mixed refrigerant is separated in a gaseous overhead stream 96 (also referred to as light mixed refrigerant or LMR) 94 and a liquid bottom stream (also referred to as heavy mixed refrigerant or HMR).

The light mixed refrigerant 94 is passed to the tube bundle 102 in the main heat exchanger 22. In LMR tube bundles 102, 104, the light mixed refrigerant stream 94 is cooled, liquefied and optionally sub-cooled at elevated refrigerant pressure. Liquefied and sub-cooled light mixed refrigerant stream 111 is expanded. The LMR 111 may be expanded by, for instance, passing through an expansion device, such as an expansion valve 114 and/or an expander (not shown). Expanded light mixed refrigerant 115 is passed to the inside or shell side of the main heat exchanger 22, at a cold end thereof. Inside the heat exchanger 22, the expanded light mixed refrigerant 115 evaporates at reduced refrigerant pressure.

Originating from the separator 92, the liquid bottom stream or heavy mixed refrigerant (HMR) 94 is passed through a conduit to the tube bundle 98 arranged in the main heat exchanger 22. In the HMR tube bundles 98, 100, the heavy mixed refrigerant stream 94 is cooled and liquefied at elevated refrigerant pressure. Liquefied heavy mixed refrigerant stream 109 is passed through an expansion device, for instance the expansion valve 112 and/or the expander 110. Expanded liquefied heavy mixed refrigerant stream 115 is provided to a middle section of the inside, or shell side, of the main heat exchanger 22.

In the heat exchanger 22, the expanded liquefied heavy mixed refrigerant 115 can evaporate at reduced pressure. The evaporating mixed refrigerant in the heat exchanger 22, i.e. the light and heavy mixed refrigerant streams 113 and 115 respectively, extracts heat from the process stream passing through the process stream tube bundles 52, 70, 70, but also from the light and heavy mixed refrigerant streams 92 and 94 respectively passing through the LMR tube bundles 102, 104, 106 and the HMR tube bundles 98, 100 respectively.

A pre-cool heat exchanger (not shown) in pre-cool section 36 typically has a corresponding pre-cool refrigerant loop (not shown). If the pre-cool refrigerant is a mixed refrigerant, said refrigerant may be referred to as pre-cool mixed refrigerant (PMR).

The main heat exchanger may comprise additional tube bundles. For instance, some components of the extracted NGL, for instance a stream comprising mainly ethane (C2), may be provided to an additional inlet 172 of the heat exchanger 22. Ethane stream 170 may be cooled and liquefied in dedicated tube bundles 174 in the heat exchanger 22, providing liquefied ethane 176 at the cold end of the heat exchanger 22. The valve 178 allows to control the flow rate of the liquefied ethane 176. The liquefied ethane can be combined with the stream of liquefied methane 150, to allow additional control of the temperature, composition and/or heating value of the LNG 160. These lighter fractions of liquefied methane and ethane make up the bulk of the LNG 160 that is stored and shipped.

The heating value of the LNG may depend on the source of natural gas 30 and on the process that is used to liquefy the gas. The range of heating value can span +/−10 to 15 percent. A typical value of the higher heating value of LNG is approximately 50 MJ/kg or 21,500 BTU/lb. A typical value of the lower heating value of LNG is 45 MJ/kg or 19,350 BTU/lb. The heating value may be expressed in terms of energy per volume, which is known as the energy density expressed in MJ/litre. The density of LNG is roughly 0.41 kg/litre to 0.5 kg/litre, depending on temperature, pressure, and composition. Using the median value of 0.45 kg/litre, the typical energy density values are 22.5 MJ/litre (based on higher heating value) or 20.3 MJ/litre (based on lower heating value).

As described above, the liquefaction system 20 includes the MR loop 24. In use, pre-cooled natural gas 46 enters through the tube side at the bottom of the MCHE 22, for instance at near ambient temperature, and exits at the top as Liquefied Natural Gas 150 at a rundown temperature of, for instance, about −150 to −145 degree C., depending on settings of the advanced control system 12. Liquefaction of the natural gas is achieved by flowing evaporating mixed refrigerant, which is a mixture of, for instance, liquid nitrogen (N2), methane (C1), ethane (C2) and propane (C3), on the shell side of the heat exchanger 22. The shell side herein refers to the inside of the shell of the heat exchanger 22, but outside the tube bundles. The mixed refrigerant is divided into two streams, Light Mixed Refrigerant (LMR) 96 and Heavy Mixed Refrigerant (HMR) 94. LMR provides cooling duty in a top section of the heat exchanger 22. Tube bundles 72, 106 comprised in said top section may also be referred to as the Cold Bundle. HMR provides cooling duty in a middle and bottom section of the heat exchanger 22. Tube bundles comprised in said middle and bottom section may be referred to as Intermediate Bundle 72, 100, 104 and Warm Bundle 52, 98, 102 respectively.

As the mixed refrigerant 140 exits the MCHE 22 in gaseous form, the compressors 80, 82 compress the refrigerant. Subsequently, the refrigerant may be cooled to, for instance, about −33 degree C. Cooling the compressed refrigerant may be done by, for instance, air coolers, propane kettles (for a C3MR process) and/or an MR loop (for a DMR process), represented schematically by the coolers 88, 90. A typical compressor or series of compressors may be designed to deliver up to 100 MW of power.

Figure 2:
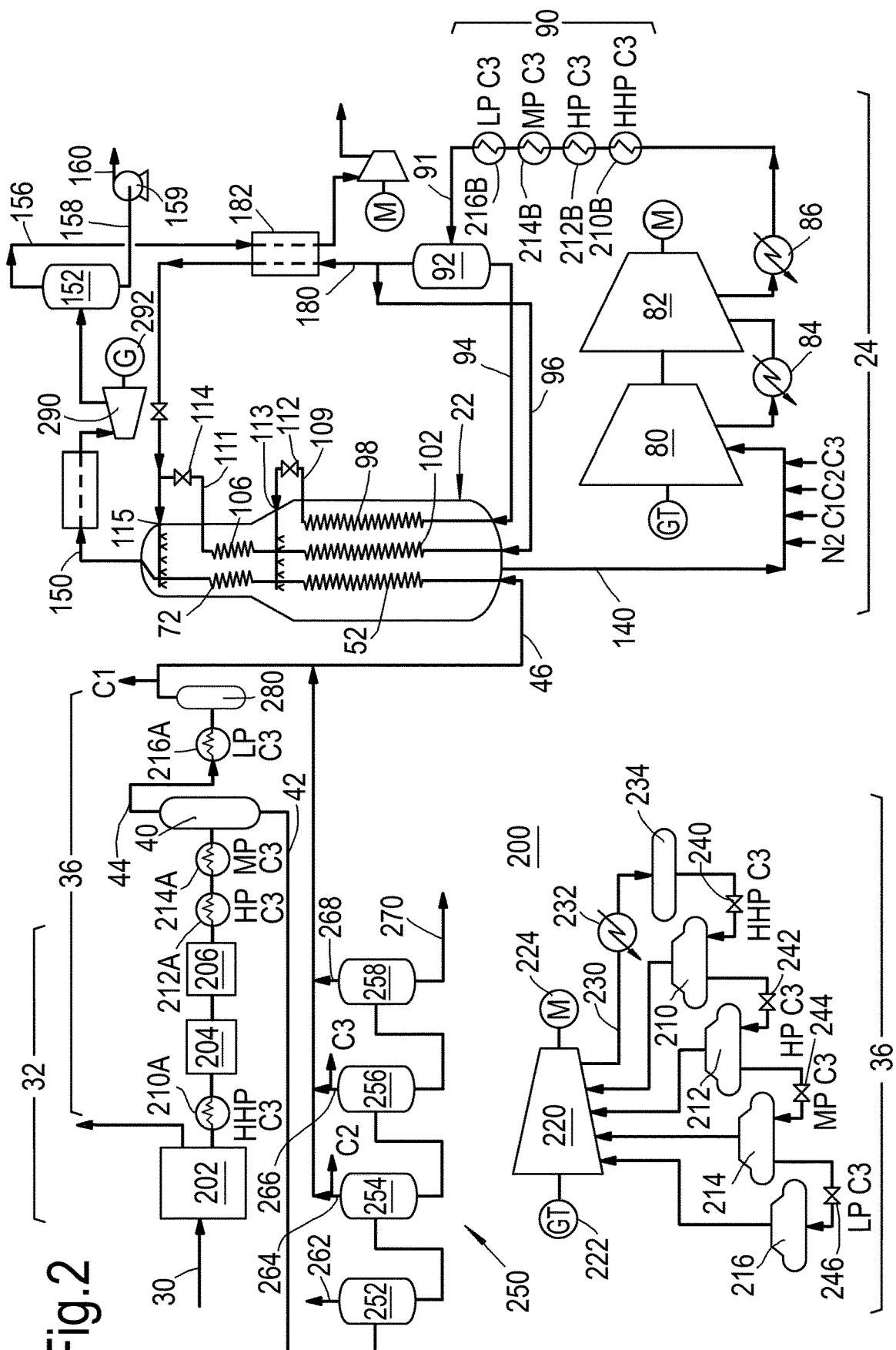
FIG. 2 schematically shows an exemplary system for liquefying natural gas using a propane based precooling cycle and a main cooling cycle using a mixed refrigerant.

FIG. 2 shows another example of a liquefaction system 200. The system of FIG. 2 may be referred to as an example of a C3MR liquefaction system. Herein, the precool section 36 uses propane as precool refrigerant, combined with a main cooling cycle 24 using a mixed refrigerant. The description below will focus on differences with the system of FIG. 1.

The precool section 36 and the gas treatment section 32 may at least partly overlap. The gas treatment section may comprise an amine unit 202, also referred to as an acid gas removal unit (AGRU). Gas treatment may also include water removal unit or dehydration unit 204 and/or mercury removal unit 206.

The precool section 36 may comprise a number of consecutive heat exchangers 210A, 212A, 214A, 216A. The heat exchangers 210A-216A may be arranged in a refrigerant cycle with one or more precool compressors 220. The precool compressor 220 can be, for instance, driven by a gas turbine 222. Also, the compressor may be provided with helper motor 224. The compressor 220 may supply pressurized precool refrigerant 230, such as propane. Heat exchanger 232 may be included to cool or condense the pressurized precool refrigerant. Cooled pressurized refrigerant may be provided to separator or knock-out drum 234 to remove gaseous components. Condensed, liquid precool refrigerant can be provided to the series of heat exchangers 210A-216A. Each heat exchanger 210A-216A can be preceded by respective expander or expansion valve (JT valve) 240-246. After each subsequent valve 240-246, the precool refrigerant evaporates at a reduced pressure with respect to the preceding valve 240-246 and heat exchanger 210A-216A. Typically, the pressure range may be indicates as high-high pressure (HHP) for heat exchanger 210A, high pressure (HP) for heat exchanger 212A, medium pressure (MP) for heat exchanger 214A, and low pressure (LP) for heat exchanger 216A. For propane as precool refrigerant, the lower the pressure the lower the temperature of the evaporating part of the refrigerant in the heat exchangers will be.

The refrigerant cooler 90 of the main refrigerant loop may include similar (similar herein potentially referring to one of equivalent but different units, and the same units) heat exchangers 210B-216B as the precool loop. I.e., the main refrigerant may be directed to refrigerant tube bundles in the series of heat exchangers 210B to 216B for cooling of the refrigerant of the main refrigerant cycle 24. An alternative setup, or a more detailed description, is provided in, for instance, US-2010/0147024.

The heat exchangers 210 to 216 (referring both to series of heat exchangers 210A-216A and 210B-216B) can typically be regarded as kettles or vessels.

In use, the gas stream 30 will be guided through tube bundles in vessels of heat exchangers 210A-216A. Similarly, the main refrigerant may be guided through refrigerant tube bundles in the kettles 210B-216B. The pre-cool refrigerant is typically directed to the shell side of heat exchangers 210A-216A and heat exchangers 210B-216B. The vessels will comprise partly condensed precool refrigerant. So, the shell side of each vessel 210 to 216 (both A and B) will comprise a certain level of part liquid part gaseous propane. The level of the liquid or liquefied precool refrigerant in one or more of the heat exchangers 210A to 216A and/or 210B to 216B can be a manipulated variable for use in the method of the present application.

A fractionation section 250 may comprise a series of separators 252, 254, 256, 258. Each consecutive separator 252 to 258 may remove respective gaseous components 262, 264, 266, 268 from the heavy hydrocarbon stream 42. For instance, first separator 252 removes a predominantly methane comprising stream 262. Stream 262 can, typically, be used as fuel gas. Second separator 254 removes a predominantly ethane (C2) comprising stream 264. Third separator 256 removes a predominantly propane (C3) comprising stream 266. Fourth separator 258 removes a predominantly butane (C4) comprising stream 268. Remainder bottom stream 270 typically comprises condensate, for instance mostly liquid hydrocarbons (C5+). Stream 270 can be forwarded to storage, for separate shipping and sale.

One or more of streams 262 may, at least partly, be reinjected in the process stream 46 to be provided to the main heat exchanger 22 for condensation and liquefaction. Thus, in the example of FIG. 2, the composition of the process stream is conditioned before the process stream enters the main heat exchanger 22, instead of thereafter as in the example of FIG. 1.

An additional separator 280 may be arranged in the flow path of the process stream, to control the methane content of the process stream 46.

The system 200 may comprise an expander 290 coupled to a generator 292. The expander receives the cooled process stream 150 and expands the cooled process stream, thereby driving the generator 292 which generates electricity.

The method and system described herein are similarly applicable to other liquefaction processes. Another liquefaction process including a mixed refrigerant loop for cooling the MCHE is the double mixed refrigerant process (DMR). For a detailed description of the DMR system and process, reference is made to, for instance, patent publications U.S. Pat. No. 6,370,910 or 6,658,891.

Figure 3:
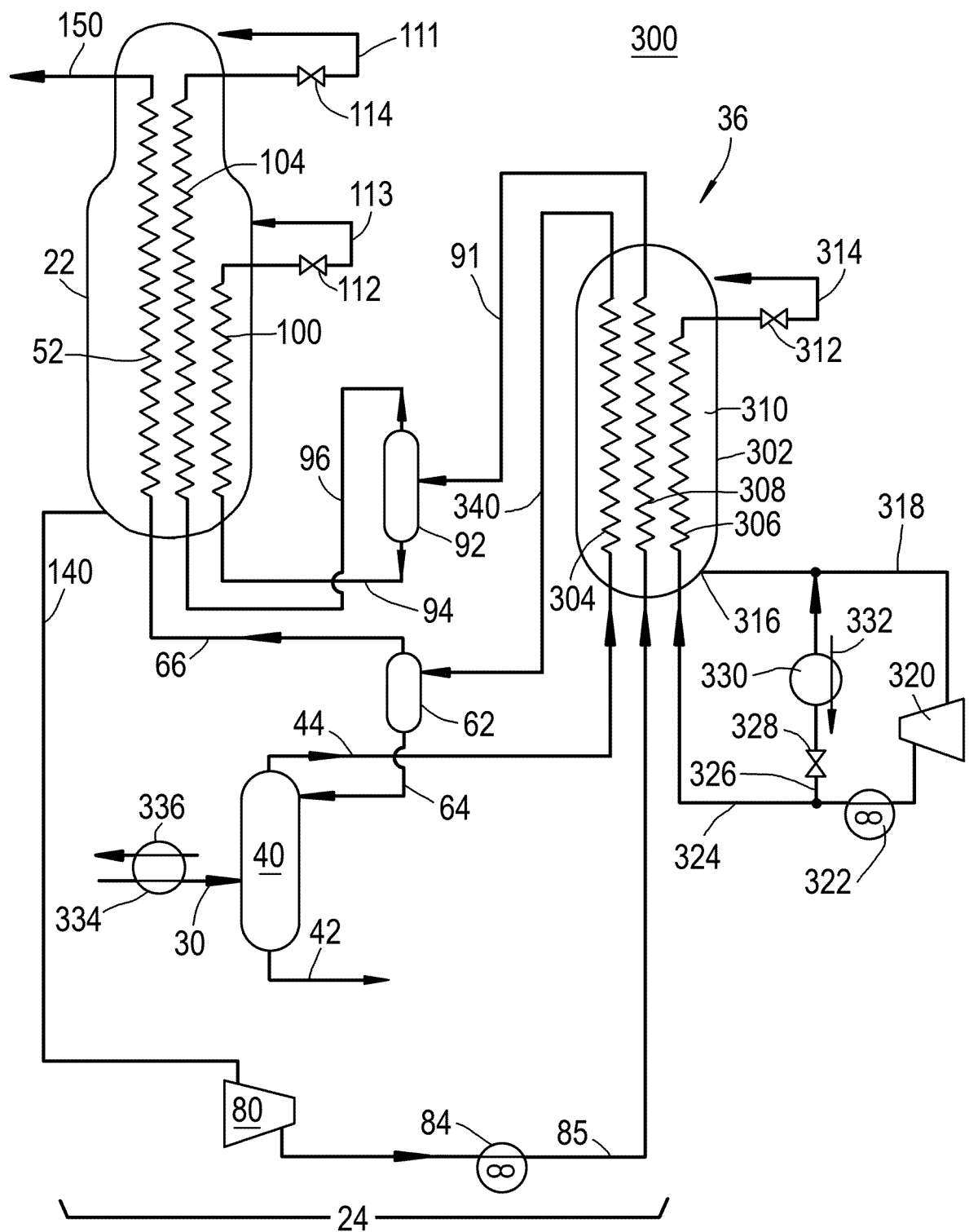
FIG. 3 schematically shows an exemplary system for liquefying natural gas using a pre-cooling cycle partly integrated with a main cooling cycle using a mixed refrigerant.

FIG. 3 shows another example of a liquefaction system 300. Herein, the main refrigerant loop 24 may, in part, extend through a heat exchanger 302 of the pre-cool section 36, for pre-cooling the refrigerant of the main MR loop 24. See for a more detailed description, for instance, U.S. Pat. No. 6,370,910 or 6,658,891. Please note that there may be differences between respective liquefaction systems, as shown for example in FIGS. 1 to 4, for instance with respect to thermodynamics, pressure ranges, temperature ranges, and flow rates at various locations in the system during operation, equipment sizes, maximum capacity, etc. Despite these potential differences, for simplicity, equipment parts with substantially the same function have been annotated with the same reference number throughout FIGS. 1 to 4.

The system 300 may comprise, for instance, the pre-cool heat exchanger 302, which may be provided with tubes process stream tube bundle 304, pre-cool refrigerant tube bundle 306, and potentially main refrigerant bundles 308. Said tube bundles extend through a shell side 310 of a vessel of the heat exchanger 302. The pre-cool refrigerant tube bundle 306 may be connected to an expansion device 312, such as a Joule Thompson valve and/or expander, for providing expanded pre-cool refrigerant 314. The expanded pre-cool refrigerant may be provided to the shell side 310 of the heat exchanger to evaporate and thereby cool the respective tube bundles 304, 306, 308. Herein, the product streams in the respective tube bundles may be at least partially condensed. At a bottom outlet 316 of the heat exchanger 302, evaporated pre-cool refrigerant 318 may be recollected and forwarded to a pre-cool compressor 320. Compressed pre-cool refrigerant may be cooled, by cooler 322. Cooled pre-cool refrigerant can be provided to the pre-cool refrigerant tube bundle 306.

The pre-cool section 36 may, in addition, comprise a feedback loop 326 for the pre-cool refrigerant. The feedback loop may comprise an expansion device 328, typically a JT valve, and a heat exchanger 330. The heat exchange may exchange heat with process stream 332. The process stream 332 may be the natural gas process stream 30. Similarly, the natural gas process stream may be routed via a heat exchanger 334, for heat exchanging versus process stream 336. Said process stream 336 may be the feedback refrigerant stream 326.

In operation, both pressurized and cooled MR stream 85 and the gaseous overhead stream 44 may be routed via the pre-cool heat exchanger 302. In operation, a cold, upper end of the heat exchanger 302 provides pressurized and pre-cooled MR stream 91 and pre-cooled natural gas 340. Herein, the pre-cooled refrigerant 91 and/or pre-cooled natural gas 340 may be at least partially condensed.

FIG. 4 shows yet another example of a liquefaction system 400. The system may be referred to as Optinized Cascade® Process, marketed by ConocoPhillips® (US).

The Optimized Cascade process 400 is based on three multi-staged, cascaded refrigerant circuits 402, 404, 406. Each refrigerant circuit may use pure refrigerants, brazed aluminum heat exchangers and insulated cold box modules. Pure refrigerants of propane, ethylene and methane may be utilized in the cascaded refrigerant circuits 402, 404, 406 respectively. The physical properties of said refrigerants are suitable for heat integration, enabling to match the natural gas and refrigerant cooling curves.

First refrigerant circuit 402 may comprise, at least, a first heat exchanger 410, a first compressor 412, a first cooler 414, and a first expansion valve 416.

Second refrigerant circuit 404 may comprise, at least, a first heat exchanger 410, a first compressor 412, a first cooler 414, and a first expansion valve 416. The second refrigerant of the second refrigerant circuit may be routed via both the first heat exchanger 410 and the second heat exchanger 420.

Third refrigerant circuit 406 may comprise, at least, a third heat exchanger 430, a third compressor 432, a third cooler 434, and a third expansion valve 436. The third refrigerant of the third refrigerant circuit may be routed via the first heat exchanger 410, the second heat exchanger 420 and the third heat exchanger 430.

The natural gas 30 may be routed via the first heat exchanger 410, the second heat exchanger 420 and the third heat exchanger 430. The NGL extraction section, comprising for instance the scrubber 40, may be arranged in connection with the second heat exchanger 420. At least part condensed natural gas 440 may be routed via an expansion device 442, to provide expanded and further cooled natural gas 444. The further cooled natural gas 444 may be stored, or routed via a separator to separate potentially remaining gaseous components from the liquified natural gas.

Advanced Process Control (APC) and Real Time Optimization (RTO) are standard tools applied to stabilize and optimize complex processes in real time (Seborg, D. E., Edgar, T. F., & Mellichamp, D. A. (2004). Process Dynamics and Control, 2nd Edition. John Wiley and Sons). Note that although the term Real Time Optimization is commonly used in the industry, we will use the term Real Time Production Optimization (RTPO) here, given the focus on production (of LNG), as opposed to an economic objective function that is often applied in RTO.

In simplified form, the system and method of the disclosure can be described as follows. An APC controller and a Real Time Production Optimizer (RTPO) lie at the apex of the automation pyramid shown in FIG. 5. Typically, a liquefaction train includes a base layer process control system 510. The base layer process control may also be referred to as, or include, a distributed control system (DCS). Advanced Process Control system 512 can be connected to the base layer control system 510 to optimize certain variables. An example of how an APC system 512 can control the base layer control system, how the APC and DCS are connected, can be found in, for instance, U.S. Pat. Nos. 7,266,975 and 6,272,882. The APC system can control and optimize certain variables in real time. The APC system may instruct to adjust one or more of the variables, for instance if boundary conditions change. Boundary conditions herein may include, but are not limited to, weather conditions (such as ambient temperature), supply of natural gas, composition of the feed gas, etc.

The APC system 512 uses a solution vector to decide whether to adjust certain process variables. Many of these process variables are on a lower level controlled by the base layer process 510. The APC controls the base layer process, which in turn controls the variables and the liquefaction process.

The real time production optimization system 514 (RTPO) in turn can provide an output allowing to optimize the solution vector as implemented in the APC system 512. Said implementation may be real time, offline, or at periodic intervals. The interface between the RTPO system 514 and the APC system 512 can be implemented for both offline and online operation. The improved solution vector can be implemented in the APC system, which in turn uses the improved solution vector to adjust manipulatable variables (MV) aiming to control certain control variables (CV). Proper implementation of the RTPO system results in increased production of LNG.

Herein below, first the system and method of the present disclosure will be described in more detail, followed by an example of application on a liquefaction process and yet more detail of specifics how to arrive at best outcomes.

Most commonly, advanced process control (APC) uses dynamic linear multi-input, multi-output process models for closed loop predictive control that stabilizes complex processes by simultaneously manipulating and controlling several interactive variables. APC models predict changes in the dependent variables due to changes in the independent variables. The APC models may be referred to herein as at least one first model. The independent variables are commonly referred to as Manipulated Variables (MVs) and Disturbance Variables (DVs). The dependent variables are commonly referred to as Control Variables (CVs). A special type of dependent variables other than CVs are referred to as Intermediate Variables (IVs). IVs are dependent variables that are used as inputs in the model to other downstream dependent variables. Variation of all handles (MVs) may be restricted to ranges previously observed in historical operating data, to keep operation stable.

Typical examples of Manipulated Variables (MV) are the flow rate and the composition of the mixed refrigerants. Other manipulated variables include the level of propane in the respective C3 precooling kettles.

Manipulated Variables may include, but are not limited to, one or more of:
1. HMR flow to MCHE (e.g. controllable by inlet valve);
2. LMR flow to MCHE (e.g. controllable by inlet valve);
3. MR—N2 component ([%])
4. MR—C1 component ([%]);
5. MR—C2 component ([%]);
6. MR—C3 component ([%]);
7. IGV (inlet guide vane) opening of low pressure (LP) MR compressor 80 ([%]; typically ranging from fully open to partly closed);
8. HMR/LMR ratio of flow rate in MCHE 22;
9. PMR—C1 component ([%]; for a DMR process);
10. PMR—C2 component ([%]; for a DMR process);
11. PMR—C3 component ([%]; for a DMR process);
12. PMR flow in line 326 (FIG. 3);
13. PMR flow in line 324 (FIG. 3).
14. Refrigerant level (liquid level) in one or more of heat exchangers 210-216 (including A and B series) (See FIG. 2).
15. Flow rate of one of the refrigerants (in loops 402, 404, 406; see FIG. 4).
16. Temperature of refrigerant near an entrance or exit of one of the heat exchangers.
17. Liquid level or pressure in gas separator (for instance separator 62 in FIG. 1; separator 40 in FIG. 4).

Which of the above manipulatable variables is, in fact, available depends, for instance, on the type of liquefaction system. For each liquefaction system as shown in FIGS. 1 to 4, a number of MVs from the above list may be available. Relevance of available MVs can subsequently be determined using a method according to this disclosure, as described in more detail below.

Examples of Disturbance Variables (DV) are, for instance, ambient temperature, humidity, wind speed, wind direction, and composition of natural gas feed stream 30. Other disturbance variables may include demethanizer overhead flow and temperature, NGL flow (stream 42). DVs may be treated as given for the optimization model of the present disclosure. Values for DVs can be obtained from historical data for each time stamp.

Control Variables can be considered as controllable objectives. Some of the CVs may be manipulated variables, which however also provide constraints to the process, effectively setting boundary conditions or thresholds for stable or safe operation (and as such also being a Control Variable). Control Variables may include, but are not limited to, one or more of:

1. LNG flow from MCHE (or LNG throughput);
2. Run-down temperature of LNG (e.g. the temperature of liquefied gas exiting the main heat exchanger);
3. Total power consumption of MR compressor (compressors 80, 82). Power consumed by the MR compressor(s) typically has an upper limit, set by the available power from a driver, such as a gas turbine and/or an electric motor. For instance, MR Power≤MR GT Power (in MW) [F(T)]+Max. MR Helper Motor Power (this upper threshold may be, for instance, in the order of 10 to 15 MW);
4. Power available for pre-cool compressor 320;
5. MR Mass Flow (in [kg/s]; for instance, measured between line 140 and line 91). An upper limit of total MR mass flow through the heat exchanger 22 may be dependent on (ambient) temperature, and have been derived from vendor specifications and operational data.
6. Suction pressure of MR compressor 80. Preferably, the suction pressure is between an upper and a lower threshold. The lower threshold may be in the order of 2 bar(g); the upper threshold may be in the order of 3-3.5 bar(g);
7. Inlet temperature of the stream entering the HMR expansion device 110, 112;
8. Inlet temperature of the stream entering the LMR expansion device 114;
9. MR exit temperature from MCHE 22, i.e. MR temperature in line 140;
10. PMR temperature in line 324;
11. Temperature in the MR Separator 92;
12. Upper and lower limits to the HMR/LMR ratio in the MCHE (these upper and lower limits for the ratio of HMR and LMR flows in the heat exchanger 22 typically are temperature dependent (ambient temperature) and have limits have been derived from operational data over time);
13. C1 content in the PMR—equal to or less than an upper threshold for methane (the upper threshold being in the order of, for instance, 2.5 to 5 mol %);
14. C2 content in the PMR—equal to or less than an upper threshold for ethane (the upper threshold being in the order of, for instance, 75 to 85 mol %);

Examples of Intermediate Variables (IV) are, for instance, temperature of natural gas along any of the tube bundles in the main heat exchanger 22, or potentially any other temperature of a process stream anywhere in the process.

Temperature along the heat exchanger 22, or temperature of any stream along any other heat exchanger in the system, may be determined using, for instance, temperature sensors located near one or more of the respective inlets and outlets of the heat exchanger. Locations of the sensors may be vendor specific, for respective equipment such as the main heat exchanger. Sensors may measure temperature of the process stream, and flow rate. Temperature "along the bundle" may be calculated or estimated, based on inlet and/or outlet temperatures of the process flow in the respective bundle.

The use of IVs facilitates building of grey-box modes within the APC which allows more engineering knowledge to be embedded in the controller (Amrit, R. et al. (2015). Platform for Advanced Control and Estimation (PACE): Shell's and Yokogawa's Next Generation Advanced Process Control Technology. 9th International Symposium on Advanced Control of Chemical Processes. Whistler, BC, Canada: International Federation of Automatic Control (IFAC)).

APC dynamic models are derived from plant data via step testing. The dynamic models are then used to compute moves of the APC controller based on the current dynamic state of the plant (the prediction of where all the dependent variables are going) and the targets and limits of the Control Variables (CVs). Due to the feedback process, APC controllers in practice are robust to inaccuracies inherent in the use of simplified linear models. APC controllers can also be used to drive simple optimization objectives, such as to maximize throughput. In Applicant's operations, Advanced Process Control has been applied to control the MCHE and refrigerant loop since the 2000s. See, for instance: 1) Hupkes, W., Lin, P., Silve, R., & Vink, K. (2004), Process of liquefying a gaseous, methane-rich feed to obtain liquefied natural gas; 2) U.S. Pat. No. 7,266,975; 3) U.S. Pat. No. 6,272,882; 4) Alers, P., & van Dijk, F. (2010), Method of cooling a hydrocarbon stream and an apparatus therefor: 5) Den Bakker, K., Dejsupa, B., Beeby, C., Azodi, F., & Silve. (2006), A Step Change in LNG Operations through Advanced Process Control, 23rd World Gas Conference, Amsterdam.

For more complex processes, optimization models are required to capture key interactions, including nonlinearities, between the inputs (manipulated and disturbance variables) and outputs (controlled variables) of the process. Complex processes herein include processes having significant nonlinearities, such as energy costs or varying economics (i.e. varying market price) of products (such as LNG, NGL and condensate).

A significant number of Real Time Optimizers have been utilized for both upstream production (wells) and downstream manufacturing plants (Cramer, R., Stoever, M., Mehrotra, S., Berendschot, L., & Goh, K. (2013), Upstream/Downstream real time surveillance and optimization systems, two sides of the same coin, or never the twain shall meet, SPE Digital Energy Conference (pp. SPE-163710-MS), The Woodlands, Texas: SPE). Presently, data driven models have been proven more economical and sustainable for upstream (Briers, J., Goh, K., Sniekers, A., Schotanus, D., Hofland, J., & Adun, D. (2016), Looking Back 2006-2016—Ten Years of Data Driven Well Rate Estimates for Real-Time Surveillance and Optimization, SPE Intelligent Energy International Conference and Exhibition. Aberdeen, UK: Society of Petroleum Engineers). However, for more complex processes in downstream manufacturing, "White Box" or "Grey Box" models have predominated, with "Black Boxes" being used for Reactor Models (Onstott, B., & Linn, R. (2000). ROMeo Provides State-of-the-Art Optimization, World Refining, November 2000).

Historically, creating a model suitable for RTO for the MCHE or Mixed Refrigerant Loop in LNG has had limited success. This is, for instance, partly due to one or more of the large numbers of interacting inputs and outputs required for any real time optimization (RTO) model, the complexity of modelling the MCHE in the mixed refrigerant liquefaction process, and developing a high-fidelity plant data rated model. Consequently, it was uncertain whether there was any opportunity to increase production above that already derived from existing APC Systems.

For a liquefaction process the number of manipulated variables may exceed 10, 12, 14, 16, or 18. The number of control variables may exceed 4, 5, 6, 7, or 8. The number of intermediate variables may exceed 5, 8, 10, or 15. Referring to FIG. 6, the complexity of possible interconnecting links of respective variables influencing each other increases correspondingly.

With the potential for modelling using data analytics, it was deemed worthwhile to examine this area with a view towards obtaining a fit for purpose model for RTPO. A very exhaustive list of references for the optimization of a gas liquefaction process, and LNG plants in general, is provided in, for instance, Austboa, B., Weidemann Lovsethb, S., & Gundersena, T. (2014), Use of optimization in LNG process design and operation; Computers and Chemical Engineering, 71, pp. 391-414.

Figure 7:
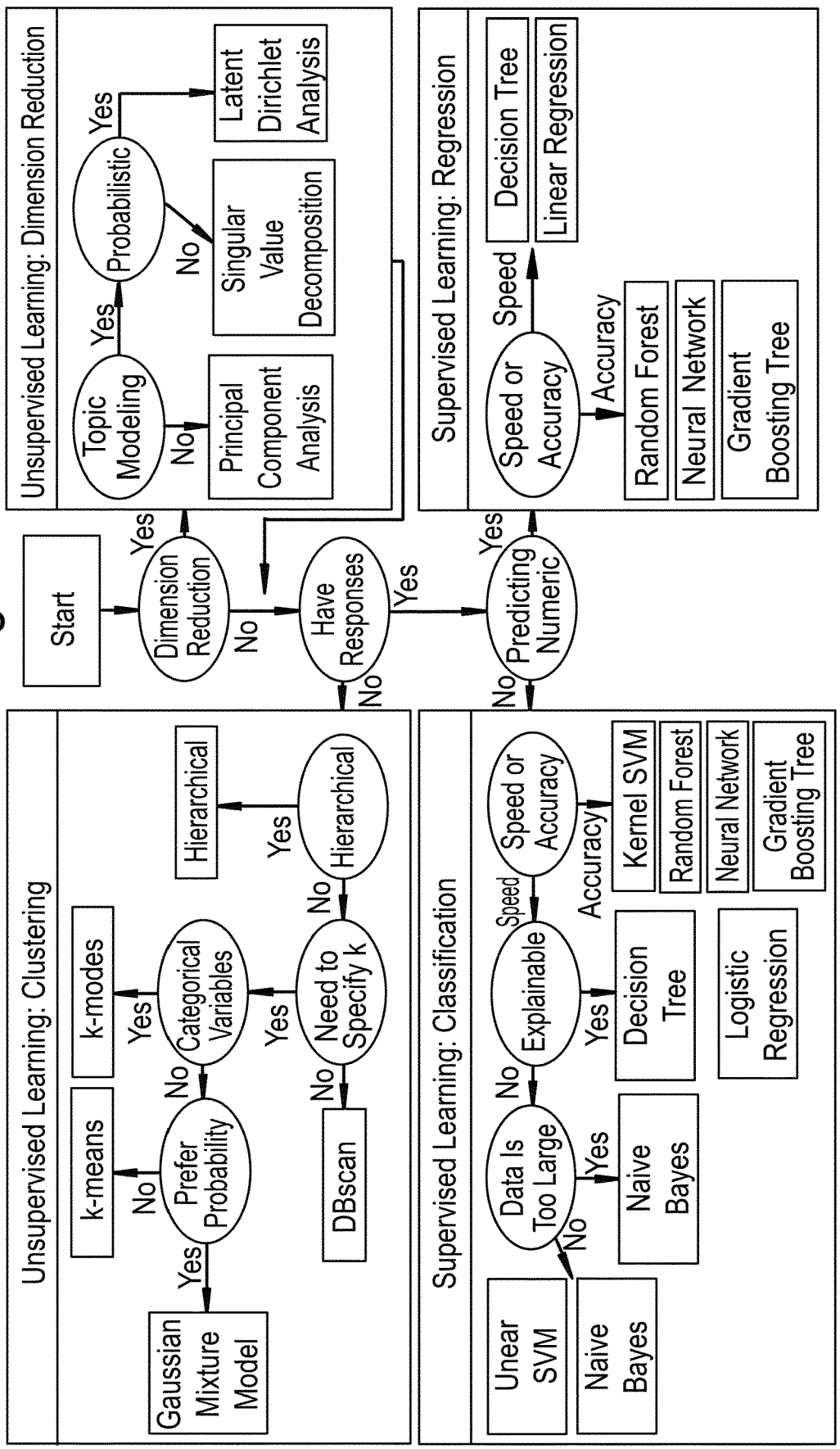
FIG. 7 shows an exemplary decision tree type diagram indicating various examples of machine learning algorithms.

Data analytics or Machine Learning is the science of discovering hidden patterns in raw data and making predictive models. This stream of science has been widely used in the healthcare industry for a long time to find novel drugs using both large volumes of structured and unstructured data. A variety of techniques are available. As shown in FIG. 7, the choice of technique may depend on the type of data and the problem that needs to be addressed.

Supervised learning techniques map input variables to one or more response variables while unsupervised techniques are used when there is no response variable. When the response is numeric (as for responses in this disclosure), some of the most appropriate techniques that can be applied are decision tree, linear regression, random forest, neural network and gradient boosting tree.

Steps in modelling are data collection, data summary, visualization, model building, model simplification and testing the model by predicting the response in a data set unseen by the model. A simple model that is easy to interpret is preferred to a Black Box model approach which does not allow learning about the directional impact of independent variables. Techniques to simplify models are documented in the Machine Learning literature (Crawley, M. J. (2011), The R Book, John Wiley & Sons Ltd.), but it is advisable to combine these approaches with input from experts who have a process control background to enable a correct choice of variables in the model. This is the approach followed in the present disclosure.

The system and method of the disclosure enable designing an APC that makes the most optimal trade-offs between various control objectives of the overall liquefaction system, in order to safely and sustainably (i.e. within safety constraints of each section and piece of equipment within the liquefaction system) maximize production in a liquefaction train. This has been achieved by an interdisciplinary team of data-analytics, process engineering and control engineering.

The system and method find key gaps (i.e. gap to potential, or optimizable levers of control) in the APC logic. The latter may arise due to, for instance, process non-linearities or incorrect prioritization. The system and method of the disclosure may be implemented offline, wherein the RTPO system 514 updates the APC system 512 when it is offline only, without in real time sending set-points to the APC. In another embodiment, the RTPO system 514 can be provided with data-analytical models able to send set points to the APC system 512 in real time. The latter allows substantially instantaneous updating of a control vector in the APC.

The APC 512 comprises relationships between various degree of freedoms (MVs: manipulated variables) and the variables that need to be controlled (CVs: control variables). There may be several mapping combinations possible between a set of MVs and CVs.

Referring to FIG. 6, the upper diagram indicates the realm of the RTPO system 514. The system has related data analytics systems. The upper diagram indicates a relatively large number of possible combinations, links and/or influence of independent variables, such as MVs and DVs, on the left side of the diagram, and dependent variables, such as control variables (CV), on the right side of the diagram. A number of Intermediate Variables may be determined, with intermediate influence on the links between the independent variables on the left, and dependent variables on the right.

The RTPO system 514 uses data analytical insights to evaluate these relationships, to provide improvements. The improvements can be transferred to the lower diagram in FIG. 6, as indicated by arrows 520. The lower diagram in FIG. 6 indicates the realm of the APC system 512, which has direct influence on process control. Due to the data analytics of the RTPO realm, the combinations and links of independent variables, such as MVs and DVs, on one hand, and dependent variables, such as control variables (CV), on the other, have been limited to the most relevant, the most influential ones. Also, the number of Intermediate Variables may have been limited with respect to the set of IVs as considered in the RTPO realm. Combinations and variables with influence below a certain threshold may have been filtered out, enabling to implement a simpler yet effective control vector in the APC 512.

The selection of combinations between variables may depend on (in order of importance):
  i) Effectiveness of responses of respective Control Variables (CV) on variation of one or more of the Manipulated Variables (MV). This may be established via step tests. If the responses are relatively weak or slow, then the respective MV may not be suitable for use in control, and may be filtered out or discarded.
  ii) Control priorities, tolerances of respective pieces of equipment, and deviations from prescribed settings (e.g. as prescribed by a vendor). Inputs in this respect may originate from an operational philosophy or practical operating experience for a respective LNG facility. Setting and deviations herein may include, for instance, criticality of respective parameters, distance to alarm or trip, etc.
  iii) Required turn-down—also comes from the asset's operational philosophy. (e.g. does the operator expect the APC to control the plant even at low throughput—if so, the model may show gaps at high throughput).
  iv) The combination that results in maximum production of LNG.

For context, the contribution of data-analytics may be limited to the last point, as the first (i) is determined by process characteristics and the next two (ii, iii) are determined by the operational philosophy of a respective LNG facility. Thus, it may not be possible to fully close all the gaps to potential determined by data-analytics using the APC alone.

The system and method of the present disclosure aim, for instance, to optimize one or more control variables (CV). Optimize herein may include, for instance, maximizing LNG throughput. LNG throughput herein may refer to, for instance, flow rate ([m³/s]) or mass flow rate ([kg/s] or [metric ton/day]) of condensed or liquefied natural gas 150 as provided at an outlet of the main heat exchanger or of liquefied natural gas 160 as provided to storage.

In order to optimize the one or more control variables, at least including LNG throughput, the method of the present disclosure derives a model relating independent variables to said control variables. From a process and operational perspective, the LNG throughput can be expressed as a function of any manipulated variables (and potentially intermediate variables) as applicable for a respective liquefaction system. Applicable herein means relevant for a respective liquefaction system, with examples provided in FIGS. 1 to 4. For instance, PMR related variables may be relevant for liquefaction systems using mixed refrigerant in the pre-cool loop (FIG. 3), whereas variables relating to propane kettle level may be relevant for liquefaction systems using propane for precooling (FIG. 2).

The manipulated variables may include one or more of, for instance, the flow rate of LMR (F-LMR), HMR (F-HMR), the composition of MR (Nitrogen: C-N2, Methane: C-C1, Ethane: C-C2 and Propane: C-C3), run-down temperature (T-R) and inlet guide vane position of the MR compressor 80 (V-K). The manipulated variables (MVs) can generally be controlled by the advanced process control (APC) system 512.

The flow rate of LMR (F-LMR) can for instance be controlled by adjusting the LMR valve 114, and the flow of HMR (F-HMR) can be controlled by adjusting the HMR valve 112. The composition of the mixed refrigerant can be controlled by adjusting the flow of respective components 124 to 130 of the refrigerant make-up stream 122 (for instance Nitrogen 124, Methane 126, Ethane 128 and Propane 130). The run-down temperature (T-R) refers to the temperature of stream 150, for instance at or near an outlet of the heat exchanger 22. The run-down temperature can be measured, for instance, by a temperature sensor 190. The run-down temperature can be controlled, for instance, by controlling one or more of the flow rate of the process stream 30, the flow rate of the LMR 111, the flow rate of the HMR 115, and the process stream by-pass fraction 54.

An inlet guide vane position of the inlet guide vanes of the MR compressor 80 can be controlled within a range, for instance between fully open down to partly or fully closed position.

In a practical embodiment, composition of the MR at various locations in the MR circuit 24 may be as follows. Pressurized pre-cooled MR stream 91 may comprise, for instance, about 3 to 8 mol % N2 (i.e. nitrogen), 40 to 45 mol % C1 (i.e. methane), 35 to 45 mol % C2 (i.e. ethane), and/or 5 to 15 mol % C3 (i.e. propane). HMR stream 94 may comprise, at least, about 1 to 3 mol % N2, 30 to 35 mol % C1, 45 to 55 mol % C2, and/or 15 to 20 mol % C3. LMR stream 96 may comprise, for instance, about 2 to 15 mol % N2, 50 to 75 mol % C1, 20 to 30 mol % C2, and/or 0 to 10 mol % C3.

To discover patterns for increasing the LNG throughput, first a quantitative model for LNG throughput was derived using historical closed loop data of the variables referenced above. See formulas 1 and 2 below, and the related description. The model may be derived using process data accumulated with the process controller 512 online, i.e. during use of the respective liquefaction system (for instance as shown in FIGS. 1 to 4). Given that the process data comprised numeric responses for virtually all variables, a variety of supervised regression techniques are available.

Available techniques include, for instance, partial least square regression, principal component analysis (PCA) and principal component regression (PCR) (de Jong, S. (1993), SIMPLS: An Alternative Approach to Partial Least Squares Regression, Chemometrics and Intelligent Laboratory Systems, Vol. 18, pp. 251-263), or least squares regression (Goldberger, A. S. (1964), Classical Linear Regression, New York: John Willey & Sons).

The first two techniques transform the original manipulated variables data into a linear combination of all manipulated variables. If there is relatively little variability in some of the variables, using them to explain the variability in LNG throughput may lead to incorrect conclusions. The least squares method involves developing a model as shown in equation 1:

$$y = X\beta + \varepsilon \quad (1)$$

wherein X is the matrix of manipulatable variables (MVs), $\beta$ is a vector of unknown parameters that we need to estimate and $\varepsilon$ is an error in the model. Vector $\beta$ may be estimated using equation 2:

$$\hat{\beta} = (X^T X)^{-1} X^T y \quad (2)$$

The standard least squares methodology was adapted to filter (remove) the MVs below a preset significance threshold from X through cross validation.

Process data may be provided over a selected time period. The time period may be in the order of 1 to 12 months, for instance. In this modified technique, the historical process data 540 was divided into data blocks and data cycles 542. Each data cycle 542 may comprise a full set of observations (process data from the respective facility), starting anew with the subsequent cycle 542. The process data in each cycle 542 is divided in data blocks (not shown). Each cycle 542 comprises multiple data blocks. See FIG. 8 for two examples.

A data sub-set 544, comprising a limited sub-section of each data cycle 542, was randomly chosen to build a parameterized model. The model may use, for instance, equation 1 and 2. The sub-section 544 may comprise k data blocks, wherein k is an integer, for instance in the range of 10 to 20. Herein, each cycle 542 comprises at least k+1 data blocks. Herein, each data subset 544 may comprise in the range of 60 to 90% of the amount of data in each cycle 542. In a preferred embodiment, all data subsets 544 combined comprise in the order of 80% of all the process data 540.

For example, if a subset 544 is comprised of 20 blocks, and each block has a contiguous length of, for instance, 2000 observations per block, the total number of observations in the subset 544 will be 40,000 observations. Observations herein may relate to data points or values of respective variables as included in the process data. Given that each cycle 542 of the process data can include many more observations, for instance more than 66,000 observations, the start of each subset 544 within a data cycle 542 can be selected in multiple ways. For instance, by randomly selecting the start of each of the subsets 544 within a cycle, such that each block within the subset 544 is independent of any other block with no overlap between data blocks. Also, each subsequent subset 544 is independent of adjacent subsets 544 with no overlap between adjacent data subsets 544.

The process of randomly selecting a data sub-set 544 of the data cycles 542 was repeated multiple times, for instance more than 100 times. This step helps to establish which manipulatable variables (MVs) have a statistically significant impact on the selected control variables, such as LNG throughput. This step can be described as selecting a subset of manipulated variables to control one or more selected control variables. Alternatively, this step can be described as filtering the manipulated variables (MV) to filter out another subset of MVs having an impact on selected control variables. MVs may be filtered out, i.e. removed from the list of manipulated variables to be taken into account for the method of the present disclosure, for instance, because these MVs may provide a response below a set threshold, MVs may be statistically irrelevant (according to a selected threshold value), and/or MVs may provide unwanted results, side effects, or cause certain boundary conditions to be exceeded.

Filtering may be done, for instance, by selecting only those MVs that gave coefficients of response with a p-value below a selected threshold value, for instance $p<0.05$, and/or with consistent sign in all, or at least more than a predetermined percentage of, the random tests.

The p-value or probability value is the probability of obtaining test results at least as extreme as the results observed during the test, assuming that the null hypothesis is correct. The p-value is defined as the probability, under a null hypothesis H (at times denoted Ho as opposed to Ha denoting an alternative hypothesis) about an unknown distribution F of a variable V, for the variate to be observed as a value equal to or more extreme than the value observed.

Figure 9A:
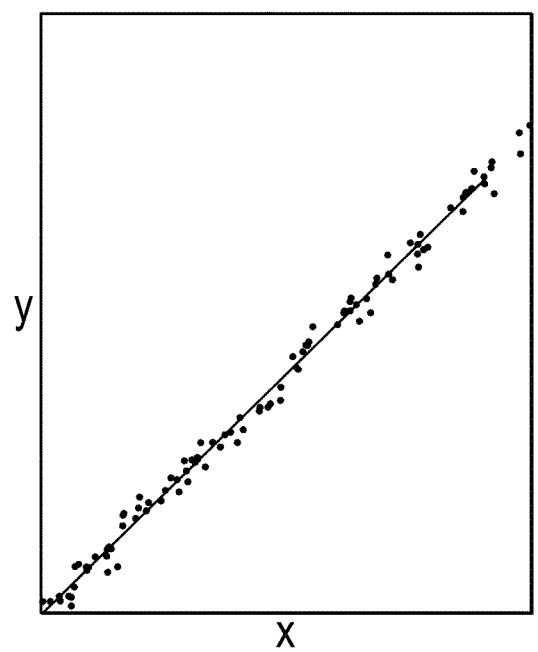
FIGS. 9A and 9B show exemplary diagrams indicating data points with relatively small p-value and relatively large p-value respectively.
Figure 9B:
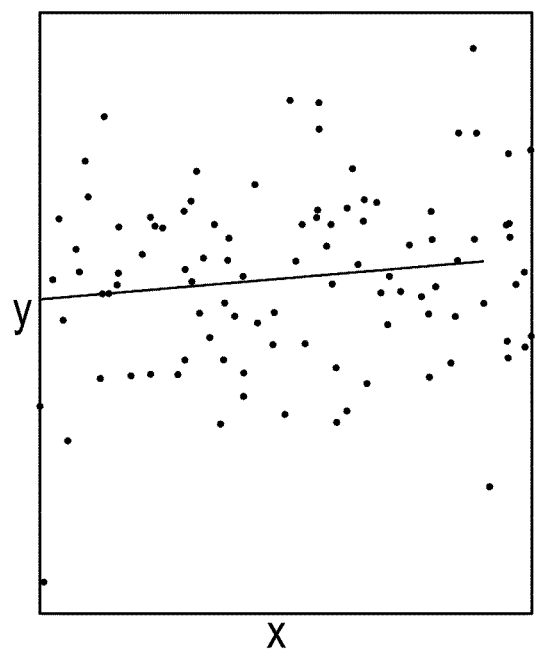

FIGS. 9A and 9B show exemplary diagrams of (simulated or tested) values of the effect of one of the manipulated variables (MV), shown on the horizontal axis, on one of the control variables (on the vertical axis). FIG. 9A shows a strong correlation between variation of the MV and the selected CV. Herein, the p-value is well below the set threshold, and the relation between the selected MV and CV is established. The p-value for FIG. 9A may be, for instance, in the order of $10^{-109}$ well below the suggested threshold. FIG. 9B shows a weak correlation between variation of the respective MV and the selected CV. Herein, the p-value exceeds the set threshold, and the respective MV will be disregarded for control of the respective CV. The p-value for FIG. 9B may be, for instance, about 0.15 to 0.2, i.e. above the suggested threshold of 0.05. If the tests or simulations for a particular MV provide both results with a p-value above and below the set threshold value (i.e. is some tests show correlation like in FIG. 9A, while other tests show weak correlation as in FIG. 9B), the MV (i.e. on the x-axis) may still be rejected to control the respective control variable, even though directional trend in both simulations is identical.

Figure 10A:
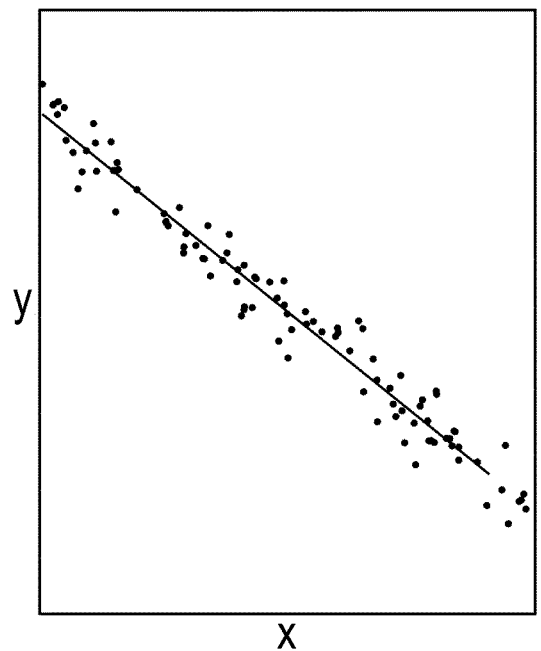
FIGS. 10A and 10B show exemplary diagrams indicating data points with negative and positive correlation respectively.
Figure 10B:
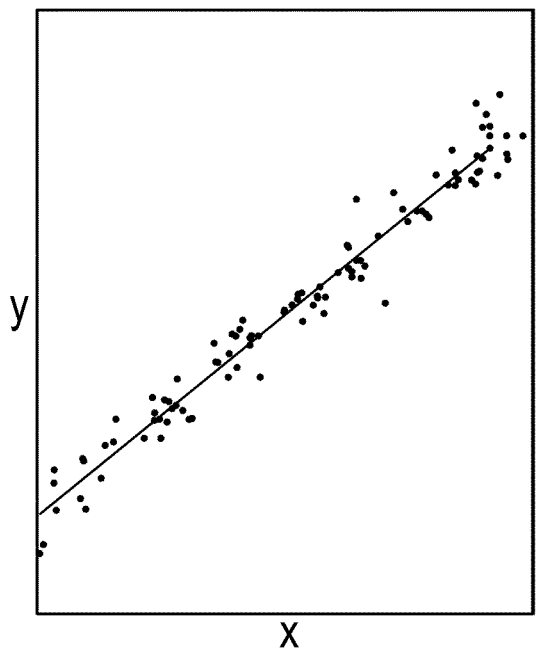

FIGS. 10A and 10B show exemplary diagrams of (simulated or tested) values of the effect of one of the manipulated variables (MV), shown on the horizontal axis, on one of the control variables (on the vertical axis). FIG. 10A shows a negative correlation between variation of the MV and the selected CV. FIG. 10B shows a positive correlation between variation of the same MV and the same selected CV.

It may be that manipulating the same variable provides inconsistent responses on the selected control variable in at least two separate, different tests. For instance, it may be that one test provides the result of FIG. 9A or 10A, while another test provides the result of FIG. 9B or 10B respectively. Differences between the at least two tests may relate to the selection of data sub-sets 544 (see FIG. 8), or to other boundary conditions which differ from one test to the next. If so, said variable may be disregarded to adjust the respective control variable.

The cross-validation scheme as described above differs from systems disclosed in literature. See, for instance: Gavin C. Cawley, N. L. (2010), On Over-fitting in Model Selection and Subsequent Selection Bias in Performance Evaluation, *Journal of Machine Learning Research*, vol 11. 2079-2107, in that only the influential MVs were identified using subsets 544 of the process data 540. The predictive performance of the model was assessed, for instance, by applying the model to a separate data set which was not part of the model building exercise.

For example, if [x1, x2, ... xn] and [y1, y2, ... yn] are randomly sampled subsets of [X] and [y] and all the 'n' models of yi=fn(xi) are identical in sign and their p-values are below a set threshold, such as $p<0.05$, then a composite model of y=fn(X) is developed and X is used as MV to influence y (y can be a control variable).

The manipulated variables (MVs) that were statistically significant in all the random tests were used to derive a single representative model for LNG throughput. The representative model allows to estimate LNG throughput. Residuals, i.e. a difference between an actual LNG throughput (in [tonne/day] or [m³/s]; for instance, based on measured LNG flow rate (in [m/s]) in line 150) and the estimated LNG throughput, were treated as a variability that cannot be explained by the manipulated variables alone. With $F_{LNG}$ being the actual or measured LNG flow rate, $F_{LNG,est}$ being the estimated LNG flow rate [m/s], and $\Delta F_{LNG}$ being the difference between the two:

$$\text{Residual LNG throughput} \approx \Delta F_{LNG} = (F_{LNG} - F_{LNG,est}) \qquad (3)$$

Herein, residual throughput corresponds to difference in estimated and measured flow. The flow rate may be transferred to throughput (expressed in m³/s or kg/s), for instance by multiplying by the area of the cross section of the outlet conduit A at the position of the flow measurement (for m³/s), or by in addition to A multiplying by density δ (in kg/m3, to provide throughput in kg/s).

The residuals were subsequently modelled against (for instance, as a function of) potential intermediate process tags, or with respect to their interaction with other MVs. Process tags that had a statistically significant impact on the residuals were isolated to check if they could be controlled with the existing MVs or whether new MVs outside the scope of the MCHE loop 24 would be required.

Figure 11A:
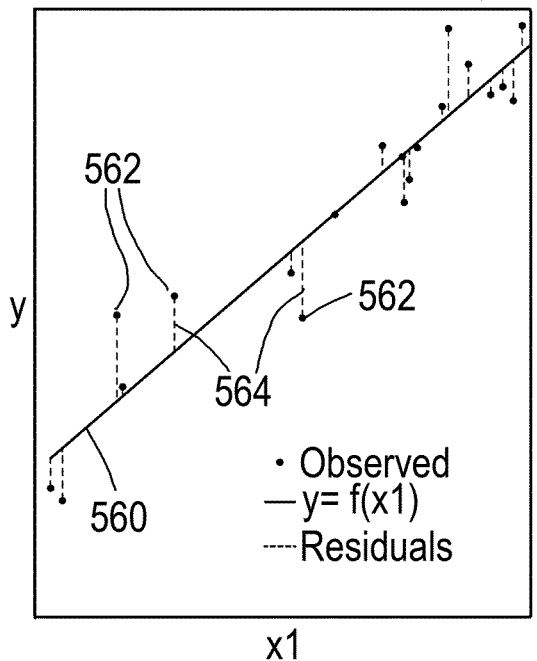
FIG. 11A shows an exemplary diagram indicating the influence of a manipulated variable (x1; on the horizontal axis) on control variable y (on the vertical axis).

The diagram of FIG. 11A shows an example indicating the influence of a manipulated variable (x1; on the horizontal axis) on control variable y (on the vertical axis). The influence can be captured by model y=f(x1) indicated by line 560. Data points 562 indicate observed (e.g. measured or modelled) values of a control variable (such as LNG throughput). Dotted lines 564 indicate residuals, i.e. difference between observed and estimated values of the control variable.

Figure 11B:
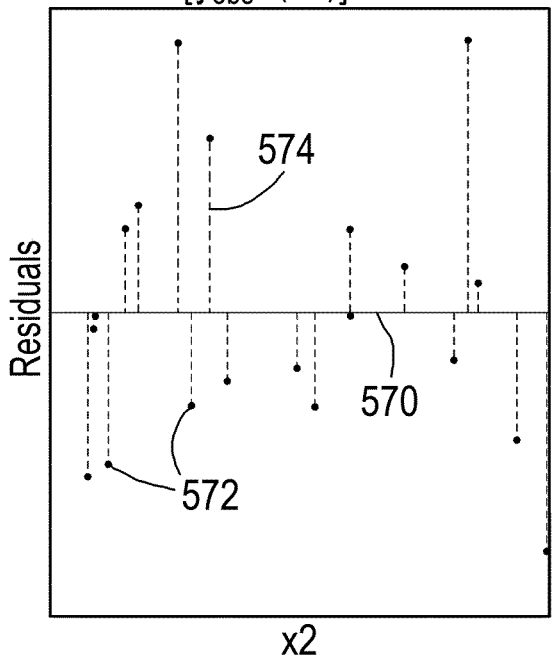
FIG. 11B shows an exemplary diagram indicating the influence of another variable x2 (manipulated, intermediate, or disturbance) on residuals, wherein the vertical axis shows the values for y depending on the second variable x2 and a function f(x1) derived with respect to the first variable x1 is subtracted from observed values for y depending on the second variable x2 (yobs,x2)

The diagram of FIG. 11B shows the influence of another variable x2 (manipulated, intermediate, or disturbance) on residuals. Herein, the vertical axis shows the values for y depending on the second variable x2. The function f(x1) derived with respect to the first variable x1 is subtracted from observed values for y depending on the second variable x2 (yobs,x2). Line 570 indicates $[y_{obs,x2}-f(x1)]$. Data points 572 indicate $y_{obs,x2}$. Residuals are indicated by dotted lines 574. Since the residuals show no trend with respect to x2, x2 is not included in the model.

Figure 12A:
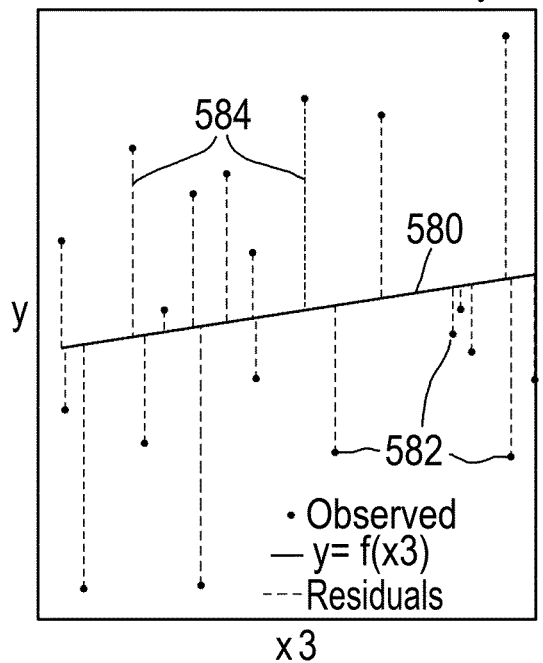
FIG. 12A shows an exemplary diagram indicating influence of a third variable x3 (horizontal axis) on y (typically one of the control variables; on the vertical axis), captured by model y=f(x3)

The diagram of FIG. 12A shows an influence of a third variable x3 (horizontal axis) on y (typically one of the control variables; on the vertical axis). The influence can be captured by model y=f(x3), indicated by line 580. Observed values of y are indicated by data points 582. Residuals are indicated by dotted lines 584.

Figure 12B:
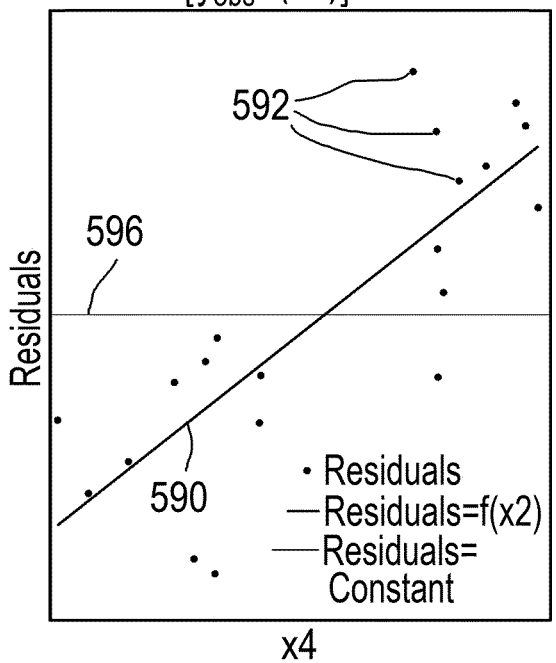
FIG. 12B shows an exemplary diagram indicating influence of another variable x4 on residuals of [yobs,x3−f(x3)]

The diagram of FIG. 12B shows influence of another variable x4 on residuals of $[y_{obs,x3}-f(x3)]$. Line 590 indicates 'residuals' $(F_{LNG}-F_{LNG,est}(x3, x4))=f(x4)$. For comparison, line 596 indicates the exemplary case wherein residuals would be constant, i.e. not influenced by change of x4. Because the residuals increase as x4 increases, x4 is also included in the model for y. Thus, the model becomes y=f(x3, x4). In other words, y will be modelled as a function of x3 and x4.

At least two new intermediate variables were thus discovered, for instance (a) gas temperature (of the NG) in or along the (warm end of the) tube bundle 52 ($T_{WB}$) and (b) Process temperature of the MR composition along one or more of the tube bundles in the main heat exchanger 22 ($T_{MR}$).

The term 'warm bundle' as used herein, may relate to the bundle on the warm end of the heat exchanger, i.e. the bundle closest to the process stream inlet of the heat exchanger. In FIG. 1 or 2, bundle 52 could be regarded as the warm bundle. In FIG. 3, showing only a single tube bundle extending all along the heat exchanger, warm bundle may refer to the entire bundle, or to a part of the bundle on the warm end of the heat exchanger. Temperature sensors are typically provided near at least some or all inlets and outlets of the main heat exchanger 22, allowing to calculate or estimate a temperature profile along the respective bundle between the respective inlet and outlet. The heat exchanger(s) in the pre-cool loop 36 may likewise be provided with temperature sensors at or near at least some or all inlets and outlets.

The Intermediate Variables can, typically, be influenced by manipulating or adjusting one or more manipulated variables. Which MVs to adjust, and how much, is suggested by the method of the present disclosure, as described herein.

Figure 14:
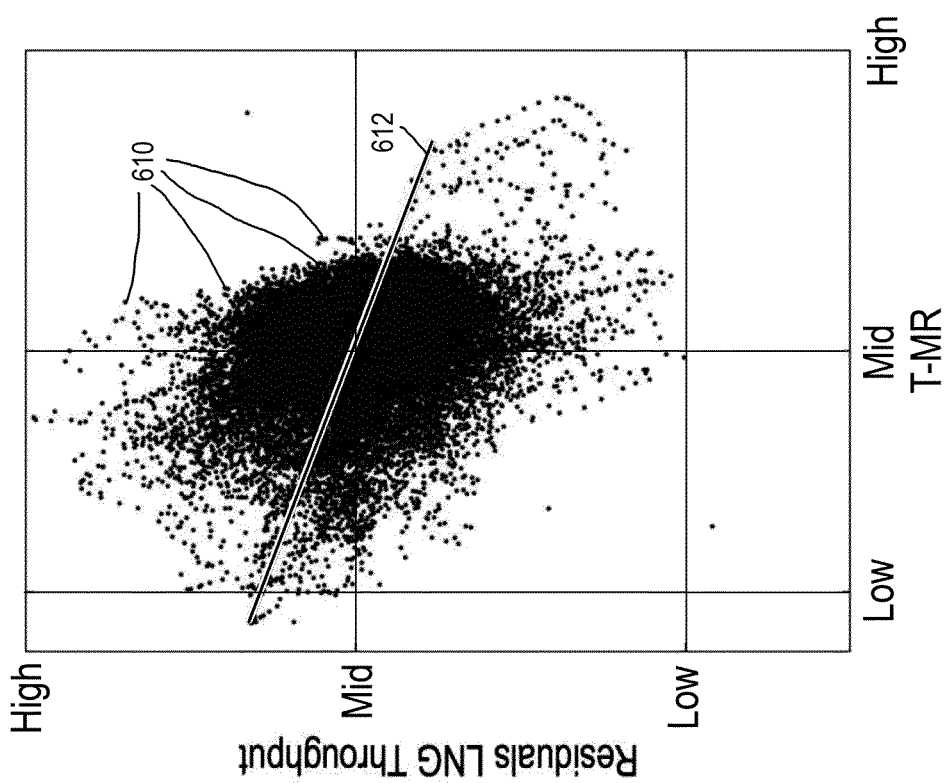
FIG. 14 shows an exemplary diagram of residuals LNG throughput (vertical) as a function of temperature in the MR loop ($T_{MR}$)
Figure 13:
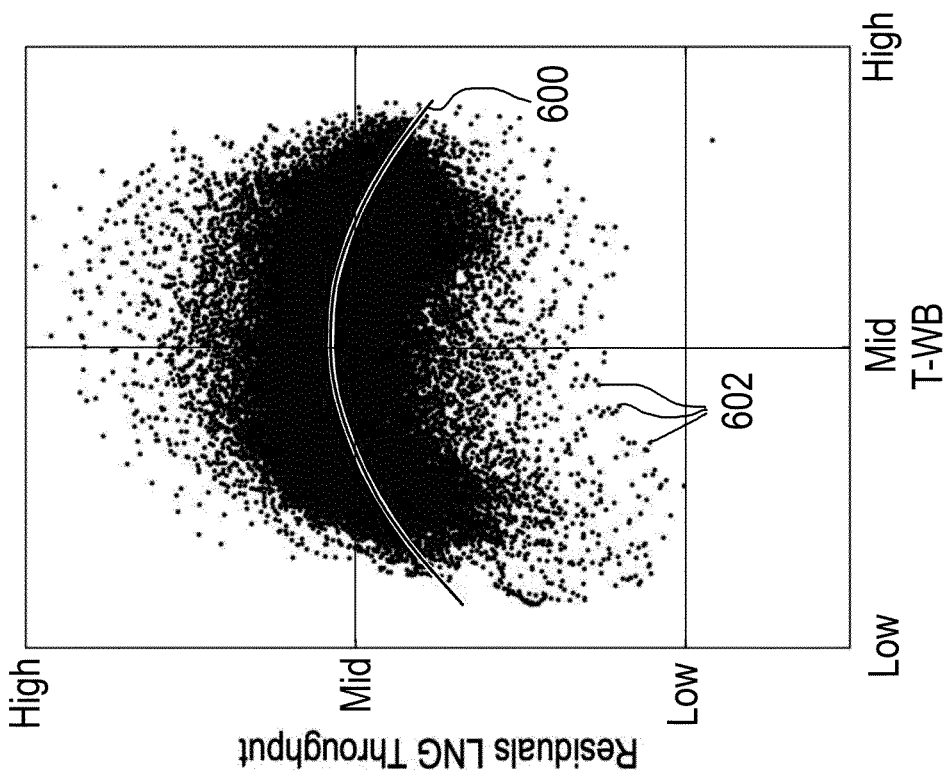
FIG. 13 shows an exemplary diagram of residuals LNG throughput (vertical) as a function of the temperature in one of the tube bundles in a heat exchanger (Tws)

FIGS. 13 and 14 show examples of the influence of intermediate variables $T_{WB}$ and $T_{MR}$ respectively on residuals of an LNG throughput model (vertical axis) according to the present disclosure. Herein, the residuals as expressed on the vertical axis may present the AF between measured or observed flow on one hand, and flow estimated using a function of certain manipulated variables (MV) on the other.

As shown in FIG. 13, the effect of Tw-a on residuals of LNG throughput may be non-linear. FIG. 13 shows results 602 of multiple test runs, and line of best fit 600. The non-linear line 600 implies that temperatures ($T_{WB}$) corresponding to the peak of the line 600, i.e. in the mid-range between lower and higher ends of the available range for $T_{WB}$, are best suited for increasing the LNG throughput.

As shown in FIG. 14, Ta has a linear effect on residuals of LNG throughput. FIG. 14 shows results 610 of multiple test runs, with line of best fit 612. Colder T, is desirable to maximize production.

In view of the indication that mid-range temperatures in the warm bundle are preferred, as indicated in FIG. 13, in a subsequent step, a selection can be made from the manipulated variables which help to maintain $T_{WB}$ in its mid-range. The identified MVs can subsequently be incorporated in the model and/or in the APC 512.

Figure 15:
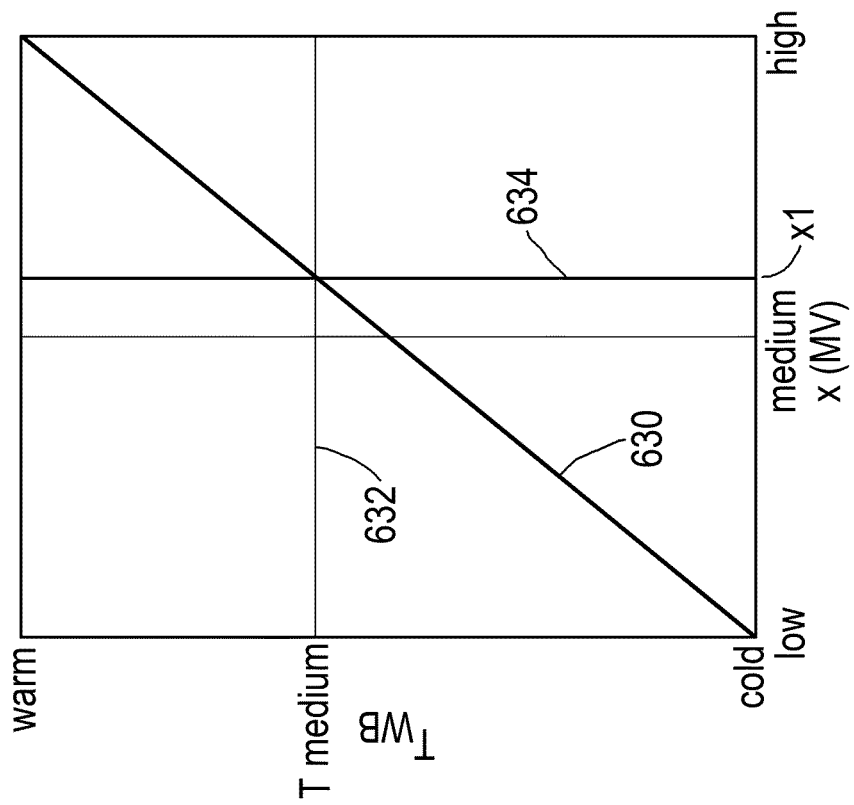
FIG. 15 shows an exemplary diagram indicating LNG production (vertical axis) as a function of temperature in a tube bundle in a heat exchanger (horizontal axis)

As an example, FIG. 15 indicates dependence of LNG production (vertical axis) on $T_{WB}$ (horizontal axis). Said dependence may be expressed by a function, indicated by line 620. The dependence may have a maximum value 622 for a certain temperature of $T_{WB}$, for instance when $T_{WB}$ is "medium". Medium herein may be in the range of 0 to −50° C.

Figure 16:
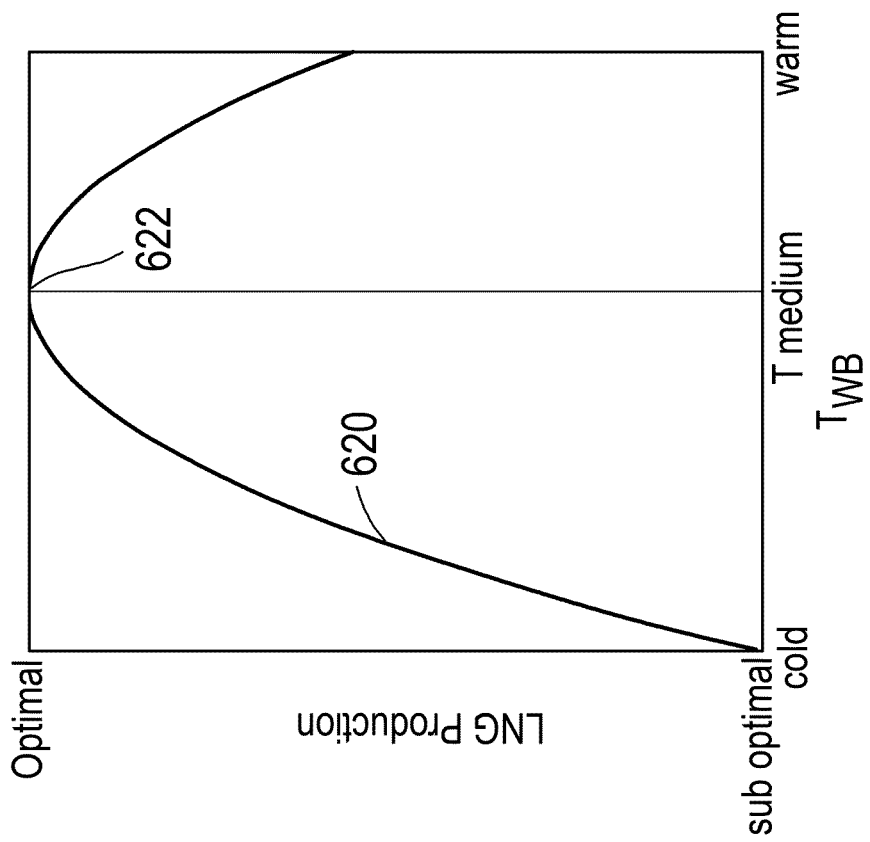
FIG. 16 shows an exemplary diagram indicating temperature in a tube bundle in a heat exchanger (vertical axis) as a function of a manipulated variable (horizontal axis)

$T_{WB}$ is an intermediate variable (IV) and not a directly manipulated variable (MV). However, $T_{WB}$ may be related to at least one manipulated variable (MV) x. FIG. 16 shows an example of dependence 630 of $T_{WB}$ (vertical axis) on manipulated variable x (horizontal axis). In order to maintain $T_{WB}-T_{WB, medium}$, the variable x can be maintained as close as possible to the position $x=x_1$. The selection of $x_1$ follows the crossing of horizontal line 632 to $T_{WB, medium}$ and the vertical line 634 which crosses the dependency 630 at the same point as the horizontal line 632. Changing the value of variable x to $x_1$ will provide optimum LNG production by influencing $T_{WB}$ (as indicated in FIG. 15).

Similarly, based on the dependency shown in FIG. 14, one or more MVs can be identified to keep intermediate variable $T_{MR}$ as cold as possible. In a next step, values of said identified MVs to keep $T_{MR}$ as cold as possible were calculated or estimated, and these values were incorporated in the new controller. The result is increased LNG throughput.

The model for LNG throughput is shown in Table 1 below. The impact of all the variables is standardized with the strongest contributor given the highest rank (1 being the top position, counting down to lowest ranked number 9. As referenced above, table 1 includes the following manipulated variables (MV) and intermediate variables (IV): Flow rate of LMR ($F_{LMR}$), flow rate of HMR ($F_{HMR}$), the composition of the mixed refrigerant (Nitrogen: $C_{N2}$, Methane: $C_{C1}$, Ethane: $C_{C2}$ and Propane: $C_{C3}$), run-down temperature ($T_R$), and inlet guide vane position of one or both of the MR compressors 80, 82 ($V_K$).

| Covariate | Type | Units | Rank | pValue |
|---|---|---|---|---|
| $T_R$ | MV | deg C. | 1 | <1e-10 |
| $T_{MR}$ | IV | deg C. | 2 | <1e-10 |
| $F_{HMR}$ | MV | T/D [kg/s] | 3 | <1e-10 |
| $T_{WB}$ | IV | deg C. | 4 | <1e-10 |
| $T_{WB}^2$ | IV | dec C.^2 | 5 | <1e-10 |
| $F_{LMR}$ | MV | T/D [kg/s] | 6 | <1e-10 |
| $F_{HMR}*F_{LMR}$ | MV | (T/D)^2 | 7 | <1e-10 |
| $V_K$ | MV | % | 8 | <1e-10 |
| $C_{C1}$ | MV | mol % | 9 | <1e-10 |

The overall model after the inclusion of the intermediate variables (IVs) was robust, with about 92% of variability in LNG throughput explained. The IVs were mapped to MVs from the MCHE-MR loop 24 or to the other loops such as MCHE-Propane and Acid Gas Removal Unit (AGRU) by building models for IVs as a function of MVs.

To maximize LNG throughput, the system and method of the present disclosure use the available (combined) power of the refrigerant compressors 80, 82 (FIG. 2) by maximizing the flow of HMR and LMR ($F_{HMR}$ and $F_{LMR}$) at the right composition. The right composition herein depends on the modelled output, as explained above, within a given context which may vary, for instance, due to geography, weather, seasonal changes, ambient temperatures, etc.

If a process constraint is violated, the APC may be set to stop "pushing" the flow rate of HMR and LMR, and therefore the LNG throughput. Some of the constraints which may restrict the utilization of refrigerant compressor power include, for instance, the pressure drop of the refrigerant flow across the MCHE ($\Delta P_{MCHE}$) and the suction pressure of the MR compressor ($P_{s-Comp}$). $\Delta P_{MCHE}$ herein may be the difference in measured pressure between the expanded LMR or HMR stream 115, 113 on one hand, and the refrigerant outlet of the heat exchanger 22 or pressure of the refrigerant stream 140 on the other. Both $\Delta P_{MCHE}$ and $P_s$-Comp have an upper limit and when exceeded, may trigger the controller (typically the APC 512, see FIG. 5) to reduce one or more of F-HMR, F-LMR and LNG throughput rate to below preset safety values in order to preserve stable and safe operation of the process within predetermined bounds. Stable herein may relate to preventing trips of equipment, such as compressors.

Figure 17:
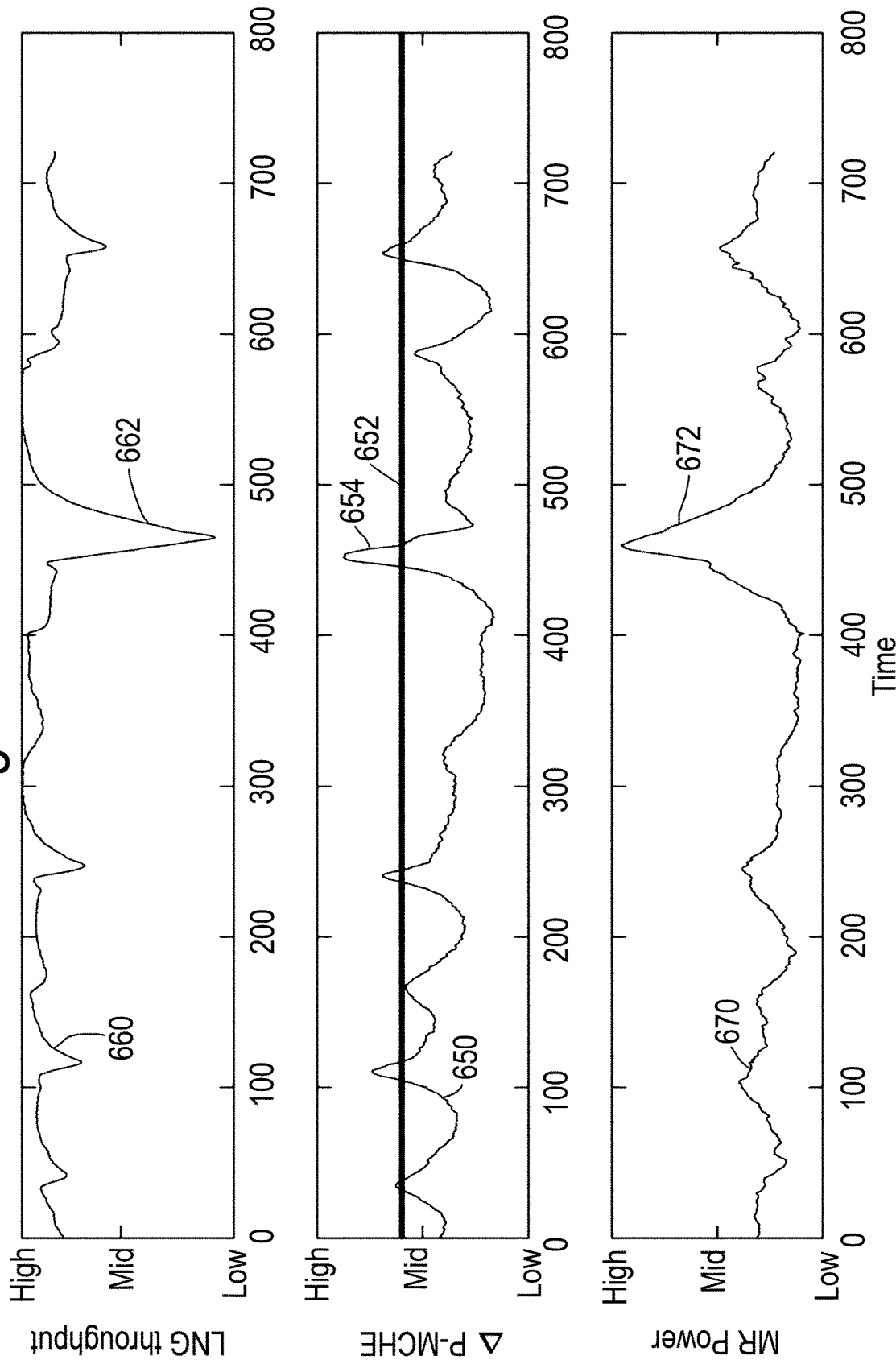
FIG. 17 shows exemplary diagrams indicating LNG throughput, pressure drop across the main heat exchanger ($\Delta P_{MCHE}$), and refrigerant compressor power (MR-Power) respectively, in time.

FIG. 17 shows an example of the behavior of the controller over time (horizontal axis), for instance during a day, when AP-MCHE 650 was exceeding a safety threshold 652 longer than a predetermined time period. In FIG. 17, the top panel indicates LNG throughput 660, the mid-panel indicates refrigerant pressure drop 650 over the shell side of the main heat exchanger 22 (AP-MCHE), and the lower panel indicates power demand 670 by the refrigerant compressor (for instance compressor 80, or the combination of compressors 80 and 82). The horizontal line 652 in the mid-panel indicates a predetermined upper limit of $\Delta P\text{-}_{MCHE}$. When the constraint limit 652 for $\Delta P_{MCHE}$ is exceeded, indicated by pressure peak 654, power demand 670 for the compressor increases, leading to power spike 672. The controller will subsequently reduce the power provided to the refrigerant compressor(s). This will leave some, for instance up to 10-20%, compressor power under-utilized and LNG throughput 660 falls as a result, indicated by dip in output 662.

An empirical model using historical closed loop data for the constraint $\Delta P_{MCHE}$, similar to the method described above (for instance FIGS. 13-16), was developed to understand which handles should be used to keep $\Delta P_{MCHE}$ below the control limit 652 (FIG. 17). The model indicated the dependencies and ranking of various variables, as shown in Table 2 below.

| Covariate | Type | Units | Rank | pValue |
| --- | --- | --- | --- | --- |
| $T_R$ | MV | deg C. | 1 | <1e−10 |
| $F_{LMR}$ | MV | T/D [kg/s] | 2 | <1e−10 |
| $F_{HMR}*F_{LMR}$ | MV | (T/D)$^2$ | 3 | <1e−10 |
| $F_{HMR}$ | MV | T/D | 4 | <1e−10 |
| $C_{N2}$ | MV | mol % | 5 | <1e−10 |
| $T_{MR}$ | IV | degree C. | 6 | <1e−10 |
| $C_{C1}$ | MV | mol % | 7 | <1e−10 |
| $C_{C2}$ | MV | mol % | 8 | <1e−10 |
| $V_K$ | MV | % | 9 | <1e−10 |

The overall model is reasonable, with—for instance—about 85% of variability in $\Delta P\text{-}_{MCHE}$ explained. The impact of all the variables is standardized, wherein the strongest contributor is given the highest rank. This is followed by application of the cross-validation technique as described above. The model indicated that MR composition has an impact on AP-MCHE.

Also modelled was the joint influence of respective refrigerant components and rundown temperature $T_R$ (i.e. the temperature of the liquefied gas 150 leaving the heat exchanger 22) on the refrigerant pressure drop $\Delta P_{MCHE}$ across the heat exchanger 22.

Figure 18:
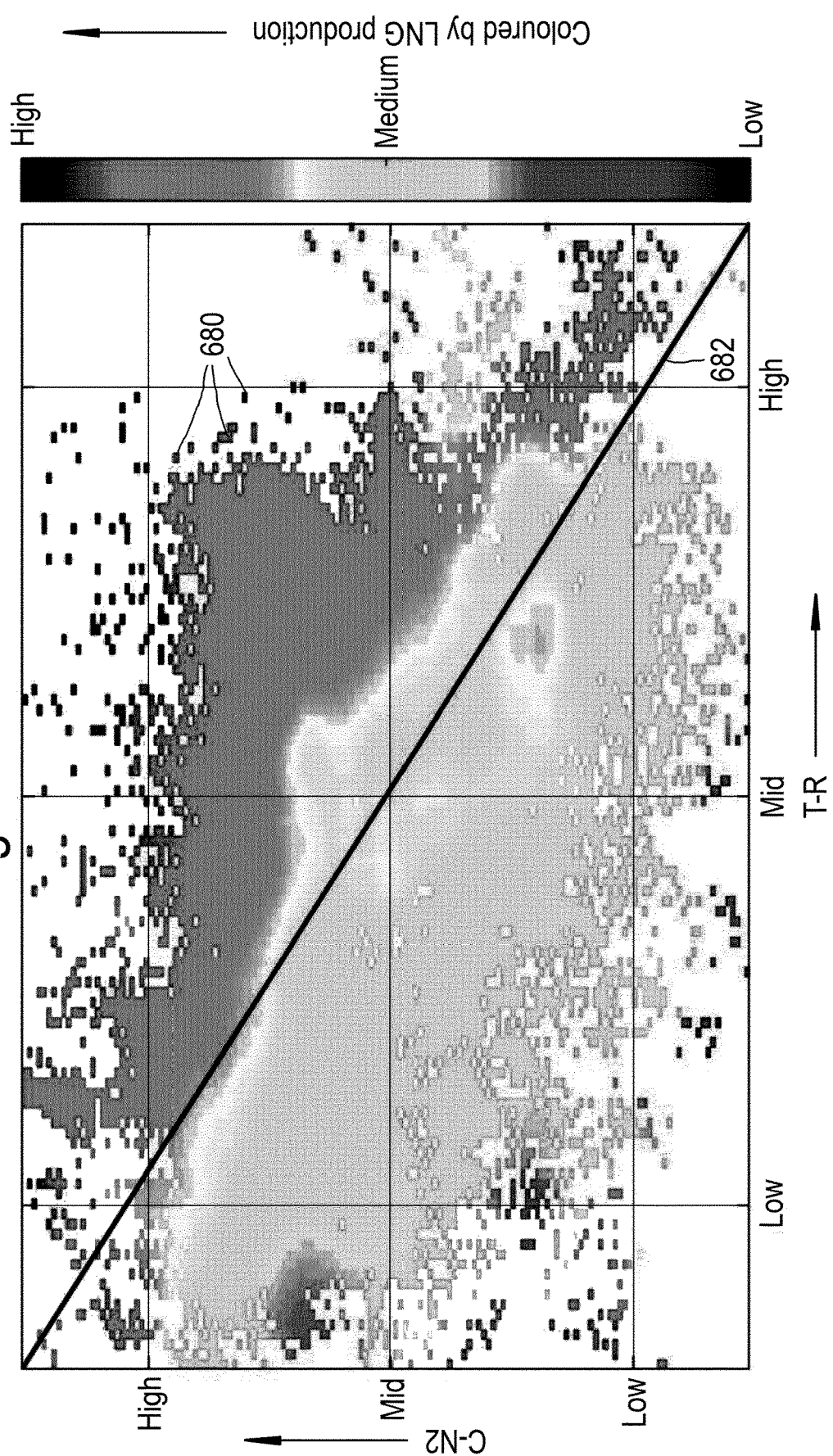
FIG. 18 shows a diagram indicating interdependency of rundown temperature ($T_R$) of the liquefied gas on the horizontal axis, component concentration of a component in the mixed refrigerant ($C_{N2}$) on the vertical axis, combined with (color/shaded) coding to indicate a pressure drop across a heat exchanger ($\Delta P_{MCHE}$)

An example of joint influence of $C_{N2}$ and $T_R$ on $\Delta P_{MCHE}$ is shown in FIG. 18. FIG. 18 indicates results of multiple test runs, for various settings of $C_{N2}$ and $T_R$ on a scale ranging from low to high with a predetermined range for both. Each test result or data point 680 also includes a measured value for $\Delta P_{MCHE}$, again ranging from low to high with a predetermined range for $\Delta P_{MCHE}$.

The region above the diagonal line 682, i.e. the upper right triangular region, corresponds to settings wherein the $\Delta P_{MCHE}$ upper limit is exceeded. Consequently, the model indicates that $C_{N2}$ must be continuously adjusted as a function of $T_R$ to remain below the $\Delta P_{MCHE}$ upper limit. A similar model can be constructed for combinations of other variables, for instance for the suction pressure of the refrigerant compressor $P_s$-comp.

Production maximization using the MCHE advanced process control system conventionally required manual adjustment of the controlled variables set points depending on operating conditions. The adequacy and frequency of these adjustments depend on process knowledge and operational experience. Requirement for manual adjustments inherently results in loss of production due to delayed or inadequate response to changes in the process variables or ambient conditions. It is estimated that, on average, these losses add up to about 10% or more of total production whenever running at maximum throughput. As explained above, machine leaning based data analysis (i.e. supervised and structured machine learning) can be used to define optimum operating conditions, allowing to partially bridge the "gap to potential". These optimum operating conditions are respective of ongoing conditions experienced at the plant. From Process Engineering experience and intuitively knowing that differentials in ambient temperatures to the detail of day and night temperature swings, whether LNG carriers are loading, wind direction and hot air circulation within LNG train Gas Turbine air intake, and calibration and accuracy of controllers and gauges are primary examples of ongoing conditions that must be accounted for. The system and method of the present disclosure strive to achieve optimum operation for every minute of the day. As with each visualization produced, Process Engineering knowledge of the LNG train is advanced. This development and knowledge base will be accelerated if the engineer can question the visualization, further cutting the data and graphical representation by certain variables. These variables could include but are not limited to feed gas flow; pre-cool loop and main refrigerant loop compressor power consumption; MCHE run down temperature; refrigerant split between heavy and light components of a mixed refrigerant, and MR composition.

Figure 19:
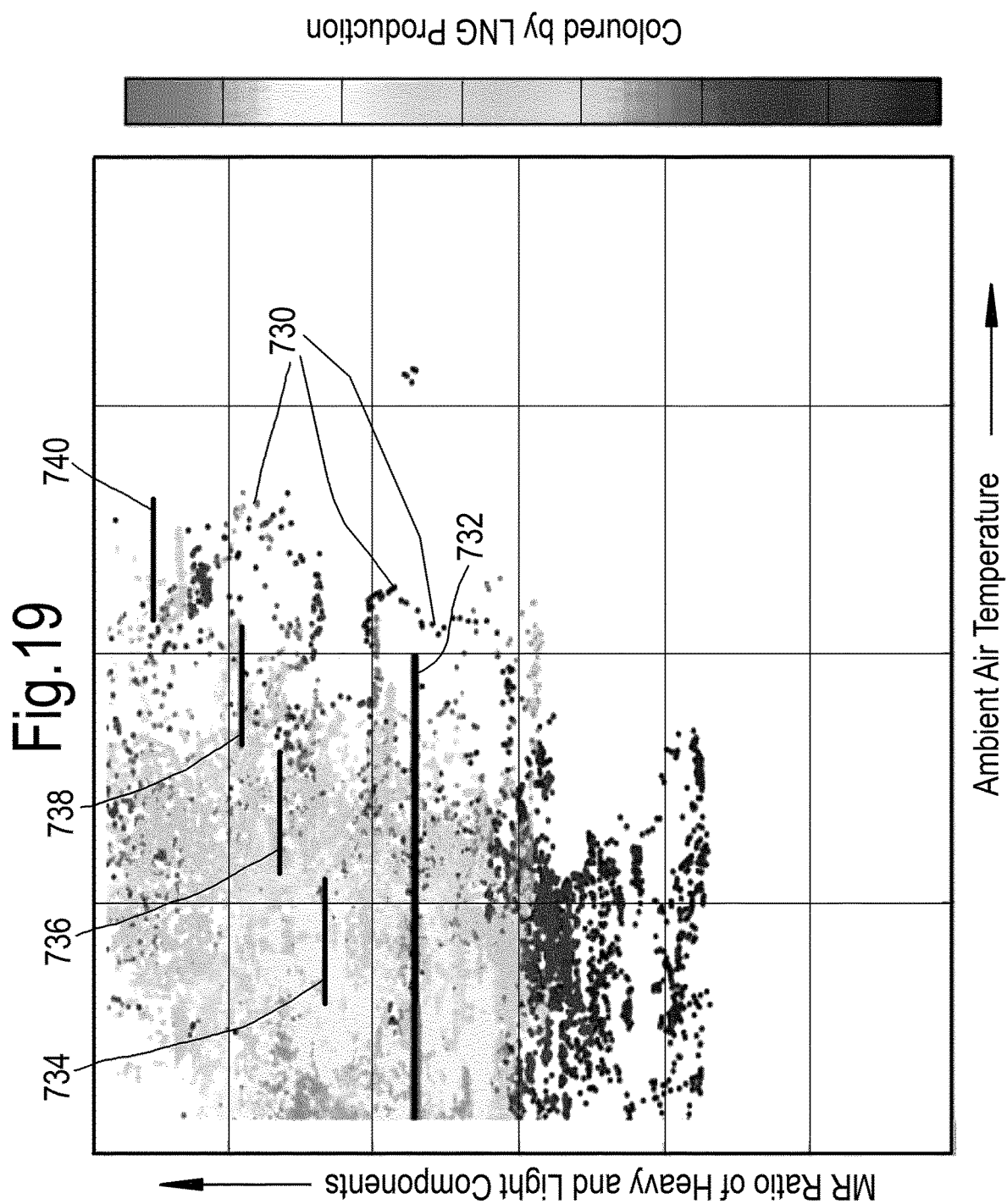
FIG. 19 shows an exemplary diagram indicating interdependency of a ratio of heavy and light components in a refrigerant (vertical axis, HMR/LMR) and ambient temperature (horizontal axis), combined with (color/shaded) coding to indicate LNG production and a recommended setting provided by a system and method according to the present disclosure.

A prime example of visualization aids to draw insights from is shown in FIG. 19, which makes use of color (shading) mapping and contours. Data points 730 indicate heavy and light mixed refrigerant ratio (vertical axis) which circulates through the MCHE plotted against ambient air temperature (horizontal axis) and colored by LNG Production.

FIG. 19 shows the addition of the solid black line 732 and stepped light grey lines 734, 736, 738 and 740 respectively. A conclusion can be drawn eluding to the optimum points in the ratio of HMR to LMR, as a function of ambient temperature. This has been captured by the grey stepped lines 734, 736, 738 and 740. Past operations have remained fixed following the solid black line 732.

Visualization aids such as the above support model development as relationships between variables can be screened and identified. Visualization aids can also lead to building static recommendations. When doing this, the recommendations can be obtained from process data over a selected time period of operation. Said time period may be in the order of 3 to 12 months or more. The time period may extend over at least 12 months of past operational data. This can ensure that no new recommendations exceed previous operational conditions or set points.

When viewing past operational data, filtering can be used to eliminate periods of data from non-transient operation as this could cloud the visualization. The technical assurance aspect of this work can combine assurance roles on the data analytical work conducted and to assurance of received data which models are built from. A Process Engineer may query the timeline of data received and screen out operations that are none confirmative to standard operating modes.

The data analytics may provide a number of static recommendations that remain independent of changing ambient conditions or operational conditions. For implementation in the APC, these are relatively simple recommendations to code into the human machine interface (HMI) of the APC. To achieve continuous optimum operating conditions, recommendations may respond to changes in ambient and operational conditions. This is executed through APC tuning of existing rules and set points, with also the addition of new codes as well if needed. As part of the deployment work can be carried out to verify if a recommendation will remain static or needs to be implemented as a real time optimizer. To do this, the following can occur:

a. LNG production model which has predictive power (form of R2) above 98%;
b. Optimizer with a solver function is constructed from the production model;
c. List all constraint boundaries within the solver in the form of set points from the APC;
d. Set solver function to maximize for LNG production;
e. View the results and confirm from Process Engineering knowledge that the direction the variables move in matches expected directionality from a 1st principle perspective;
f. Plot the results to view the number of optimized results showing, different peaks could form specific recommended set point of variables which have a handle on LNG production and then;
g. Tighten constraints one by one to measure their impact on LNG production to reaffirm findings.

Having collected the optimized data, it is possible to overlay this over previous operating conditions to validate the results and draw conclusive findings. An example of this output is shown below in FIG. 20A to 20D. FIGS. 20A to 20D show MR molar composition for four components (C1 to C3 refers to alkanes, N2=Nitrogen). Operational data bars 750 indicate past operational data (as measured). Optimizer output bars 752 indicate the optimizer output, for various ambient conditions, such as temperature ranges for winter and summer/colder and warmer periods.

This example of the optimizer output shows high selectivity for a single, or for a limited number for instance two or three, optimum set point for each MR component for a respective ambient condition. The optimizer may be run over more than 12 months of operational data to account for seasonal ambient temperature differentials. A single set point recommendation could be carried forward to the HMI of the APC for deployment.

If multiple optimized values are being recommended, then further investigation may be required to link this manipulated variable (MV) to the contributing parameter causing the change. This parameter will be a measured variable (disturbance variable) such as ambient air temperature or sea water intake temperature. The identification of the variable can be completed by locating a timestamp to which the optimizer has made a new recommendation against and investigating which variables are at their extremities and causing the optimizer to change. A second technique is to apply Process Engineering judgement to re-run the optimizer on certain sets of pre filtered data to locate the nucleus of the optimizer recommendation. The manner in which the data has been filtered will then confirm the variable which changes the optimized variable. The disturbance variable can then be linked to the manipulated variable and deployed in the HMI of the APC. This deployment forms the basis for real time production optimization as per unit time the measured variable has an impact on what the controlled variable set point should be. This is the premise for the most advanced form of optimized optimum operation.

The Data Analytics models derived from the closed loop data, as described above (see for instance equations 2 and 3 above), are unsuitable for dynamic closed loop control. Hence, the challenge was how to utilize the resulting recommendations for manipulated variables, such as $F_{HMR}$, $F_{LMR}$, $V_K$ etc., as plant conditions change over time. Please note this is particularly relevant when the supply of feed gas 30 exceeds the overall capacity of the respective liquefaction system. In other words, if the LNG production is not feed gas supply constrained.

In an embodiment, it was decided to interpret the results from modelling and data science, as described above, for direct implementation in the APC system 512 (FIG. 5). The models and insights developed using historical data provide directional relationships of MVs to IVs and control variables (CV) such as LNG throughput, $\Delta P_{MCHE}$ and suction pressure of the compressor inlet $P_s$.

The influence of a number of MVs, for instance at least four or five manipulated variables, on some control variables (CVs) was modeled. Optionally, selected intermediate variables (IV) as described above were also taken into account, for the MCHE loop 24 and other loops, as described with reference for FIGS. 1-4. The effect size of all MVs ($\beta$) (see equation 1 and 2 above) on LNG throughput, $\Delta P_{MCHE}$ and $P_s$ is static and fixed. This does not mean that the system is static, as the environmental conditions do change over time. The new controller was built to include the dynamic influence of all the MVs from the MCHE-MR loop and other loops derived by conducting targeted open loop experiments. Guidance from data modelling in accordance with the method of the present disclosure was incorporated in the APC system 512, for example, by setting limits on manipulated variables. From a process control perspective, this may be regarded as the method of the present disclosure enhancing the solution vector of the APC system 512.

FIG. 21 offers a simplified view of how the data analytics resulting from the method of the present disclosure were incorporated into the APC controller 512. FIG. 21 shows liquefaction train 700, comprising the liquefaction system 20 (or any other liquefaction system, such as systems 200, 300, 400 shown in FIGS. 1-4) controlled by the base layer process control system 510 (as described above). Process data 702 is provided to data analytics module 704. The data analytics module 704 feeds analysed data to, or is integrated with, a real time production optimization (RTPO) module 706. The RTPO module 706 comprises, at least, an RTPO model 708 for processing the data 702 in real time. The RTPO model can be instructed to optimize, i.e. maximize, the production of LNG. In this disclosure, production of LNG is linked to LNG throughput. The RTPO model may be referred to herein as a second model. The latter is opposed to the at least one first model of the APC. Ultimately however, LNG production is also linked to the flux of LNG 160 (typically expressed in [tonne per day], or [kg/s] in SI units), which may depend on additional factors as well such as mixing in of higher order hydrocarbons 176, such as ethane, and/or adding other liquid or liquefied process streams. The latter may also be taken into account by the RTPO module 706.

The process data 702 may be automatically collected from the control system 510 or from other sources within the liquefaction train 700 by software. For instance, OSIsoft®, LLC (California, US) is a manufacturer of application software for real-time data management, called PI System™. The software can be used to capture, process, analyze, and store any form of real-time data. Process data provided by the PI System may be referred to as 'PI Data'.

The RTPO module 706 feeds processed data and instructions 710 to a test module 412. The test module 412 can, as instructed, perform targeted experiments to test predictions as provided by the RTPO module 706. The test module 712 may link to the liquefaction train 700 to test a range of conditions and settings, providing actual values of respective variables in the system. The actual values enable a comparison with the predicted values. For the comparison, the actual values may be fed back to the RTPO module 706. The feedback loop of test results, comprising the actual values (i.e. actual values of control variables—such as LNG throughput—in response to changes in one or more of the adjustable manipulated variables), enables the RTPO module 706 to obtain a results vector. Said solution vector may include influence (results, responses) on any control variable (CV) of any changes in any of the manipulated variables (MVs), within a predetermined range. From the results vector, the RTPO module 706 can determined an optimized solution vector for any set control variable. Said solution vector 714 can subsequently be provided to an APC design module 716. The APC design module may translate the optimized solution vector 714 provided by the RTPO module to be implemented in the APC system 512. This step may be regarded as modifying the solution vector of the APC system based on the recommendations by the RTPO system. The APC system 512 subsequently controls predetermined process set via connection 718 to the plant process control system 510 (see description of FIG. 5 above), using the updated solution vector.

As discussed above, the RTPO module may, for instance, provide a solution vector to at least maximize LNG throughput. Settings may be adapted as required, for instance by taking into account more or fewer manipulated variables and/or intermediate variables, and/or by taking into account more than one control variable to be optimized. The implementation process, as indicated in FIG. 21, may be run periodically, at set time intervals. The time intervals may be relatively short, for instance every week, day, or every couple of hours (depending on how fast ambient conditions change, such as temperature, weather conditions, humidity, feed gas composition, feed gas amount, etc.), effectively turning the system and method of the present disclosure into a real-time optimization system. By focusing on LNG throughput, the system and method can, effectively, be regarded as a real-time production optimization system.

The response of changes in MVs on CVs, such as LNG throughput rate and optionally also including CVs representing constraints such as $\Delta P\text{-}_{MCHE}$ and $P_s$, were monitored over time using the new controller, updated as described above. The performance of the old (without the system of the present disclosure) and new (including the system of the present disclosure) liquefaction loop strategies were compared to evaluate the gain in LNG throughput.

Figure 22:
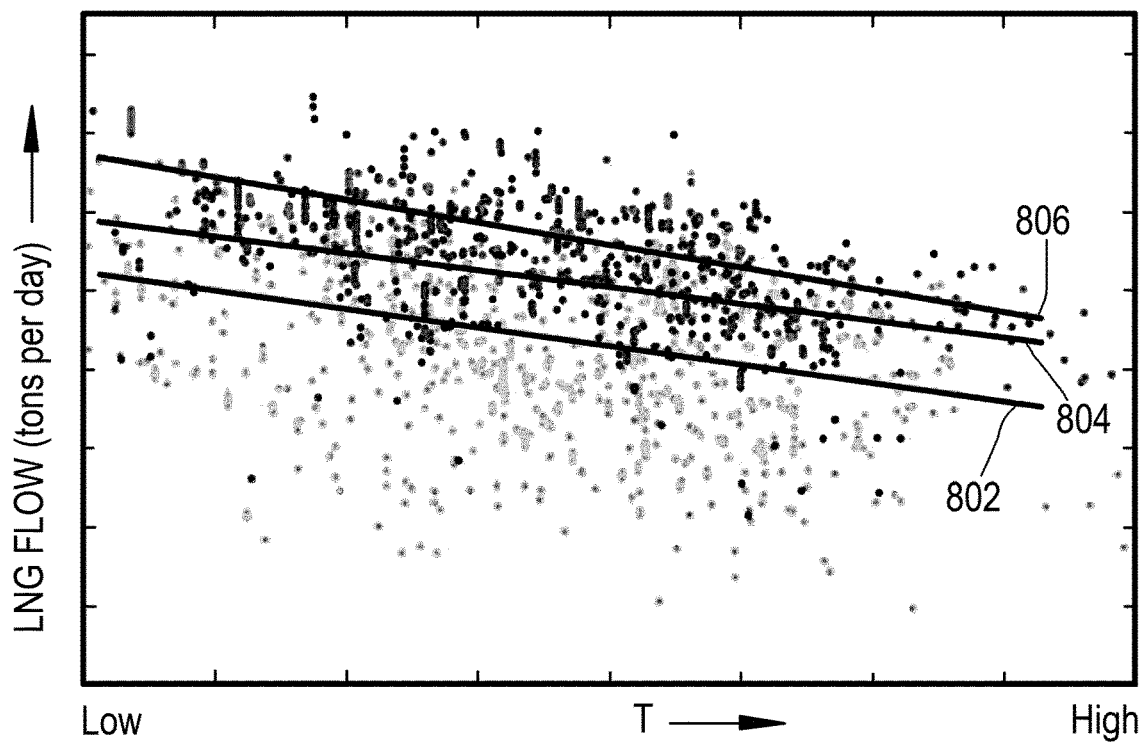
FIG. 22 shows a diagram to indicate exemplary production improvements resulting from the process control system and method of the present disclosure with respect to conventional process control systems.

FIG. 22 shows a plot of actual, i.e. measured, LNG throughput on the vertical axis for varying ambient temperature $T_{amb}$ on the horizontal axis. Three lines of best fit 802, 804 and 806 indicate the trend and relative result for LNG throughput using the DCS system of base layer control system 10 only (line 802), using the conventional APC system 512 in addition to the base layer control (line 804), and using the system 514 of the present disclosure in addition to the APC system 512 and the base layer control system 10 (line 806). All trend lines indicate a decreasing slope with increasing ambient temperature, indicating the increasing cooling power required to liquefy the feed gas stream. However, the trend lines also indicate an increase in LNG throughput over the entire temperature range, from low to high ambient temperature, when using the system of the present disclosure with respect to both the base layer control 510 and the APC system 512. The range of ambient temperature herein typically includes ambient temperatures ranging from a lower end in the order of about −30 to 0 degree C. (for liquefaction plants in arctic regions) to a higher end in the order of 30 to 50 degree C. (for liquefaction plants in Qatar, for instance).

Figure 23:
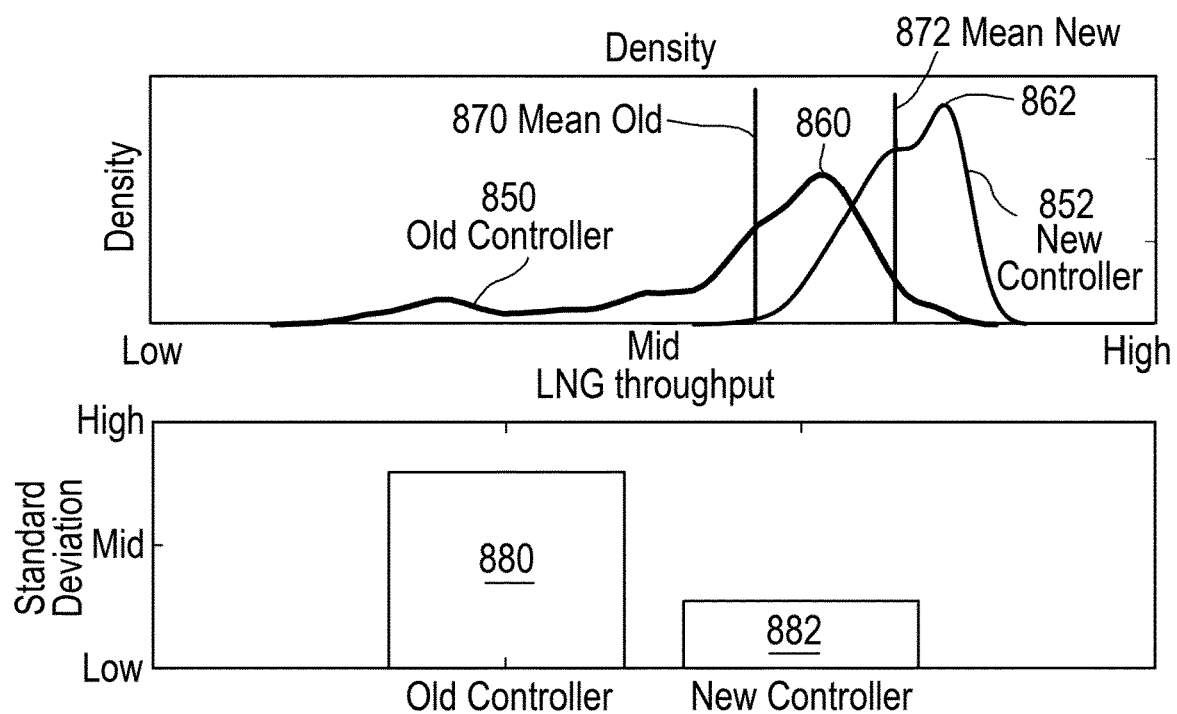
FIG. 23 shows another diagram to indicate exemplary production improvements resulting from the process control system and method of the present disclosure with respect to a conventional process control system.

The top panel of FIG. 23 shows the distribution of LNG throughput rate on the horizontal axis under the conventional control strategies using an APC system (line 850) and when using the system of the present disclosure (line 852). Herein, the vertical axis indicates the density of the respective LNG throughput value, or in other words the chance or relative occurrence of a certain value of LNG throughput. Using the system of the disclosure, a shift in peak production 860, 862 respectively from left to right is observed (relatively low under the conventional control strategy to increased production under the control strategy of the present disclosure).

With the conventional controller, the production profile 850 is spread relatively wide, i.e. across a relatively large range of LNG throughput. Conventional control systems may result in instances of reduced throughput due to hitting constraints, such as upper or lower thresholds of, for instance, $\Delta P\text{-}_{MCHE}$, $P_s$, $T_{WB}$ (either too cold or too warm), or $T_{MR}$ (too warm). The controller of the present disclosure was designed to ensure these factors were properly addressed, and results in a production profile 852 which is relatively slim. Also, there are significantly less instances of reduced production.

The vertical dotted lines show the mean production under the conventional (line 870) and the controller of the present disclosure (line 872). The mean production with the new controller (line 872) has shifted to the right compared to the old controller (line 870).

The lower panel in FIG. 23 indicates the standard deviation (on the vertical axis) of value of LNG throughput, when using the conventional controller (bar 880) and the system of the present disclosure (bar 882) respectively. The liquefaction loop is now able to produce about 1 to 2% extra LNG as a result of the new controller and optimization using empirical models fitted to the historical data.

Figure 24:
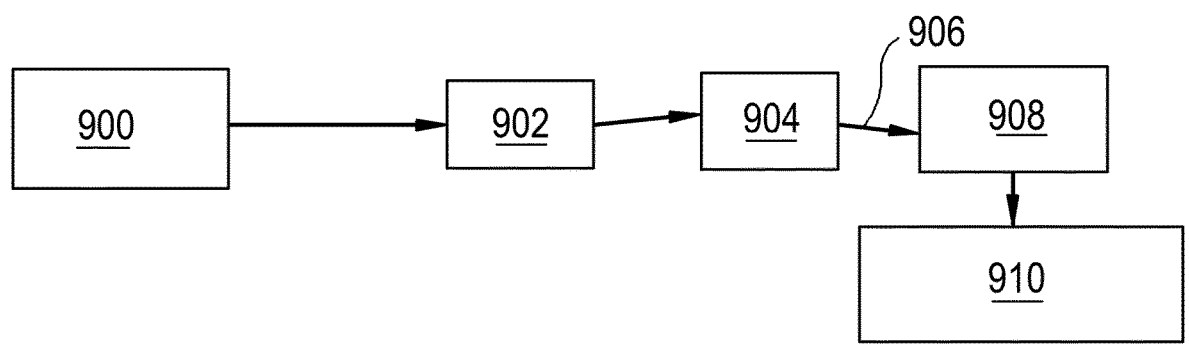
FIG. 24 shows a diagram indicating steps to design a conventional process control system.
Figure 25:
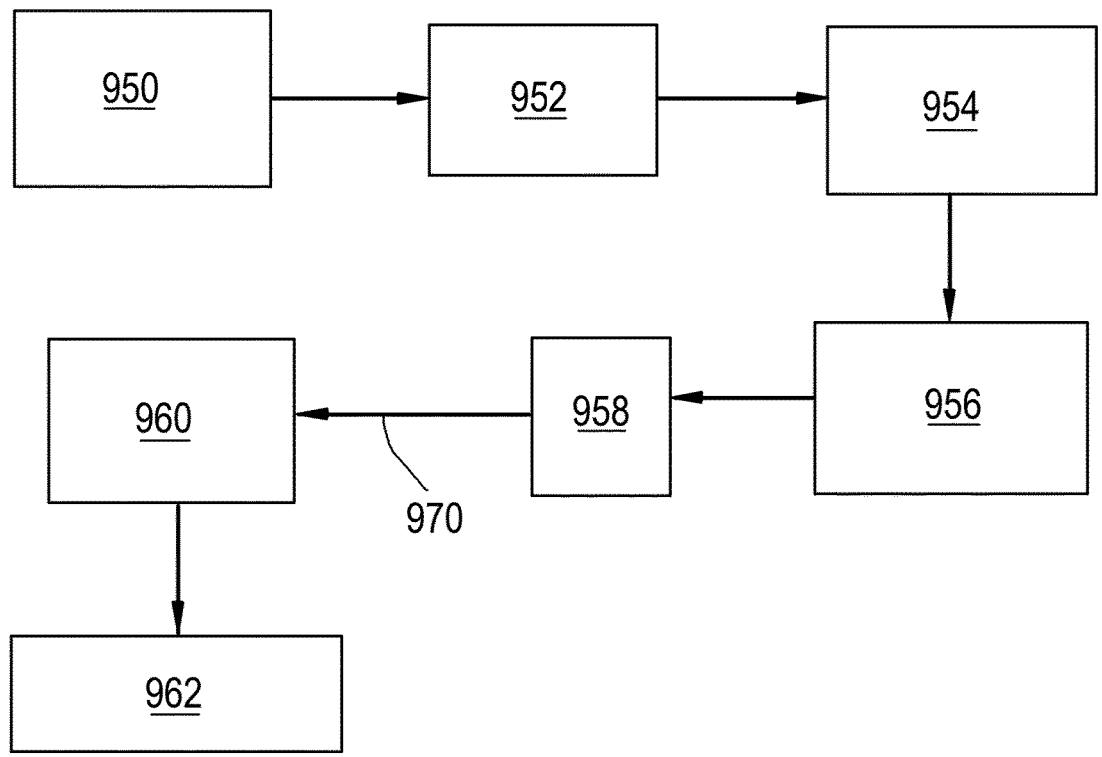
FIG. 25 shows a diagram indicating exemplary steps to design a system and method according to the present disclosure.

FIGS. 24 and 25 indicate examples of how the design process of the method and system of the present disclosure differ with respect to a conventional control process.

FIG. 24 shows steps of a conventional method. In a first step 900, a manipulated variable is selected. In a second step 902, a step test may be conducted by adjusting said selected manipulated variable in several steps and measuring or estimating the resulting changes. Results from step 902 are input to a model in subsequent step 904, resulting in an output 906 comprising a solution vector. The solution vector is implemented in the APC system 512 in next step 908. In final step 910, the APC system controls objectives and constraints in the liquefaction system in accordance with the implemented solution vector 906.

FIG. 25 shows steps of a method according to the present disclosure. In a first step 950, process data is obtained. As described above, said process data may be provided by a base layer control system or associated software such as the PI System™. In subsequent step 952, the process data may be provided to and processed by a machine learning algorithm. In step 954, the algorithm may provide a selection of variables. Said variables may include a selection of one or more manipulated variables (MV). The variables may also include a selection of one or more intermediate variables (IV).

In subsequent step 958, the selected variables provided in step 954 are input to one or more models. Output of the one or more models is, in next step 958, processed. Processing in step 958 may include one or more of simplifying and linearizing the models. Step 958 results in an optimized or improved solution vector 970. The improved solution vector 970 can be implemented in the APC system, in next step 960. Step 960 herein may include the use of compatible models in the APC system. In final step 962, the APC system 512 controls objectives and constraints in the liquefaction system in accordance with the implemented solution vector 970.

Figure 26:
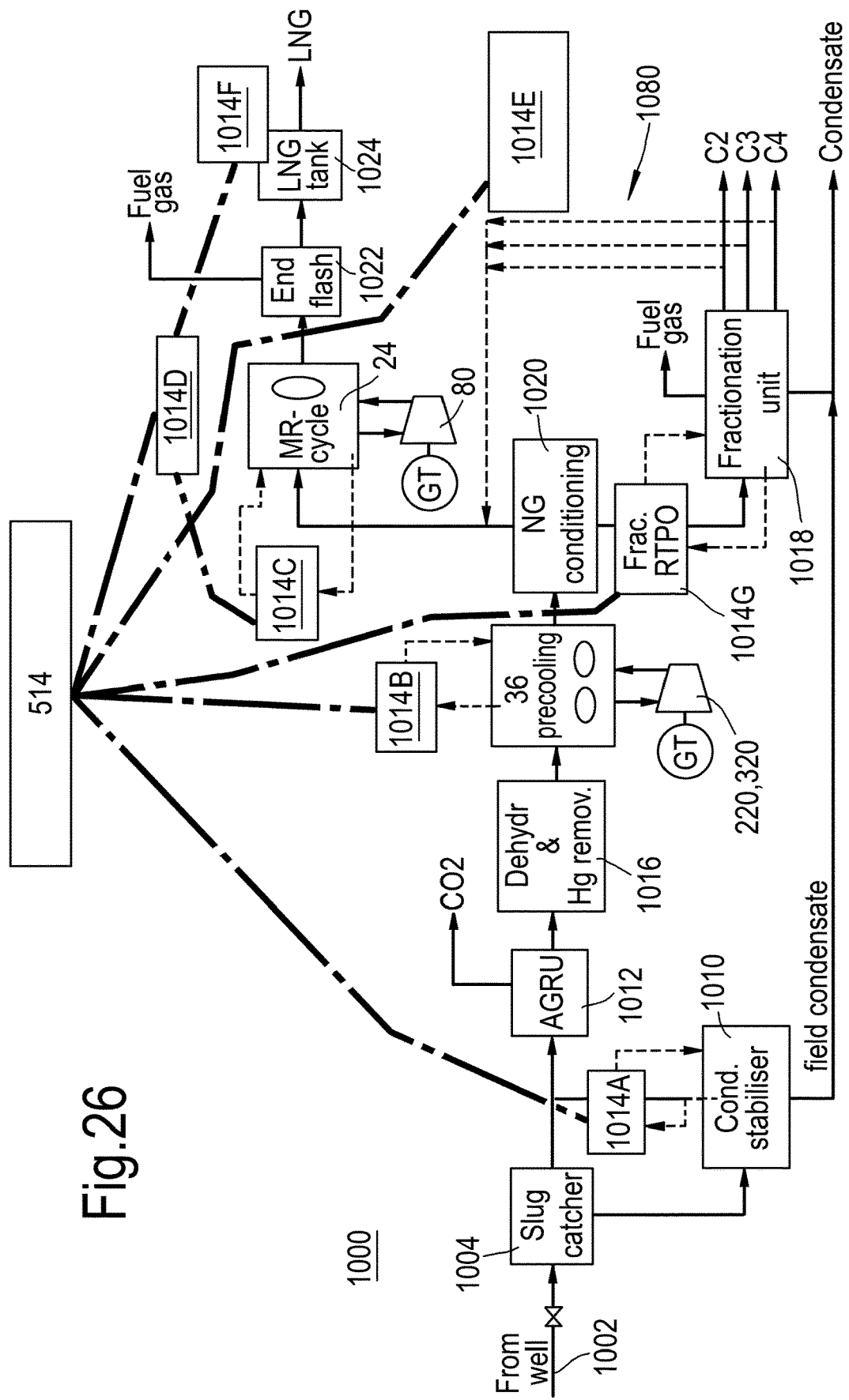
FIG. 26 shows a schematic representation of a liquefaction train provided with a system according to the present disclosure.

FIG. 26 provides an example, wherein the system and method of the present disclosure can consider variables from substantially all sections of a liquefaction facility 1000. Sections herein relate to any section of processing equipment between a well and a storage tank for liquefied product. The goal is similar to the embodiments described above (with respect to the refrigerant loop), i.e. to adjust respective process controllers and/or an overarching process controller to optimize one or more control variables. Result is a further optimization of said control variables. If the main control variable is LNG production, the embodiment of FIG. 26 may provide a further increase in production.

The facility received a feed stream 1002, typically natural gas from a well. The sections of the facility 1000 may include, but are not limited to: a slug catcher 1004 for receiving natural gas from a well and splitting the feed stream in a substantially gaseous stream 1006 and a substantially liquid stream 1008; a condensate stabilizer section 1010; an acid gas removal unit 1012, typically an amine unit for flushing with aqueous solvent to remove acidic gases such as $CO_2$ and $H_2S$; a dehydration section 1016, such as a molecular sieve unit, for dehydrating the gas subsequent to flushing in the AGRU; a pre-cooling section 36; an NGL fractionation section 1018; a gas conditioning section 1020; a main refrigerant cycle 24; an end flash system 1022; and one or more storage tanks 1024 for liquefied gas.

The facility may be provided with a production optimizer system 514 according to the present disclosure. In an exemplary embodiment, said system 514 may be connected to one or more section specific optimizer systems 1014. For instance, the facility 1000 may be provided with section specific optimizer systems 1014 including, for instance, optimizer systems 1014A, 1014B, 1014C, 1014D, 1014E, 1014F and 1014G for optimizing the condensate stabilizer 1010, the precooling section 36, the main refrigerant cycle 36 (1014C, 1014D), return flow 1030 of NGL components, the end flash section 1022 and/or fuel gas from the storage tank 1024, and the fractionation section 1018 respectively.

Functioning of the system 514 and the optimizer systems 1014 may be substantially similar to the functioning of the optimizer system 514 as described above, albeit with additional manipulated variables and additional constraints (setting additional control variables), specific for each section of the facility 1000. Said functioning of the system will be described in more detail below.

The RTPO implementation may follow the following workflow at a high level. A detailed methodology and results of each step will be described below.

Step 1—Empirical model building. Details of the model building process are described above;

Step 2—Develop empirical model directions and relationships;

Step 3—Generate the cost of resolving constraints for each MV (handle);

Step 4—Compare with existing APC strategy;

Step 5—Generate Gap to Potential and finalize optimization strategy;

Step 6—Design model tests to prove or disprove a hypothesis and/or generate data to complement data-analytical models;

Step 7—Provide recommendations for improvement;

Step 8—Conduct step tests to re-determine APC gains;

Step 9—Design new APC;

Step 10—Commission and fine-tune APC; and

Step 11—Conduct Post-Implementation Review of the deployed solution.

In a first step, one or more empirical models of selected plant constraints may be built using independent variables (manipulated or disturbance variables) and intermediate variables. This may result in an empirical model matrix. Herein, said matrix may be referred to as second matrix.

The model may consider independent variables that can be manipulated in the plant. These include among others the MR composition, HMR and LMR flows, NG/C3, MR/C3 Kettle levels and the number of fans switched on (fans herein typically relate to air cooled heat exchangers).

The model may also consider independent variables that are givens—i.e. they are disturbance variables (e.g. ambient temperature) or outside the scope of optimization (for instance run-down temperature, if the fuel-gas system is not modelled and is not within the scope of the current optimization).

The model may also consider intermediate variables that are used to get better fits or predictions. Intermediate variables can be modelled back to independent variables.

The model may also consider non-linear variables (for instance HMR×LMR, or HMR^2).

A second step may consider directions of the developed empirical model(s). The objective of this step is to understand impact of the MVs on the CVs in the data-analytical model in different conditions (for instance different throughputs or ambient conditions), so that the directions can be compared with the existing models in the APC. To do this, the following steps can be followed:

A first time period of process data (PI data) for each of the tags in the model matrix is downloaded. The process data comprises data points at a second time period interval. The first time period may be in the order of 1 to 12 months or more, for instance about 6 months. The second time period may be in the order of 1 to 24 hours, for instance about 6 hours. The model matrix is linked to the PI data, for instance through a database program such as Microsoft® Excel™.

At every data point, a small step can be made on each of the independent variables. The responses (gain) on the corresponding CV can be recorded. The response divided by the size of the step provides the data-analytical gain. Thus, a virtual step test can be conducted on the empirical models. Making these steps over a large range of data enables to quantify non-linearities in the process. Large range herein may imply, for instance, a range exceeding 60 to 90% of the full range of a manipulated variable available within constraints of the respective plant.

The run-down temperature of produced LNG may be kept constant while stepping manipulated variables, such as HMR, LMR, bypass etc. For instance, suppose the warm bundle bypass valve of the MCHE is stepped from 70% to 71%, while simultaneously the LNG flow is implicitly stepped in order to keep the run-down temperature constant. Thus, the impact of bypass % on a control variable that contains run-down temperature as a variable is a combined effect of bypass and LNG. Similarly, the impact of LMR on discharge pressure is the combined impact of LMR and corresponding step of LNG to keep run-down temperature constant. This is in contrast with the actual step tests used to design the APC where the run-down temperature is allowed to fluctuate. Thus, the gains from the actual plant step tests cannot be directly compared with the virtual gains generated from the data analytical models. However, controller choices for the hierarchy of MVs for production increase can still be compared with that of the empirical models.

The above two steps may be automated, for instance through excel macros, to do the above steps for, for instance, about 400 to 1000 high production data points across different operating regimes, ambient temperatures, or run-down temperatures.

These gains may be summarized in tables for the respective liquefaction train. To quantify a range in the gains, for instance a 10th percentile, 50th percentile (most likely value), and a 90th percentile value may be recorded for each MV-CV combination. Once the gains have been generated for every data point, the variation in the gains may be analyzed.

The table in FIG. 27 provides an example of a gain matrix. The gain matrix in FIG. 27 indicates impact of independent variables (manipulated variable MV1 to MVy; shown vertically) on respective dependent variables (control variables CV1 to CVx; shown horizontally). To show variation in the gains, P50 (most likely), P10 and P90 (extreme cases) percentile values are shown. Due to filtering, only those gains from moving an MV that result in a minimum specified change in a CV are selected, otherwise they are shown as zero. In other words, a filtering step replaces values which do not exceed a predetermined threshold with a zero gain.

When using the gain matrix to optimize a solution vector in a process control system (such as the APC), typically the P50 value (middle value) will be selected to implement a corresponding gain. Implementing the P50 value may for instance be automated or used as a default position. Based on additional information, such as rules, further testing, and/or operator experience, one of the other values (P10, P90) may be selected.

In a practical embodiment of a production optimization system relating to a main refrigerant loop, the number of CVs ("x") may exceed 6, 7, 8, 9, or 10 control variables. The number of manipulated variables ("y") may be in the order of 10 to 25 variables or more, for instance about 25 to 30 variables. In other words, for only the refrigerant loop the number of manipulated variables and control variables is already very extensive. For plantwide application, or application over two or more sections of a liquefaction facility, the numbers of variables will be far higher than the practical example provided above. Nevertheless, the latter can be likewise handled by the method of the present disclosure. See, for instance, FIG. 26 and the related description.

An optional subsequent step may include generating costs of resolving constraints for each MV.

APCs are typically designed to push to plant constraints to maximize an objective. When an APC hits any plant constraint (whether it is refrigerant power margin or discharge pressure), it needs to choose how to resolve the constraint using a suite of handles at its disposal. The choice should be such that it chooses the handles (adjustable or manipulatable variables) that are:

a. Effective—i.e. has a significant impact on the constraint and can act reasonably quickly (conventional data-analytical models are insufficient to teach an APC work-flow on this point);

b. Inexpensive—i.e. has the least impact on the objective function (e.g. LNG production) in comparison with the other handles that it has at its disposal. The current data-analytical workflow aims to provide advice on b.

This may be done using the following steps:

a. First, handles that are not impactful enough on the CVs for consideration, are removed. This can be done by applying the following criteria: The impact of moving the handle across a reasonably wide specified range should exceed a specified minimum threshold or impact on the CVs.

a) The range in which the handles can be moved to assess whether the impact exceeds said specified minimum threshold or impact on the CV may be in the order of, for instance:

i. MR Components: +/−1.5 mol %
ii. HMR Flow: 4000 tpd
iii. LMR Flow: 3000 tpd
iv. Levels: +/−10%
v. IGV=20% (e.g. from fully open to 20% closed)
vi. Bypass %: 50%
vii. # Fans: +/−5
viii. Run-Down Temperature: 2 deg C.

b) The minimum specified impact (minimum threshold) may be in the order of, for instance:

i. Flows: about 50 tpd;
ii. Power (e.g. MR Margin, PR Margin): 0.1 MW;
iii. Pressures: 0.1 bar-g;
iv. Temperatures: 0.1 deg C.

c) If an MV shows a response smaller than the minimum specified value for a respective CV (despite moving the MV across a fairly-wide range), then the impact is considered as negligible. If so, the gain can be rounded-down to zero. These variables are not considered useful for controlling the constraint. See the exemplary gain matrix above.

d) Next, it may be specified whether the constraint encountered is a low-end limit or a high-end limit. This specification ensures that the cost sign directions are consistent. See next step. For instance, MR Margin and MR Exit Temperature is expected to have the lower boundary limit active, whereas discharge pressures, pressure drops etc. are expected to have their high-limit active during production maximization.

e) Next, the gains of every independent variable to LNG production (optimization objective) may be divided by the gain of those independent variables to constraints to get the LNG cost of the constraint. For instance, if the gain from LMR to LNG is 2 tpd LNG/tpd LMR, but the gain from LMR to MR Margin is −1 (MW/tpd LMR), the cost of using LMR to control the MR Margin constraint (tpd of LNG/MW of power) is LMR to LNG gain (tpd LNG/tpd LMR) divided by LMR to MR_MARGIN gain (MW/tpd of LMR). This analysis could be done for every handle-constraint combination (e.g. IGV, HMR etc.). The latter enables to compare the cost of resolving the MR Margin constraint using HMR compared to LMR. Note that depending on whether the constraint under consideration is a low or high limit (as specified in the earlier step), the cost sign is inverted. All costs may be presented as positive, to enable to compare impact. So, the cost can be multiplied by −1 when the constraint to be resolved is a low limit and multiplied by +1 when the constraint to be resolved is a high limit.

f) If a handle has no impact on a constraint, it is specified as NCO (No constraint impact). These handles cannot be used to resolve the constraint when encountered.

g) When there is a trade-off involved, the cost is positive. Larger values are more costly and smaller values are less costly.

h) If there is no trade-off, i.e. if it is possible to use a handle without having any impact on production, then it is specified as NPI (No production impact).

i) In those cases where it is possible to resolve the constraint and produce more LNG with a handle, the proposed action would be to run that variable to the limit if this particular constraint is active in the APC.

j) Five costs may be shown for any given handle-constraint combination: Four extreme values based on Percentile 10 and Percentile 90 gain combinations from the handle to LNG production and to the constraint, and one for the 50 percentile gains to LNG production and the constraint. This can enable to see if the hierarchy of handles is likely to change different conditions.

In this manner, the LNG cost of each constraint can be generated per independent variable. It is possible to now compare the relative costs of resolving the constraints using the different handles and develop a cost hierarchy. Logically, the data-analytical model recommendation would be that the plant uses the cheapest handle available to tackle any constraint, when that particular constraint is active in the APC, and only move on to the other handles if that constraint cannot be used anymore because another constraint (e.g. MV or CV limits) has become active. By following the empirical cost-table, it is also possible to predict which set of constraints will be active together (unless imposed MV limits are hit) at steady state when running at optimum production. The above data-analytical results can now be compared with the APC gain matrix.

The APC gain matrix describes the impact of MVs on CVs as established using a limited step-test at the site. The cost of using a variable to control a constraint is can be established in terms of LNG flow/unit of constraint. E.g. LNG (tpd)/MW of MR Margin. The cost-hierarchy of the APC models is compared with the cost hierarchy emerging from the empirical models to look for gaps and potential improvements.

In a subsequent step, the method may compare results with an existing strategy as implemented in the process control system or APC.

The objective of this step is to understand how the existing APC deals with the different plant constraints. This will enable to compare how respective data-analytical models will deal with similar constraints. To do this, one can derive the existing cost of constraints of each of the APC handles using the APC Gains information. Note that these are the costs that the existing APC uses to arrive at what it thinks are the correct handles to resolve plant constraints. The following steps can be followed to generate a cost-hierarchy.

Get the APC Gains from the existing APC models (which were build based on step test results. The units of the gains depend of the handle being moved and the constraint being impacted. For instance, the APC gain from moving HMR flow to MR Margin may be −0.0015 MW/tpd HMR. The APC gain from moving HMR flow to Run-down temperature may be −0.0003 deg C./tpd HMR. The APC gain from moving LNG flow to run-down temperature may be 0.0014 deg C./tpd of LNG.

The method may try to obtain the cost of resolving each constraint using a given handle. For example, using the information provided in the above example:

$$\text{Cost of using } HMR \text{ to resolve } MR \text{ Margin constraint} \left[\frac{tpdLNG}{MW}\right] = \frac{\text{Gain of } HMR \text{ to } T_{RD}\left[\frac{DegC}{tpdHMR}\right]}{\text{Gain of } HMR \text{ to } MR \text{ Margin}\left[\frac{MW}{tpdHMR}\right] \cdot \text{Gain of } LNG \text{ Flow to } T_{RD}\left[\frac{DegC}{tpdLNG}\right]}$$

wherein $T_{RD}$ is the rundown temperature of liquefied gas leaving the main heat exchanger. Thus, the LNG cost of each constraint can be generated per independent variable in the APC. It is possible to now compare the relative costs of resolving the constraints using the different handles and develop a cost hierarchy similar to what was done with the data-analytical models as described above. Since APC gains are typically linear, there is only one cost value per MV-CV combination. In a practical embodiment, these values can be compared with the P50 costs in the data-analytical models.

A subsequent step may involve model testing. Based on insights gained from data-analytics, a list of hypotheses can be developed for testing. For practical reasons, testing may be limited to the recommendations expected to have the most impact. It may not be practical to test every recommendation identified in the data-analytical model (especially those that have a low signal to noise ratio—requiring a lot of data points before one can conclude). Only the big effects can be tested in the plant. For instance, the following three hypotheses were tested due to their large visible impact on the controller performance and because they can be reasonably carried out in a short interval of time.

a. LMR vs. HMR choice: LMR is more efficient compared to HMR in terms of tpd LNG/MW of Power consumed.

b. LMR vs. IGV choice: At low-ambient temperatures, it is more efficient to open the IGV compared to flowing more LMR (and corresponding HMR). At high ambient temperature, closing the IGV and flowing more LMR is a more effective way to utilize power. High ambient temperatures herein may relate to temperatures in the order of 30 to 50 degreeC. Low ambient temperatures herein may relate to temperatures around 0 degreeC and below.

c. Flowing more HMR relative to LMR reduces gain of run-down temperature to the cold bundle pressure drop.

To test the above, for instance 6 combinations of HMR/LMR ratio and IGV can be tested. Herein, each step may be run for two days (day+night) with the APC on, so that it is able push to constraints. With the fixed HMR/LMR ratios, the run-down temperature can be controlled by moving the LNG flow accordingly. MR Composition can be kept constant during this test (N2=3 mol2%, C1=43 mol %, C2=43 mol %, C3=10 mol %). For the analysis, only the data where all the plant constraints were respected will be considered. The tested combinations are as follows:

a. Experiment 1—IGV=75 HMR/LMR Ratio=5.1 b. Experiment 2—IGV=75 HMR/LMR Ratio=5.6 c. Experiment 3—IGV=68 HMR/LMR Ratio=5.3
d. Experiment 4—IGV=61 HMR/LMR Ratio=5.1
e. Experiment 5—IGV=61 HMR/LMR Ratio=5.6
f. Experiment 6—IGV=70 HMR/LMR Ratio=5.3

In a subsequent step, the method of the disclosure may estimate a potential benefit. This may be referred to as generate gap to potential. The step may include recommending an optimization strategy.

Gap to potential is defined as the maximum amount of LNG that can be produced at any given time from a respective liquefaction train. From data-analytics and process knowledge, a disturbance variable having a relatively large impact on LNG production includes the temperature of air entering the Gas Turbine (see turbine 80, 82 in FIGS. 1-4). At least the most relevant disturbance variables will be considered. These include the air temperature entering the Gas Turbine for driving the main refrigerant loop, and potentially also a gas turbine driving one or more precool refrigerant loops. In turn, the air temperature entering the gas turbine(s) may influence or restrict the total available power for refrigeration.

Figure 28:
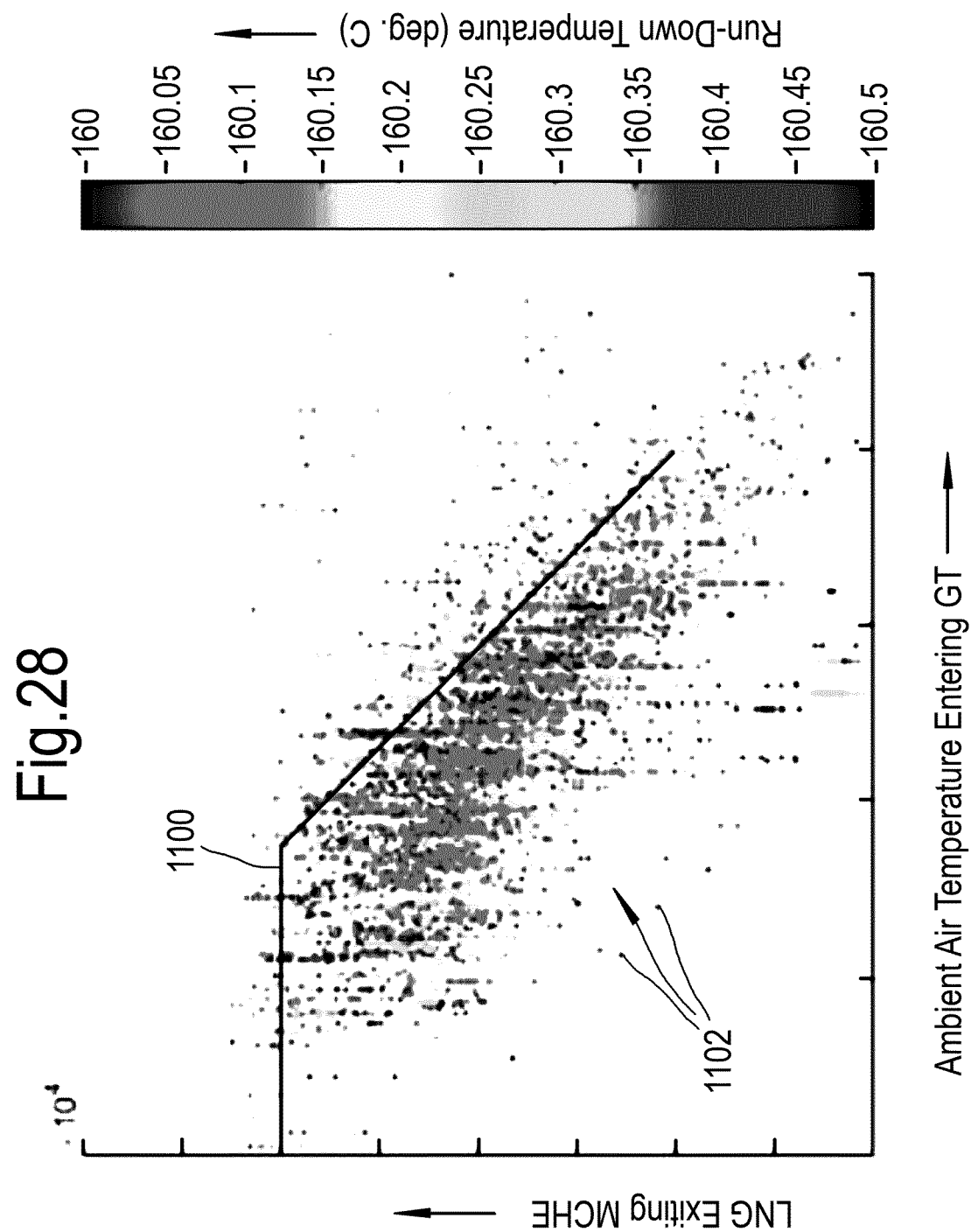
FIGS. 28 and 29 show exemplary representations of gap to potential.

Referring to FIG. 28, when plotting process data for ambient temperature (horizontal axis) versus LNG production (vertical axis), for a narrow-range (for example +/−0.1 or 0.2 degreeC) of, or substantially constant run-down temperature, it is possible to draw a line of optimal potential 1100 through the best, for instance the top 5 percentile of, data-points 1102 (disregarding outliers). This would represent a top-down target of production, based on what the train has achieved in the past with respective ambient temperature and run-down temperature conditions.

Figure 29:
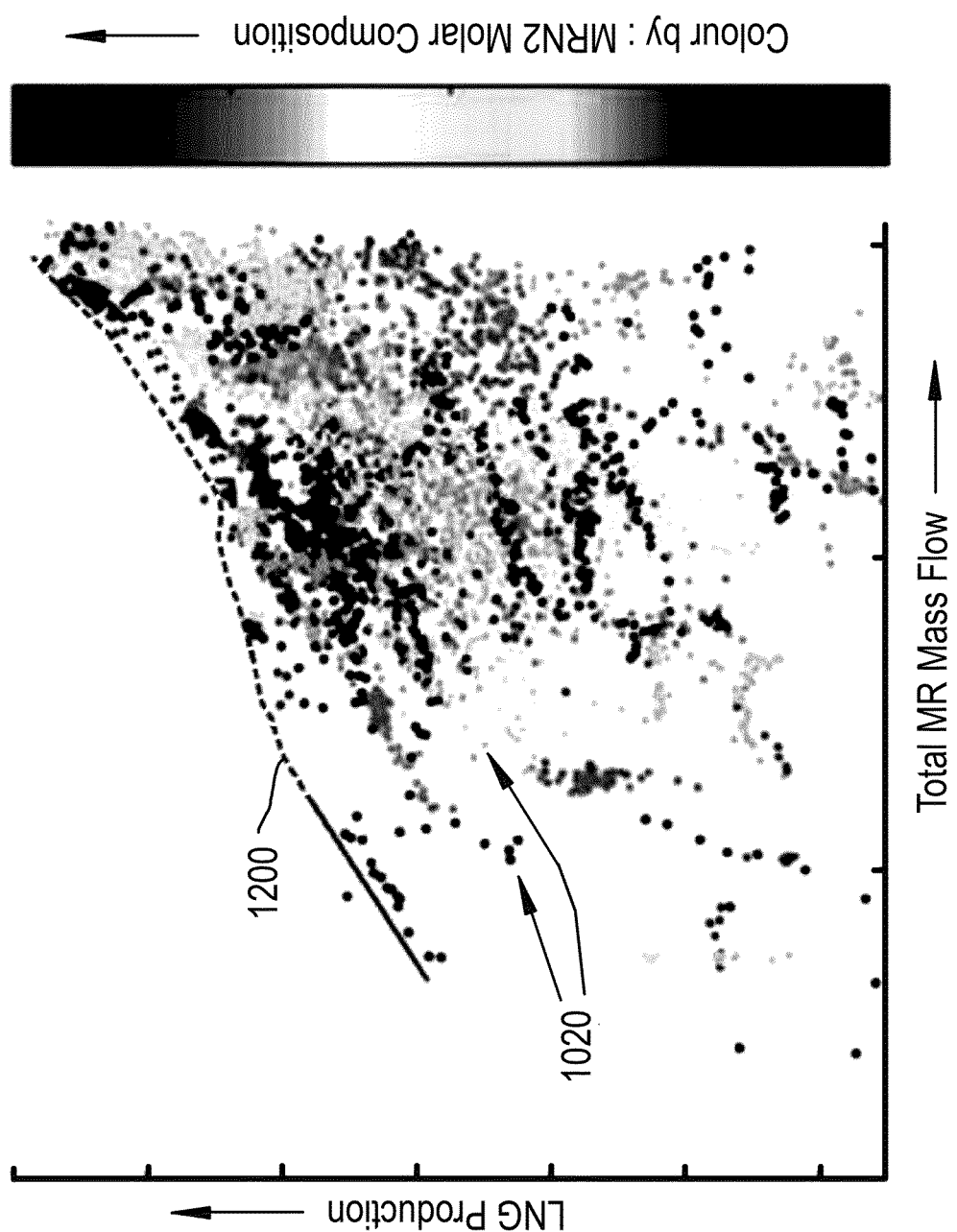

Similarly, referring to FIG. 29, a plot can be made with LNG production (vertical axis) as a function of total mass flow of mixed refrigerant (horizontal axis). Herein, process data may span a range of another variable, such as molar composition of the mixed refrigerant. For instance, the color coding may indicate molar concentration of N2 per unit of refrigerant (color/shaded coding, see bar on the right of FIG. 29). A line of optimal performance 1200 can be drawn connecting data points 1202 with a set range of optimal performance. Said range may be, for instance, the top 1%. 2%, 3%, 4%, 5%, 10% of data-points 1102 (disregarding outliers). The line 1200 can set a target of potential LNG production as a function of total MR mass flow. The line 1200 can indicate a gap to potential with respect to measured LNG production for each value of total mass flow of (mixed) refrigerant.

The aim of the real time production optimizer system of the present disclosure can be understand the reason for spread. Subsequently, the system may enable the control system to control the plant to achieve said line of optimal potential. Herein, it may be recognized that there can be other factors that could cause the spread in production, potentially outside the scope and control of the APC or system of the present disclosure. The latter may include, for instance, air cooler performance, performance of other sections in a facility, compressor performance. Nevertheless, the gap to potential provides a value that has been achieved by the respective train.

The plant control system and the plant operators need to make a series of choices (given the available handles) in real-time to maximize production given the available power, while also respecting any other constraints. In other words, it requires answers to certain questions, for instance one or more of.
 a. What is the optimal ratio of HMR and LMR flows?
 b. What is the optimal IGV %?
 c. What is the optimal MR Composition?
 d. What is the optimal WB Bypass %?
 e. What is the optimal MR/PR and NG/PR Kettle levels %?

While a target can be set based on gap to potential, as described above, this does not mean that we automatically know how to achieve it. The spread in the historical data may be due to different choices made by a control system and/or operator. The data-analytical models described above have studied the reason for the spread. Now models can be run with, for instance, the following logic:
 i) "Maximize Objective (e.g. LNG Production),
 ii) subject to staying within the constraint limits for each of the constraint variables (e.g. Compressor Power Margin),
 iii) by varying the independent variables (e.g. HMR Flow, LMR Flow, IGV #, MR Composition)
 iv) taking as givens the different disturbances on the control scope at any given time (e.g. ambient air/water temperature, Natural gas inlet temperature to the MCHE).

If one does the above exercise for a large data-set, it is possible to generalize the recommendations as a function of ambient temperature so that it can be visualized or implemented on an APC. The values of the constraints can then be predicted for the recommended values (using the Gap to Potential).

In a subsequent step (step 7), the method may conduct step tests to re-determine APC gains. Several gaps to the control philosophy as implemented in the existing control system or APC may have been identified by data-analytics, as described above (in Step 4). Step tests may have been conducted. The results of the step tests can be used as the basis for the design of an updated controller. A high-level overview of an exemplary step test workflow is provided below.
 i) Scope—MCHE+MR Loop+Scrub Column (1 week), precool refrigerant loop (1 Week), MR Component Makeup (1 Week)
 ii) Resources—4 Engineers;
 iii) Logs were used to capture what steps were made, step counts, impact of steps, recommendations for the next shift;
 iv) Key parameters monitored via PI system and DCS (process data);
 v) Time taken—1 week, Day & Night & Continuous. APC may have been switched off;
 vi) Results: High quality models as result of tests;
 vii) Number of steps made
  HMR Flow ~ 35 steps.
  LMR Flow ~ 35 steps.
  LNG Flow ~ 45 steps.
  MR Make Up, Vent, Drain valves ~ 15 steps each.
  C3 kettle Levels ~ 15-20 each.
 viii) Chosen step size may be dependent on the distance from constraints. Testing may start with relatively small steps, and attempt larger step sizes after operators become confident of the impacts.
 ix) Step sequence=Constraint dependent, but typically as random as possible.
 x) Step direction=attempted to be as random as possible.
 xi) Time taken per step: About 15 to 45 minutes. Randomly distributed.

Examples of step sizes are provided in the table below:

| Manipulated MV | Recommended Step sizes | Maximum Step sizes |
|---|---|---|
| NG Flow | 150 tpd | 300 tpd |
| HMR Flow | 300 tpd | 400 tpd |
| HMR/LMR Ratio | 0.1 t/t on ratio 2% on valve | 0.1 t/t on ratio 2% on valve |
| IGV Position | 2% | 2% |
| Scrub column reflux temperature | 1 deg C. | 3 deg C. |
| NG/PR MP Level | 2% | 2% |
| MR/PR HHP Level | 2% | 2% |
| N2 makeup | 10% | 25% |
| C1 makeup | 10% | 25% |
| C2 makeup | 5% | 25% |
| C3 makeup | 5% | 25% |

A subsequent step (Step 8) may involve summarizing learnings and incorporating the learnings into the process controller. Based on the results of data-analytical model analysis, model test and step test results, it is now possible to develop an optimized philosophy for the process controller of the respective liquefaction train, or section of a liquefaction plant. The optimized philosophy will form the basis of design for an optimized controller.

Some examples of recommendations have been described above. As another example, the data-analytical models may uncover issues with the existing process controller gains that resulted in incorrect prioritization of handles used to control different constraints. In other words, the method of the disclosure may improve prioritization of adjusting available manipulated variables to control respective objectives (control variables).

A subsequent step (step 9) may include designing an APC. Before implementing the method of the present disclosure, a liquefaction facility typically already has one or more pre-existing APC controllers. The objective of the method of the disclosure is to improve the existing APC strategy by incorporating the learnings from the empirical models.

Designing a new APC may include, for instance, using the gain matrix (as derived using the method of the present disclosure, see above) to optimize the solution vector in the APC.

As an optional next step, the method may include a post-implementation review.

In a practical embodiment, a post-implementation review showed an increase in production by using the updated Advanced Process Control (APC) application. The new APC incorporated insights gathered from models derived from closed-loop data and knowledge gained from a step test program, as described above. The new controller has an objective to maximize production when the plant has sufficient feed gas (i.e. when the amount of feed gas exceeds a design capacity). Benefits have been described above. The benefits may be due to, for instance, (a) Reduction in variability of production, and (b) Shift in mean production. For instance, 65% of the increased production may be attributed to reduced variability in the new APC compared to the old APC. That is, less fluctuations in production due to appropriate control of key equipment. A remaining 35% may be assigned to shift in mean by the new APC due to feed-pushing mode, better utilization of MR margin, smearing of some CVs, better switch over between base-layer control and APC besides potential other factors.

Combining all the above, the method of the invention includes two control systems, on different time scales. A process control system, referred to as APC, which controls the industrial process on a time scale in the order of hours (real time up to a day). And an optimization system, referred to as RTPO system, which checks process data on a longer time scale in the order of at least a month, up to a year or more. The RTPO system can provide an optimized solution vector for improving the process control system.

The process control system manages the industrial process by:
  obtaining operational data of the industrial process at intervals of a second time period, the first time period being in the order of 1 to 24 hours, the operational data including values of the at least one control variable (CV);
  indicating if the value of the at least one control variable (CV) leaves a predetermined range as indicated in the set of constraints; and
  adjusting at least one manipulated variable (MV) in accordance with the at least one first model to keep the at least one control variable (CV) within the predetermined range.

The RTPO system can improve the advanced process control (APC) system by the steps of:
  predicting production of the industrial process during a first time period using the at least one first model, the first time period being at least a month.
  deriving an actual or measured production during the first time period from the operational data. Actual or measured herein indicates that the production is derived from the process data. I.e. this relates to the production as measured by sensors, production actually achieved.
  comparing the predicted production with the measured production to provide a prediction error; The prediction error may indicate potential flaws in the at least one first model of the APC. Said flaws may relate to assumptions which may be correct on the time scale of a day, but may provide inaccurate results on the longer time scale of a month up to a year. For instance, the at least one first model may be optimized for a certain temperature range. Said temperature range however may fluctuate locally over a significant margin during a year. The RTPO system takes into account a much longer time period of process data, and can optimize the APC model accordingly.
  if the prediction error exceeds a minimum threshold, checking the operational data over the first time period for correlations between the at least one MV, the at least one CV, and optionally at least one intermediate variable (IV). As explained above, the method of the disclosure may also take into account intermediate variables. If the impact of the intermediate variables exceeds a certain threshold, they can be included in the calculations and as a result become—in fact—new controlled variables (by link to one or more manipulated variables) and/or variables for controlling one or more of the control variables.
  analysing the prediction error taking into account the correlations;
  filtering the correlations to select the most relevant correlations;
  creating a second matrix indicating dependencies of the at least one control variable (CV) on the at least one manipulated variable (MV). The RTPO system typically can be regarded as an empirical model. The second matrix can be equated with the empirical model matrix as referenced above.
  filtering the second matrix to indicate the correlations exceeding a minimum threshold of impact. Herein, correlations with minimal impact are removed from the calculations. The threshold may be set in accordance with, for instance, available processing capacity or the added value of the potential improvement. I.e. if the product stream is highly valuable, the threshold may be set at a lower level.

modifying the solution vector of the APC system based on the filtered correlations. This step basically involves changing or adjusting the solution vector of the process control system based on the recommendations by the RTPO system. See for example FIG. 21, e.g. steps 706 to 716.

The system and method disclosed herein are directed to the challenge of optimizing the production throughput of the main cryogenic heat exchanger and refrigerant loop, which are central to the production of Liquefied Natural Gas from Natural Gas. There is an established practice to push throughput of the MCHE/refrigerant loop using Advanced Process Control (APC) technology. Conventional efforts to fully model the process have proven difficult due to modelling complexities, for instance associated with phase changes of natural gas and (mixed) refrigerant in the MCHE.

In order to gain insights to increase LNG throughput, least squares regression was applied to historical closed loop data. The data revealed that additional control variables can be included to optimize the production, such as the temperature of the warm bundle ($T_{WB}$) and the temperature of the (mixed) refrigerant ($T_{MR}$). The pressure-drop across the MCHE ($\Delta P_{MCHE}$) and the suction pressure ($P_{section}$) of the refrigerant compressor were also modelled and ways to effectively control them below their respective threshold limits determined. The new insights into the liquefaction loop were used to update the advanced process control (APC) solution. This involved conducting step tests and targeted open loop test (data analytics validation) to understand the dynamic effects of the identified control variables. Herein, the method and system of the present disclosure included a step of providing an updated solution vector and including said solution vector in the APC system. The updated APC controller provided about 1 to 2% extra LNG throughput.

In general, the system and method of the present disclosure can be applied to any liquefaction process and/or facility. The system and method of the disclosure can optimize the LNG production with any type of mixed refrigerant process.

A mixed refrigerant process may include a precooling circuit as well as a main cooling circuit, both cooling circuits comprising one or more heat exchangers. A similar approach as described in the present disclosure with respect to the main cooling cycle can be applied to the pre-cooling cycle. Examples of mixed refrigerant liquefaction processes and systems include, for instance, a single mixed refrigerant process (see for instance U.S. Pat. No. 6,658,891), a dual mixed refrigerant process (see for instance U.S. Pat. No. 6,370,910), a parallel nixed refrigerant process (see for instance US20080156037), or a C3MR process (see for instance US20090301131). For details of the respective processes, reference is made to the listed disclosures.

The method of the present disclosure can be applied to optimize an industrial process in general. For instance, the method can be applied to optimize a process for refining hydrocarbons. Objectives of the method may relate to increasing production. Alternatively, an objective of the method may relate to removing inefficiencies in the process. The method of the disclosure can provide an optimized solution even when dealing with linear and non-linear dependencies of a multitude of interdependent variables, including a multitude of intermediate variables.

The present disclosure is not limited to the embodiments as described above and the appended claims. Many modifications are conceivable, and features of respective embodiments may be combined. For instance, the method and system described herein may be applied to any liquefaction process, such as exemplified in FIGS. 1 to 4, each having a respective set of potential control levers (manipulated variables, intermediate variables, and/or control variables) to achieve similar optimization of production. Each different liquefaction process may have different levers of control. Said levers of control may in part be the same, and in part be different for each different liquefaction process.

We claim:

1. Method for optimizing an industrial process, the method comprising the steps of:
    controlling the industrial process using an advanced process control system (APC), the APC system being provided with at least one first model, the at least one first model including a solution vector comprising a first matrix indicating dependencies of at least one control variable (CV) on at least one manipulated variable (MV) and a set of constraints, the step of controlling comprising:
        obtaining operational data of the industrial process at intervals of a second time period, the first time period being in the order of 1 to 24 hours, the operational data including values of the at least one control variable (CV);
        indicating if the value of the at least one control variable (CV) leaves a predetermined range as indicated in the set of constraints; and
        adjusting at least one manipulated variable (MV) in accordance with the at least one first model to keep the at least one control variable (CV) within the predetermined range;
    improving the advanced process control (APC) system using a production optimization (RTPO) system, the step of improving comprising:
        predicting production of the industrial process during a first time period using the first model, the first time period being at least a month;
        deriving an actual or measured production during the first time period from the operational data;
        comparing the predicted production with the measured production to provide a prediction error;
        if the prediction error exceeds a minimum threshold, checking the operational data over the first time period for correlations between the at least one MV, the at least one CV, and optionally at least one intermediate variable (IV);
        analysing the prediction error taking into account the correlations;
        filtering the correlations to select the most relevant correlations;
        creating a second matrix indicating dependencies of the at least one control variable (CV) on the at least one manipulated variable (MV);
        filtering the second matrix to indicate the correlations exceeding a minimum threshold of impact; and
        modifying the solution vector of the APC system based on the filtered correlations.

2. The method of claim 1,
    wherein the step of checking the operational data over at least a third time period comprises checking the operational data for correlations between the at least one MV, the at least one CV, and at least one intermediate variable (IV); and wherein the step of creating a second matrix comprises indicating dependencies of the at least one control variable (CV) on the at least one manipulated variable (MV) and on the at least one intermediate variable (IV).

3. The method of claim 1, the solution vector comprising at least one target setting of the at least one control variable.

4. The method according to claim 3, wherein the step of modifying the solution vector includes one or more of:
   modifying the matrix of the first model; or
   modifying the set of constraints; or
   modifying the at least one target setting.

5. The method of claim 1, wherein the industrial process is a natural gas liquefaction process.

6. The method of claim 5, wherein the method is for optimizing production of the natural gas liquefaction process.

7. The method of claim 1, the step of improving comprising:
   building a second model as an empirical model fitted to the process data during the first time period;
   developing directions and relationships of the second model;
   generating costs of resolving constraints for each MV of the second model;
   compare the costs of resolving constraints with the costs of resolving constraints when using the at least one first model to provide a gap to potential;
   test the second model to prove or disprove a hypothesis and/or to generate data;
   use an outcome of the test to complement the second model;
   use the second model to provide recommendations for improvement of the at least one first model;
   use the recommendations to conduct step tests in the industrial process to determine an updated first matrix of the first model;
   implement the updated first matrix in the APC.

8. The method of claim 1, the at least one manipulated variable (MV) comprising at least 8, 10, 12, 14, or 20 manipulated variables and/or the at least one control variable (CV) comprising at least 5, 6, 7, 8, or 10 control variables.

9. System for optimizing production of liquefied natural gas, the system being adapted to implement the method of claim 1.

10. Method for optimizing production of a natural gas liquefaction process, the method comprising the steps of:
    selecting at least one manipulated variable (MV) for controlling the liquefaction process;
    selecting at least one control variable (CV), the at least one control variable at least comprising liquefied natural gas (LNG) throughput;
    providing at least one model, each model providing a dependency of the at least one control variable (CV) on the at least one manipulated variable (MV);
    using the at least one model to estimate LNG throughput for at least one of the manipulated variables (MV);
    obtaining process data from the liquefaction process, the process data at least including observed values of LNG throughput;
    for combinations of the at least one manipulated variable and the at least one control variable, testing the interdependency thereof;
    creating a gain matrix based on said interdependencies;
    using the gain matrix to optimize a process control system of the liquefaction process;
    filtering the gain matrix by removing combinations of the at least one manipulated variable and the at least one control variable which fail to exceed a predetermined target effect; and
    using the filtered gain matrix to optimize the process control system of the liquefaction process.

11. The method of claim 10, comprising the step of checking residual LNG throughput, residual LNG throughput being a difference between observed LNG throughput and estimated LNG throughput.

12. The method of claim 10, the step of providing at least one model comprising building a model matrix.

13. The method of claim 12, the step of building a model matrix comprising the step of linking the at least one model to the process data.

14. The method of claim 10, the step of obtaining process data comprising obtaining process data during a first time period, the first time period being in the order of 1 to 12 months or more.

15. The method of claim 10, the step of obtaining process data comprising obtaining process data at intervals of a second time period, the second time period being in the order of 1 to 24 hours.

16. The method of claim 10, the step of testing the interdependencies comprising the step of varying each remaining manipulated variable within a range and recording a resulting response of at least one control variable.

17. The method of claim 16, said range being in the order of +/−5%.

18. The method of claim 16, said range comprising substantially an entire range available within operational constraints of the natural gas liquefaction process.

19. The method of claim 16, the step of creating a gain matrix comprising listing, for all interdependencies of the at least one manipulated variable and the at least one control variable, a resulting response for a low, medium and high end (P10, P50, P90) of said range.

20. The method of claim 10, the step of creating a gain matrix comprising keeping a temperature of the liquefied natural gas (LNG) substantially constant.

21. The method of claim 10, the method comprising the steps of repeating the steps of obtaining process data, for all combinations of the at least one manipulated variable and the at least one control variable testing the interdependency thereof, creating a gain matrix based on said interdependencies; checking residual LNG throughput; and filtering the gain matrix, for different:
    ambient temperatures;
    temperature of the produced liquefied natural gas (LNG); and/or
    seasonal periods.

22. The method of claim 10,
    the at least one manipulated variable (MV) comprising one of more of: refrigerant flow, percentage of total refrigerant for respective refrigerant components, ratio of heavy refrigerant to light refrigerant, natural gas bypass flow; and/or
    the control variables (CV) comprising one or more of: compressor power; refrigerant pressure drop across a heat exchanger, compressor surge.

* * * * *